US011315202B2

(12) United States Patent
VanderMey et al.

(10) Patent No.: US 11,315,202 B2
(45) Date of Patent: Apr. 26, 2022

(54) COLLECTING AND REPRESENTING HOME ATTRIBUTES

(71) Applicant: Zillow, Inc., Seattle, WA (US)

(72) Inventors: Timothy VanderMey, Seattle, WA (US); Fred Farhad Sadaghiani, Seattle, WA (US); Stephen Martin McNamee, Renton, WA (US); Marcin Szuster, Seattle, WA (US); Chloe Linden Harford, Seattle, WA (US); Jeffrey Thomas Brinker, Seattle, WA (US); Randy Winston Puttick, Mercer Island, WA (US)

(73) Assignee: Zillow, Inc., Seattle, WA (US)

( * ) Notice: Subject to any disclaimer, the term of this patent is extended or adjusted under 35 U.S.C. 154(b) by 508 days.

(21) Appl. No.: 15/789,617

(22) Filed: Oct. 20, 2017

(65) Prior Publication Data

US 2018/0260918 A1 Sep. 13, 2018

Related U.S. Application Data

(63) Continuation of application No. 15/456,235, filed on Mar. 10, 2017, now abandoned, which is a continuation of application No. 15/220,518, filed on Jul. 27, 2016, now abandoned, which is a continuation of application No. 15/096,363, filed on Apr. 12, 2016, now abandoned, which is a
(Continued)

(51) Int. Cl.
*G06Q 40/00* (2012.01)
*G06Q 50/16* (2012.01)
*G06Q 10/06* (2012.01)

(52) U.S. Cl.
CPC ......... *G06Q 50/16* (2013.01); *G06Q 10/0635* (2013.01)

(58) Field of Classification Search
CPC .......................... G06Q 50/16; G06Q 10/0635
See application file for complete search history.

(56) References Cited

U.S. PATENT DOCUMENTS 4,870,576 A 9/1989 Tornetta
5,361,201 A 11/1994 Jost et al.
(Continued)

FOREIGN PATENT DOCUMENTS

EP 1903491 A1 3/2008
JP 2003854023 * 3/2003 ............. G06F 17/60
(Continued)

OTHER PUBLICATIONS

Beckhart, "No Intrinsic Value: The Failure of Traditional Real Estate Appraisal Methods to Value Income-Producing Property," 66 S. Cal. L. Rev. 2251 (Year: 1993).*
(Continued)

*Primary Examiner* — Hani M Kazimi
*Assistant Examiner* — William B. Bunker
(74) *Attorney, Agent, or Firm* — Perkins Coie LLP

(57) ABSTRACT

A facility for representing home attribute values for a plurality of homes and a plurality of home attributes is described. The facility incorporates a data structure comprising, for each of the plurality of homes, for each of the plurality of attribute value sources, the capacity to store values for any of the plurality of home attributes obtained from the attribute value source.

38 Claims, 22 Drawing Sheets

Related U.S. Application Data continuation of application No. 14/982,338, filed on Dec. 29, 2015, now abandoned, which is a continuation of application No. 14/852,418, filed on Sep. 11, 2015, now abandoned, which is a continuation of application No. 11/524,047, filed on Sep. 19, 2006, now abandoned.

(56) References Cited

U.S. PATENT DOCUMENTS

| | | | |
|---|---|---|---|
| 5,414,621 A | 5/1995 | Hough | |
| 5,584,025 A | 12/1996 | Keithley et al. | |
| 5,680,305 A | 10/1997 | Apgar, IV | |
| 5,754,850 A | 5/1998 | Janssen | |
| 5,794,216 A | 8/1998 | Brown | |
| 5,855,011 A | 12/1998 | Tatsuoka | |
| 5,857,174 A * | 1/1999 | Dugan | G06Q 30/06 705/313 |
| 6,115,694 A | 9/2000 | Cheetham et al. | |
| 6,178,406 B1 | 1/2001 | Cheetham et al. | |
| 6,240,425 B1 | 5/2001 | Naughton | |
| 6,260,033 B1 | 7/2001 | Tatsuoka | |
| 6,301,571 B1 | 10/2001 | Tatsuoka | |
| 6,397,208 B1 | 5/2002 | Lee | |
| 6,401,070 B1 | 6/2002 | McManus et al. | |
| 6,446,261 B1 | 9/2002 | Rosser | |
| 6,493,721 B1 | 12/2002 | Getchius et al. | |
| 6,597,983 B2 | 7/2003 | Hancock | |
| 6,609,118 B1 | 8/2003 | Khedkar et al. | |
| 6,615,187 B1 | 9/2003 | Ashenmil | |
| 6,618,715 B1 | 9/2003 | Johnson et al. | |
| 6,684,196 B1 * | 1/2004 | Mini | G06Q 30/02 705/14.34 |
| 6,760,707 B2 | 7/2004 | Provost | |
| 6,876,955 B1 | 4/2005 | Fleming et al. | |
| 6,877,015 B1 | 4/2005 | Kilgore et al. | |
| 6,915,206 B2 | 7/2005 | Sasajima | |
| 7,016,866 B1 | 3/2006 | Chin et al. | |
| 7,092,918 B1 | 8/2006 | Delurgio et al. | |
| 7,120,599 B2 | 10/2006 | Keyes | |
| 7,130,810 B2 | 10/2006 | Foster et al. | |
| 7,219,078 B2 | 5/2007 | Lamont et al. | |
| 7,249,146 B2 | 7/2007 | Brecher | |
| 7,289,965 B1 | 10/2007 | Bradley et al. | |
| 7,389,242 B2 * | 6/2008 | Frost | G06Q 10/10 705/313 |
| 7,454,355 B2 | 11/2008 | Milman et al. | |
| 7,461,265 B2 | 12/2008 | Ellmore | |
| 7,487,114 B2 | 2/2009 | Florance et al. | |
| 7,567,262 B1 | 7/2009 | Clemens et al. | |
| 7,636,687 B2 * | 12/2009 | Foster | G06Q 30/06 705/35 |
| 7,827,128 B1 | 1/2010 | Yan et al. | |
| 7,711,574 B1 | 5/2010 | Bradley et al. | |
| 7,725,359 B1 | 5/2010 | Katzfey et al. | |
| 7,783,562 B1 | 8/2010 | Ellis | |
| 7,788,186 B1 * | 8/2010 | An | G06Q 30/06 705/306 |
| 7,818,219 B2 * | 10/2010 | Klivington | G06Q 50/16 705/26.1 |
| 7,848,966 B2 | 12/2010 | Charuk et al. | |
| 7,933,798 B1 | 4/2011 | Yan et al. | |
| 7,962,353 B1 | 6/2011 | Menzies | |
| 7,970,674 B2 | 6/2011 | Cheng et al. | |
| 8,001,024 B2 | 8/2011 | Graboske et al. | |
| 8,015,091 B1 | 9/2011 | Ellis | |
| 8,032,401 B2 | 10/2011 | Choubey | |
| 8,051,089 B2 | 11/2011 | Gargi et al. | |
| 8,095,434 B1 | 1/2012 | Puttick et al. | |
| 8,140,421 B1 | 3/2012 | Humphries et al. | |
| 8,180,697 B2 | 5/2012 | Frischer | |
| 8,190,516 B2 | 5/2012 | Ghosh et al. | |
| 8,234,205 B1 * | 7/2012 | Harrington | G06Q 30/08 705/37 |
| 8,370,267 B2 | 2/2013 | Carey et al. | |
| 8,386,395 B1 | 2/2013 | Gordon et al. | |
| 8,401,877 B2 | 3/2013 | Salvagio | |
| 8,407,120 B1 | 3/2013 | Gordon et al. | |
| 8,433,512 B1 | 4/2013 | Lopatenko | |
| 8,473,347 B1 | 6/2013 | Koningstein | |
| 8,515,839 B2 * | 8/2013 | Ma | G06Q 30/0283 705/35 |
| 8,521,619 B2 | 8/2013 | Perry, III et al. | |
| 8,583,562 B1 | 11/2013 | McDaniel et al. | |
| 8,628,151 B1 | 1/2014 | Allen et al. | |
| 8,650,067 B1 | 2/2014 | Moss | |
| 8,660,919 B2 * | 2/2014 | Kasower | G06Q 30/0627 705/35 |
| 8,676,680 B2 | 3/2014 | Humphries et al. | |
| 8,688,461 B1 * | 4/2014 | Richards | G06Q 50/18 705/1.1 |
| 8,719,041 B2 * | 5/2014 | Veres | G06Q 30/0269 705/1.1 |
| 8,775,300 B2 | 7/2014 | Showalter | |
| 9,536,011 B1 | 1/2017 | Kirillov | |
| 9,605,704 B1 | 3/2017 | Humphries et al. | |
| 2002/0035520 A1 | 3/2002 | Weiss | |
| 2002/0052814 A1 * | 5/2002 | Ketterer | G06Q 40/00 705/35 |
| 2002/0082903 A1 | 6/2002 | Yasuzawa | |
| 2002/0087389 A1 * | 7/2002 | Sklarz | G06Q 30/02 705/7.34 |
| 2002/0188689 A1 | 12/2002 | Michael | |
| 2003/0004781 A1 | 1/2003 | Mallon et al. | |
| 2003/0046099 A1 | 3/2003 | Lamont et al. | |
| 2003/0055747 A1 * | 3/2003 | Carr | G06Q 30/06 705/26.1 |
| 2003/0078878 A1 | 4/2003 | Opsahl-Ong | |
| 2003/0078897 A1 | 4/2003 | Florance et al. | |
| 2003/0101063 A1 | 5/2003 | Sexton et al. | |
| 2003/0101074 A1 | 5/2003 | Suzuki et al. | |
| 2003/0110122 A1 | 6/2003 | Nalebuff et al. | |
| 2003/0115164 A1 | 6/2003 | Jeng | |
| 2003/0149658 A1 | 8/2003 | Rossbach et al. | |
| 2003/0191723 A1 | 10/2003 | Foretich et al. | |
| 2003/0212565 A1 | 11/2003 | Badali et al. | |
| 2004/0019517 A1 | 1/2004 | Sennott | |
| 2004/0030616 A1 | 2/2004 | Florance et al. | |
| 2004/0039629 A1 | 2/2004 | Hoffman et al. | |
| 2004/0049440 A1 | 3/2004 | Shinoda et al. | |
| 2004/0054605 A1 | 3/2004 | Whittet | |
| 2004/0073508 A1 * | 4/2004 | Foster | G06Q 10/06375 705/38 |
| 2004/0093270 A1 | 5/2004 | Gilbert | |
| 2004/0128215 A1 | 7/2004 | Florance et al. | |
| 2004/0153330 A1 | 8/2004 | Miller et al. | |
| 2004/0153663 A1 * | 8/2004 | Clark | G06Q 40/025 726/25 |
| 2004/0220872 A1 | 11/2004 | Pollock | |
| 2004/0243470 A1 | 12/2004 | Ozer et al. | |
| 2004/0254803 A1 | 12/2004 | Myr | |
| 2004/0267657 A1 | 12/2004 | Hecht | |
| 2005/0071376 A1 | 3/2005 | Modi | |
| 2005/0080702 A1 | 4/2005 | Modi | |
| 2005/0108084 A1 | 5/2005 | Ramamoorti et al. | |
| 2005/0154656 A1 | 7/2005 | Kim et al. | |
| 2005/0154657 A1 | 7/2005 | Kim et al. | |
| 2005/0154664 A1 * | 7/2005 | Guy | G06Q 40/00 705/35 |
| 2005/0187778 A1 | 8/2005 | Mitchell | |
| 2005/0192930 A1 * | 9/2005 | Hightower | G06Q 30/02 |
| 2005/0240429 A1 | 10/2005 | Dieden et al. | |
| 2005/0254803 A1 | 11/2005 | Ono | |
| 2005/0288942 A1 | 12/2005 | Graboske et al. | |
| 2005/0288957 A1 | 12/2005 | Eraker et al. | |
| 2006/0015357 A1 * | 1/2006 | Cagan | G06Q 30/0278 705/306 |
| 2006/0020424 A1 | 1/2006 | Quindel | |
| 2006/0080114 A1 | 4/2006 | Bakes et al. | |
| 2006/0085210 A1 | 4/2006 | Owens | |
| 2006/0089842 A1 | 4/2006 | Medawar | |
| 2006/0105342 A1 | 5/2006 | Villena et al. | |
| 2006/0122918 A1 | 6/2006 | Graboske et al. | |

(56) References Cited

U.S. PATENT DOCUMENTS

| | | | |
|---|---|---|---|
| 2006/0167710 A1* | 7/2006 | King | G06Q 30/0601 |
| | | | 705/313 |
| 2006/0248555 A1 | 11/2006 | Eldering | |
| 2006/0287810 A1 | 12/2006 | Sadri et al. | |
| 2007/0005373 A1 | 1/2007 | Villena et al. | |
| 2007/0043770 A1* | 2/2007 | Goodrich | G06Q 30/00 |
| 2007/0050342 A1 | 3/2007 | Inkinen et al. | |
| 2007/0067180 A1 | 3/2007 | James et al. | |
| 2007/0106523 A1 | 5/2007 | Eaton et al. | |
| 2007/0124235 A1 | 5/2007 | Chakraborty et al. | |
| 2007/0132727 A1 | 6/2007 | Garbow et al. | |
| 2007/0143132 A1 | 6/2007 | Linne et al. | |
| 2007/0143312 A1* | 6/2007 | Wiseman | G06F 16/9535 |
| 2007/0150353 A1 | 6/2007 | Krassner | |
| 2007/0244780 A1 | 10/2007 | Liu | |
| 2007/0255581 A1 | 11/2007 | Otto et al. | |
| 2007/0265960 A1 | 11/2007 | Advani | |
| 2008/0004893 A1 | 1/2008 | Graboske et al. | |
| 2008/0015890 A1 | 1/2008 | Malyala | |
| 2008/0027857 A1* | 1/2008 | Benson | G06Q 40/025 |
| | | | 705/38 |
| 2008/0077458 A1 | 3/2008 | Andersen et al. | |
| 2008/0086356 A1 | 4/2008 | Glassman et al. | |
| 2008/0109409 A1 | 5/2008 | Hengel | |
| 2008/0133319 A1 | 6/2008 | Adiga et al. | |
| 2008/0183598 A1* | 7/2008 | Carr | G06Q 30/06 |
| | | | 705/26.1 |
| 2008/0255921 A1 | 10/2008 | Flake et al. | |
| 2008/0288335 A1 | 11/2008 | Goldberg | |
| 2008/0301064 A1 | 12/2008 | Burns | |
| 2008/0312942 A1 | 12/2008 | Katta et al. | |
| 2009/0006185 A1 | 1/2009 | Stinson | |
| 2009/0030707 A1 | 1/2009 | Green | |
| 2009/0030864 A1 | 1/2009 | Pednault et al. | |
| 2009/0037328 A1 | 2/2009 | Abuaf | |
| 2009/0043603 A1 | 2/2009 | Rutherford et al. | |
| 2009/0043637 A1 | 2/2009 | Eder | |
| 2009/0048938 A1 | 2/2009 | Dupray | |
| 2009/0076902 A1 | 3/2009 | Grinsted et al. | |
| 2009/0132316 A1 | 5/2009 | Florance et al. | |
| 2009/0144097 A1 | 6/2009 | Fassio et al. | |
| 2009/0150216 A1 | 6/2009 | Milman et al. | |
| 2009/0164464 A1 | 6/2009 | Carrico et al. | |
| 2009/0210287 A1 | 8/2009 | Chickering et al. | |
| 2009/0240586 A1 | 9/2009 | Ramer et al. | |
| 2009/0265285 A1 | 10/2009 | Balaishis | |
| 2009/0287596 A1 | 11/2009 | Torrenegra | |
| 2010/0005019 A1 | 1/2010 | Yang et al. | |
| 2010/0023379 A1 | 1/2010 | Rappaport | |
| 2010/0076881 A1 | 3/2010 | O'Grady | |
| 2010/0094548 A1 | 4/2010 | Tadman et al. | |
| 2010/0114678 A1 | 5/2010 | Axe et al. | |
| 2010/0161471 A1 | 6/2010 | Fendick | |
| 2010/0161498 A1 | 6/2010 | Walker | |
| 2010/0318451 A1 | 12/2010 | Niccolini | |
| 2011/0047083 A1 | 2/2011 | Lawler | |
| 2011/0066510 A1 | 3/2011 | Talegon | |
| 2011/0066561 A1 | 3/2011 | Lazarre et al. | |
| 2011/0071899 A1 | 3/2011 | Robertson et al. | |
| 2011/0196762 A1 | 8/2011 | DuPont | |
| 2011/0218934 A1 | 9/2011 | Elser | |
| 2011/0218937 A1 | 9/2011 | Elser | |
| 2011/0251967 A1* | 10/2011 | Klivington | G06Q 30/06 |
| | | | 705/313 |
| 2011/0251974 A1 | 10/2011 | Woodward et al. | |
| 2011/0270779 A1 | 11/2011 | Showalter | |
| 2012/0005111 A2 | 1/2012 | Lowenstein et al. | |
| 2012/0011075 A1 | 1/2012 | Graboske et al. | |
| 2012/0030092 A1 | 2/2012 | Marshall et al. | |
| 2012/0072357 A1 | 3/2012 | Bradford et al. | |
| 2012/0078770 A1 | 3/2012 | Hecht | |
| 2012/0158459 A1 | 6/2012 | Villena et al. | |
| 2012/0191541 A1 | 7/2012 | Yang et al. | |
| 2012/0254045 A1* | 10/2012 | Orfano | G06Q 30/06 |
| | | | 705/306 |
| 2012/0311431 A1 | 12/2012 | Breaker et al. | |
| 2012/0323798 A1 | 12/2012 | Den Herder et al. | |
| 2012/0330719 A1 | 12/2012 | Malaviya et al. | |
| 2013/0041841 A1 | 2/2013 | Lyons | |
| 2013/0103459 A1 | 4/2013 | Marshall et al. | |
| 2013/0159166 A1 | 6/2013 | Irick | |
| 2013/0275252 A1 | 10/2013 | Martin et al. | |
| 2013/0304654 A1 | 11/2013 | Ma et al. | |
| 2013/0332877 A1 | 12/2013 | Florance et al. | |
| 2013/0339255 A1 | 12/2013 | Taibird | |
| 2014/0012720 A1 | 1/2014 | O'Kane | |
| 2014/0180936 A1 | 6/2014 | Ma et al. | |
| 2014/0236845 A1 | 8/2014 | Humphries et al. | |
| 2014/0257924 A1 | 9/2014 | Xie | |
| 2014/0279692 A1 | 9/2014 | Boothby et al. | |
| 2014/0316857 A1 | 10/2014 | Roberts | |
| 2014/0316999 A1 | 10/2014 | Cheng et al. | |
| 2014/0372203 A1 | 12/2014 | Powell et al. | |
| 2015/0006311 A1 | 1/2015 | Murugappan et al. | |
| 2015/0006605 A1 | 1/2015 | Chu et al. | |
| 2015/0012335 A1 | 1/2015 | Xie et al. | |
| 2015/0066834 A1 | 3/2015 | Jeffries | |
| 2015/0088766 A1 | 3/2015 | Krause | |
| 2015/0149275 A1 | 5/2015 | Bax et al. | |
| 2015/0242747 A1 | 8/2015 | Packes et al. | |
| 2015/0269264 A1 | 9/2015 | Bolen | |
| 2015/0356576 A1 | 12/2015 | Malaviya et al. | |
| 2015/0379588 A1 | 12/2015 | Ma et al. | |
| 2016/0048934 A1 | 2/2016 | Gross | |
| 2016/0171622 A1 | 6/2016 | Perkins et al. | |
| 2016/0292800 A1 | 10/2016 | Smith | |
| 2018/0232787 A1* | 8/2018 | Dupray | G06Q 30/02 |
| 2020/0334279 A1 | 10/2020 | Daimler et al. | |
| 2020/0349176 A1 | 11/2020 | Daimler et al. | |

FOREIGN PATENT DOCUMENTS

| | | | |
|---|---|---|---|
| WO | WO-9524687 | 3/1995 | |
| WO | WO-0041119 A1 * | 7/2000 | G06Q 30/0277 |
| WO | WO-0055771 A1 | 9/2000 | |
| WO | WO-0211038 A1 | 2/2002 | |
| WO | WO-0242980 A1 | 5/2002 | |
| WO | WO-03100692 A1 | 12/2003 | |
| WO | WO-2005015441 A2 | 2/2005 | |
| WO | WO-2006025830 A1 | 3/2006 | |
| WO | WO-2006043951 A2 | 4/2006 | |
| WO | WO-2007051892 A1 | 5/2007 | |
| WO | WO2014137510 | 9/2014 | |

OTHER PUBLICATIONS

Visa, "Card-Not-Present Security—A Multi-Layered Approach to Payment Card Security," www.tdcanadatrust.com (Year: 2006).*
Final Office Action for U.S. Appl. No. 13/828,680, dated Jan. 3, 2020, 60 pages.
Final Office Action for U.S. Appl. No. 14/709,719, dated Dec. 2, 2019, 35 pages.
Non-Final Office Action for U.S. Appl. No. 14/846,632, dated Nov. 29, 2019, 24 pages.
Non-Final Office Acton for U.S. Appl. No. 16/235,009, dated Jan. 24, 2020, 18 pages.
Final Office Action for U.S. Appl. No. 14/709,719, dated Aug. 3, 2018, 27 pages.
Non-Final Office Action for U.S. Appl. No. 13/843,577, dated Aug. 30, 2018, 63 pages.
U.S. Appl. No. 16/125,318 of Humphries filed Sep. 7, 2018.
U.S. Appl. No. 16/129,282 of Humphries filed Sep. 12, 2018.
U.S. Appl. No. 16/235,009 for Humphnes, filed Dec. 28, 2018.
Non-Final Office Action for U.S. Appl. No. 14/041,450, dated Jan. 8, 2019, 23 pages.
Final Office Action for U.S. Appl. No. 14/640,860, dated Oct. 23, 2018, 85 pages.
Final Office Action for U.S. Appl. No. 14/721,437, dated Nov. 9, 2018, 84 pages.

(56) References Cited

OTHER PUBLICATIONS

Non-Final Office Action for U.S. Appl. No. 12/924,037, dated Nov. 7, 2018, 10 pages.
Notice of Allowance for U.S. Appl. No. 13/044,490, dated Dec. 5, 2018, 6 pages.
Readyratios.com, "Cost Approach to Value," https://www.readyratios.com/reference/appraisal/cost_approach_to_value.html, archived on Jul. 16, 2013, https://web.archive.org/web/20130716153950/https:www.readyratios.com/reference/appraisal/cost_approach_to_value.html, viewed Oct. 30, 2018, p. 1.
Final Office Action for U.S. Appl. No. 13/044,480, dated Dec. 14, 2018, 35 pages.
Non-Final Office Action for U.S. Appl. No. 14/325,094, dated Dec. 18, 2018, 95 pages.
Non-Final Office Action for U.S. Appl. No. 14/846,632, dated Dec. 26, 2018, 13 pages.
U.S. Appl. No. 16/178,457 for Martin et al., filed Nov. 1, 2018.
U.S. Appl. No. 16/457,390 for Shahbazi et al., filed Jun. 28, 2019.
Blelloch, G.E., "Prefix Sums and Their Applications," School of Computer Science, Carnegie Mellon University, 26 pages.
De Floriani, L. et al., "Algorithms for visibiliyt computation on terrains: a survey," Environment and Planning B: Planning and Design 2003, vol. 30, pp. 709-728.
Final Office Action for U.S. Appl. No. 14/041,450, dated Sep. 24, 2019, 22 pages.
Final Office Action for U.S. Appl. No. 14/846,632, dated Aug. 6, 2019, 16 pages.
Manski, C et al., "Monotone Instrumental Variables: With an Application to the Returns to Schooling," Econometrica 68 (Jul. 2000) pp. 997-1010.
Non-Final Office Action for U.S. Appl. No. 14/640,860, dated Sep. 6, 2019, 83 pages.
Non-Final Office Action for U.S. Appl. No. 14/721,437, dated Aug. 22, 2019, 84 pages.
Non-Final Office Action for U.S. Appl. No. 15/446,283, dated Oct. 10, 2019, 21 pages.
Non-Final Office Action for U.S. Appl. No. 15/439,388, dated Oct. 18, 2019, 76 pages.
Non-Final Office Action for U.S. Appl. No. 15/698,276, dated Oct. 16, 2019, 34 pages.
Notice of Allowance for U.S. Appl. No. 14/704,567, dated Oct. 15, 2019, 17 pages.
Oladunni, T et al., "Predictive Real Estate Multiple Listing System Using MVC Architecture and Linear Regression," ISCA 24th International Conference on Software Engineering and Data Engineering, 2015.
Oladunni, T. et al., "Hedonic Housing Theory—A Machine Learning Investigation," 2016.
Travis, M.R. et al., "VIEWIT: computation of seen areas, slope, and aspect for land-use planning," Pacific Southwest Forest and Range Experiment Station, PWS-Nov. 1975, 11 pages.
Van Kreveld, M., "Variations on Sweep Algorithms: efficient computation of extended viewsheds and class intervals," Dept. of Computer Science, Utrecth University, 14 pages.
Wen, H.Z et al.. "An improved method of real estate evaluation based on Hedonic price model," IEEE International Engineering Management Conference, 2004.
Zurowski, B, "Essays in Social and Behavioral Economics," Retrieved from the University of Minnesota Digital Conservancy, http://hdl.handle.net/11299/175495, 2015.
Eamer, M., "ZipRealty and Redfin Integrate with Zillow's API," via the Wayback Machine as published on Oct. 23, 2006.
Gudell, Svenja, "One More Advance in Creating a Better Price-to-Rent Ratio", retrieved from the Internet, URL: https://www.zillow.com/research/one-more-advance-in-creating-a-better-price-to-rent-ratio-2968, Jul. 27, 2012, 4 pages.
Kottle, M.L., Zillow traffic up after shift; site known for real estate prices decided to add for-sale listings. San Francisco Chronicle.
Non-Final Office Action for U.S. Appl. No. 11/927,623, dated Nov. 5, 2019, 18 pages.
Non-Final Office Action for U.S. Appl. No. 14/325,094, dated Nov. 4, 2019, 58 pages.
Non-Final Office Action for U.S. Appl. No. 14/524,148, dated Nov. 1, 2019, 44 pages.
U.S. Appl. No. 16/665,426 for Humphries et al., filed Oct. 28, 2019.
Final Office Action for U.S. Appl. No. 14/325,094, dated Jun. 7, 2019, 58 pages.
Final Office Action for U.S. Appl. No. 11/927,623, dated Jun. 14, 2019, 18 pages.
Non-Final Office Action for U.S. Appl. No. 14/704,567, dated Apr. 1, 2019, 29 pages.
Non-Final Office Action for U.S. Appl. No. 14/709,719, dated Jun. 3, 2019, 29 pages.
Notice of Allowance for U.S. Appl. No. 12/924,037, dated Apr. 24, 2019, 11 pages.
Non-Final Office Action for U.S. Appl. No. 13/828,680, dated Jul. 1, 2019, 63 pages.
Notice of Allowance for U.S. Appl. No. 13/044,480, dated Jun. 26, 2019, 17 pages.
U.S. Appl. No. 16/449,210 for Flint et al., filed Jun. 21, 2019.
Final Office Action for U.S. Appl. No. 16/235,009, dated Jul. 13, 2020; 21 pages.
Final Office Action for U.S. Appl. No. 16/125,318, dated Aug. 25, 2020, 25 pages.
Igan et al., "Global Housing Cycles," IMF Working Paper, Aug. 2012, pp. 1-55.
Non-Final Office Action for U.S. Appl. No. 11/927,623, dated Nov. 12, 2020, 19 pages.
Non-Final Office Action for U.S. Appl. No. 13/828,680, dated Jul. 27, 2020, 66 pages.
Non-Final Office Action for U.S. Appl. No. 14/325,094, dated Aug. 10, 2020, 53 pages.
Non-Final Office Action for U.S. Appl. No. 14/524,148, dated Aug. 3, 2020, 65 pages.
Non-Final Office Action for U.S. Appl. No. 14/709,719, dated Sep. 4, 2020, 38 pages.
Notice of Allowance for U.S. Appl. No. 14/846,632, dated Sep. 16, 2020, 11 pages.
U.S. Appl. No. 17/002,969 for Bruce et al., filed Aug. 26, 2020.
U.S. Appl. No. 17/025,330 for Abdallah et al., filed Sep. 18, 2020.
U.S. Appl. No. 15/996,787 of VanderMay, filed Jun. 4, 2018.
Archer, W.R. et al., "Measuring the Importance of Location in House Price Appreciation", J. of Urban Economics, vol. 40, 1996, pp. 334-353, accessible at https://www.sciencedirect.com/science/article/pii/S0094119096900364 (accessed Feb. 26, 2018). (Year: 1996).
Campbell, "Forced Sales and House Prices", 101 American Economic Review 2108, pp. 2108-2131, Aug. 2011.
Clauretie, "Estimating the House Foreclosure Discount Corrected for Spatial Price Interdependence and Endogeneity of Marketing Time", 37 Real Estate Economics 43, pp. 44-48, 2009.
Final Office Action for U.S. Appl. No. 14/041,4560, dated Jun. 29, 2018, 14 pages.
Final Office Action for U.S. Appl. No. 14/704,567, dated May 1, 2018, 24 pages.
Final Office Action for U.S. Appl. No. 12/924,037, dated Jun. 7, 2018, 19 pages.
Final Office Action for U.S. Appl. No. 14/325,094, dated Jun. 5, 2018, 81 pages.
Final Office Action for U.S. Appl. No. 14/524,148, dated Jul. 19, 2018, 54 pages.
Final Office Action for U.S. Appl. No. 13/828,680, dated Jul. 11, 18, 59 pages.
Final Office Action for U.S. Appl. No. 14/846,632, dated Jun. 11, 2018, 16 pages.
Gelfand, A.E. et al., "The Dynamics of Location in Home Price," J. of Real Estate Fin. and Econ., vol. 29:2, 2004, pp. 149-166, accessible at https://link.springer.com/content/pdf/10.1023%2FB%3AREAL.0000035308.15346.0a, pdf (accessed Feb. 26, 2018). (Year: 2004).
Humphries, S., "Foreclosure Liquidations Abate in the Fourth Quarter But at the Expense of Number of Homes Underwater," Zillow Research, Feb. 8, 2011, 3 pages.

(56) References Cited

OTHER PUBLICATIONS

Non-Final Office Action for U.S. Appl. No. 13/044,480, dated May 2, 2018, 51 pages.
Non-Final Office Action for U.S. Appl. No. 13/044,490, dated Jan. 24, 2018, 8 pages.
Non-Final Office Action for U.S. Appl. No. 11/927,623, dated Mar. 26, 2018, 15 pages.
Non-Final Office Action for U.S. Appl. No. 14/709,719, dated Jan. 31, 2018, 11 pages.
Non-Final Office Action for U.S. Appl. No. 14/640,860, dated Mar. 7, 2018, 141 pages.
Non-Final Office Action for U.S. Appl. No. 13/830,497, dated Apr. 12, 2018, 48 pages.
Notice of Allowance for U.S. Appl. No. 13/044,490, dated May 22, 2018, 8 pages.
Notice of Allowance for U.S. Appl. No. 14/167,962, dated Apr. 9, 2018, 11 pages.
Notice of Allowance for U.S. Appl. No. 14/167,962, dated May 14, 2018, 8 pages.
Quercia, R.G. et al., "Spatio-Temporal Measurement of House Price Appreciation in Underserved Areas," J. of Housing Research, vol. 11, 2000, available at https://pdfs.semanticscholar.org/3a44/ddfbc508f61f8952d7e440c37cfdfaf441 ba.pdf (accessed Feb. 26, 2018). (Year: 2000).
Roth, JD, "Is it Better to Rent or to Buy?" Time Business, Dec. 3, 2012, 2 pages.
"2002 Inman Innovator Award Nominees Announced," PR Newswire, Jul. 16, 2002, 3 pages.
"About Reis, Products & Services," [online], Retrieved from the Internet via the Wayback Machine dated Feb. 5, 2002 on Jun. 13, 2013, URL: http://reis.com/about/aboutproducts_rentcomps.cfm, 2 pages.
"An Introduction to R," <http://web.archive.org/web/20060118050840/http://cran.r-project.org/doc/manuals/R-intro.html>, [internet archive date: Jan. 18, 2006], pp. 1-105.
"Banton Technologies Announces National Home Evaluation Coverage; Company's ValueWizard 3.0 Assesses All Regions of the United States," Business Wire, Jun. 10, 2003, [online] Retrieved from the Internet: URL: http://www.the free library.com/_/print/PrintArticle.aspx?id=102949279, 2 pages.
"Basis100 Partners to Offer Automated Valuation Service," Canada StockWatch, Jan. 27, 2004, 2 pages.
"Basis100 Partners with First American," PR Newswire, Jan. 27, 2004, 3 pages.
"Casa(TM) to Value More Than $100 Billion of Residential Real Estate in 2001—Leading Lenders Saving Big without Compromising Loan Quality," PR Newswire, May 21, 2001, 3 pages.
"Centre for Mathematical Sciences," Lund University, http://web.archive.org/web/20060101005103/http://www.maths.lth.se/, [internet archive date: Jan. 1, 2006], 1 page.
"Directory of Valuation Providers, Your Source for Valuation Information," Zackin Publications Inc., 2004, 5 pages.
"First American Expands Real Estate Valuation Line, Aims to Increase Accuracy with Addition of Veros, Basis100 AVMs," Inman News, Mar. 15, 2004, 2 pages.
"First American Real Estate Solutions Experiences Record," PR Newswire, Nov. 4, 2002, 3 pages.
"First American Real Estate Solutions Releases ValuePoint4," PR Newswire, Oct. 21, 2002, 3 pages.
"First American Real Estate Solutions' ValuePoint(R)4 Experiences Explosive Growth in 2004—Leading Automated Valuation Model (AVM) Usage Grows More Than 700 Percent in 12-Month Period," PR Newswire, Mar. 24, 2005, 3 pages.
"Franchise Offering Circular for Prospective Franchisees," U.S. Appraisal, Nov. 1, 1986, 87 pages.
"GMAC-RFC Selects First American Real Estate Solutions' ValuePoint(R)4 Automated Valuation Model (AVM)," PR Newswire, Jun. 28, 2004, 3 pages.

"HNC Software and RealQuest Team to Provide Widespread Automated Property Valuation; AREAS Users to Have Online Access to Texas MLS," Business Wire, Oct. 1, 1997, 3 pages.
"HomeAdvisor Ranks First In Gomez Poll," Realty Times, Jun. 13, 2001, 3 pages.
"HomeAdvisor Spin-Off Aims to Service Realty Industry," Directions on Microsoft, Apr. 24, 2000, 2 pages.
"HomeSeekers.com and MSN HomeAdvisor Provide Free Web Pages For All Real Estate Agents," PR Newswire, May 20, 1999, 3 pages.
"How do we value your home?," [online] CSWOnline, Retrieved from the Internet via the Wayback Machine dated Oct. 23, 1999, URL: http://w w w .csw online.com/method.shtml, 1 page.
"In Brief: HomeAdvisor Secures $100 Million in Equity Funding," Directions on Microsoft, Aug. 28, 2000, 1 page.
"Microsoft Real Estate Venture Gets Large Investment," The New York Times, Technology section, Aug. 23, 2000, 2 pages.
"MSN HomeAdvisor Becomes Most-Visited Home and Real Estate Web Site, According to Media Metrix," Microsoft News Center, Apr. 13, 2001, Retrieved from the Internet: URL: http://www.microsoft.com/enus/ news/press/2001/Apr01/04-13MarchTrafficPR.aspx?navV3Index=0, 2 pages.
"MSN HomeAdvisor Helps Real Estate Agents and Customers Feel Right at Home on the Internet," Microsoft News Center, Dec. 14, 1998, Retrieved from the Internet: URL: http://www.microsoft.com/enus/ news/features/1998/12-14msn.aspx?navV3Index=0, 2 pages.
"Nation's First Fully Interactive AVM Debuts in Las Vegas AVM News," PRweb press release, AVM News, Feb. 4, 2006, 1 page.
"NetNumina Solutions Creates Robust E-Business Solution for Leader in Real Estate Lending," PR Newswire, Aug. 16, 1999, 3 pages.
"Reis Inc.," Commercial Property News, vol. 18, Issue 6, Mar. 16, 2004, 2 pages.
"Reis, Inc. Launches Apartment Version of Online Valuation and Credit Risk Analysis Module," Business Wire, Nov. 7, 2002, 2 pages.
"RMBS: Guidelines for the Use of Automated Valuation Models for U.K. RMBS Transactions," Standard and Poors.com [online], Sep. 26, 2005 [retrieved Aug. 6, 2013], Retrieved from the Internet, S&P Archive: URL: www.standardandpoors.com/prot/ratings/articles/en/us/?articleType=HTML&assetID=1245330509010, 4 pages.
"Sample CASA Report," [online] CSWOnline, Retrieved from the Internet via the Wayback Machine dated Nov. 6, 1999, URL: http://w w w .csw online.com/sample.shtml, 3 pages.
"Standard on Automated Valuation Models (AVMs)", International Association of Assessing Officers, Approved Sep. 2003, 36 pages.
"The Appraisal" Report, U.S.Appraisal, dated at least by Sep. 29, 1983, 4 pages.
"The Appraiser," Certificate of Copyright Registration, Jun. 25, 1982, 4 pages.
"The Appraiser," Certificate of Copyright Registration, Oct. 19, 1981, 3 pages.
"The Assessor" Demo Video, U.S.Appraisal, [Accessed for review on Jun. 21, 2013, *Zillow Inc.* vs. *Trulia* Case No. 2:12-cv-01549-JLR], [Transcribed Oct. 8, 2013], 10 pages.
"The Assessor" Newsletter, US Appraisal, dated at least by Apr. 10, 1985, 4 pages.
"The Assessor" Source Code, U.S.Appraisal, [Accessed for review on Jun. 21, 2013, *Zillow Inc.* vs. *Trulia* Case No. 2:12-cv-01549-JLR], 2,460 pages.
"The Assessor," Certificate of Copyright Registration, Feb. 2, 1984, 2 pages.
"The Comprehensive R Archive Network,", www.cran.r-project.org, http://web.archive.org/web/20050830073913/cran.r-project.org/banner.shtml, [internet archive date: Aug. 30, 2005], pp. 1-2.
"The R Project for Statistical Computing," www.r-project.org, http://web.archive.org/web/20060102073515/www.r-project.org/main.shtml, [internet archive date: Jan. 2, 2006], 1 page.
"TransUnion Acquires Banton Technologies," PR Newswire, Oct. 20, 2003, 3 pages.
"TransUnion and CSW Form Partnership," Mortgage Banking, vol. 62, Issue 6, Mar. 31, 2002, 1 page.

(56) References Cited

OTHER PUBLICATIONS

"Trulia Estimates," [online], Retrieved from the Internet via the Wayback Machine dated Jan. 16, 2013, URL:http//www.trulia.com/trulia_estimates/, 2 pages.
"Uniform Standards of Professional Appraisal Practice and Advisory Opinions 2005 Editions<" Electronic USPAP 2005 Edition, Appraisal Standards Board, The Appraisal Foundation, Effective Jan. 1, 2005, 10 pages.
"USPAP Q&A," vol. 9, No. 6, The Appraisal Foundation, Jun. 2007, 2 pages.
"What Is an AVM?", Real-Info.com [online], Dec. 22, 2005 [retrieved on Aug. 6, 2013], Retrieved from the Internet via Internet Archive Wayback Machine: URL: web.arch ive.org/web/20051222120807/http://www.real-info.com/products_avm.asp?RISID=e8fc23a9a1189fbff9b9b8e8f86ccde6], 3 pages.
Xactware Unveils Web-Based Valuation Tool for Underwriting, PR Newswire, Dec. 10, 2002, 3 pages.
"Xactware. (Central Utah)," Utah Business, vol. 17, Issue 3, Mar. 1, 2003, 1 page.
U.S. Appl. No. 11/927,623 of Humphries et al., filed Oct. 29, 2007.
U.S. Appl. No. 12/924,037 of Flint et al., filed Sep. 16, 2010.
U.S. Appl. No. 13/044,480 of Humphries et al., filed Mar. 9, 2011.
U.S. Appl. No. 13/044,490 of Humphries et al., filed Mar. 9, 2011.
U.S. Appl. No. 13/828,680 of Humphries et al., filed Mar. 14, 2013.
U.S. Appl. No. 13/830,497 of Humphries et al., filed Mar. 14, 2013.
U.S. Appl. No. 13/843,577 of Humphries et al., filed Mar. 15, 2013.
U.S. Appl. No. 14/041,450 of Humphries et al., filed Sep. 30, 2013.
U.S. Appl. No. 14/078,076 of Daimler et al., filed Nov. 12, 2013.
U.S. Appl. No. 14/325,094 of Bruce et al., filed Jul. 7, 2014.
U.S. Appl. No. 14/524,148 of Humphries et al., filed Oct. 27, 2014.
U.S. Appl. No. 14/640,860 of Rao et al., filed Mar. 6, 2015.
U.S. Appl. No. 14/704,567 of Wang et al., filed May 5, 2015.
U.S. Appl. No. 14/709,719 of Humphries et al., filed May 12, 2015.
U.S. Appl. No. 14/721,437 of Humphries et al., filed May 26, 2015.
U.S. Appl. No. 15/439,388 of Bruce et al., filed Feb. 22, 2017.
U.S. Appl. No. 15/456,235 of VanderMey, filed Mar. 10, 2017.
U.S. Appl. No. 15/698,276 of Humphries et al., filed Sep. 7, 2017.
U.S. Appl. No. 15/715,098 of Moghimi, filed Sep. 25, 2017.
Appeal Brief for U.S. Appl. No. 11/524,048, filed Aug. 9, 2010, 20 pages.
Assignment of Copyright to U.S. Appraisal by Flying Software, Inc., Jan. 2, 1982, 2 pages.
Australian Examiner's First Report in Australian Patent Application 2007216858, dated Dec. 22, 2008, 2 pages.
AVM News, Thomson Media, vol. 1, Issue 1 Jan. 2002, 23 pages.
AVM News, Thomson Media, vol. 1, Issue 10, Oct. 2002, 34 pages.
AVM News, Thomson Media, vol. 1, Issue 11, Nov. 2002, 28 pages.
AVM News, Thomson Media, vol. 1, Issue 12, Dec. 2002, 14 pages.
AVM News, Thomson Media, vol. 1, Issue 2, Feb. 2002, 13 pages.
AVM News, Thomson Media, vol. 1, Issue 3, Mar. 2002, 21 pages.
AVM News, Thomson Media, vol. 1, Issue 4, Apr. 2002, 24 pages.
AVM News, Thomson Media, vol. 1, Issue 5, May 2002, 35 pages.
AVM News, Thomson Media, vol. 1, Issue 6, Jun. 2002, 19 pages.
AVM News, Thomson Media, vol. 1, Issue 7, Jul. 2002, 24 pages.
AVM News, Thomson Media, vol. 1, Issue 8, Aug. 2002, 17 pages.
AVM News, Thomson Media, vol. 1, Issue 9, Sep. 2002, 15 pages.
AVM News, Thomson Media, vol. 10, Issue 1-2, Jan.-Feb. 2011, 72 pages.
AVM News, Thomson Media, vol. 10, Issue 11-12, Nov.-Dec. 2011, 70 pages.
AVM News, Thomson Media, vol. 10, Issue 3-4, Mar.-Apr. 2011, 100 pages.
AVM News, Thomson Media, vol. 10, Issue 5-6, May-Jun. 2011, 106 pages.
AVM News, Thomson Media, vol. 10, Issue 7-8, Jul.-Aug. 2011, 82 pages.
AVM News, Thomson Media, vol. 10, Issue 9-10, Sep.-Oct. 2011, 90 pages.
AVM News, Thomson Media, vol. 11, Issue 1-2, Jan.-Feb. 2012, 66 pages.
AVM News, Thomson Media, vol. 11, Issue 3-4, Mar.-Apr. 2012, 76 pages.
AVM News, Thomson Media, vol. 11, Issue 5-6, May-Jun. 2012, 72 pages.
AVM News, Thomson Media, vol. 2, Issue 1, Jan. 2003, 24 pages.
AVM News, Thomson Media, vol. 2, Issue 10, Oct. 2003, 31 pages.
AVM News, Thomson Media, vol. 2, Issue 11, Nov. 2003, 28 pages.
AVM News, Thomson Media, vol. 2, Issue 12, Dec. 2003, 18 pages.
AVM News, Thomson Media, vol. 2, Issue 2, Feb. 2003, 26 pages.
AVM News, Thomson Media, vol. 2, Issue 3, Mar. 2003, 29 pages.
AVM News, Thomson Media, vol. 2, Issue 4, Apr. 2003, 22 pages.
AVM News, Thomson Media, vol. 2, Issue 5, May 2003, 33 pages.
AVM News, Thomson Media, vol. 2, Issue 6, Jun. 2003, 38 pages.
AVM News, Thomson Media, vol. 2, Issue 7, Jul. 2003, 31 pages.
AVM News, Thomson Media, vol. 2, Issue 8, Aug. 2003, 24 pages.
AVM News, Thomson Media, vol. 2, Issue 9, Sep. 2003, 30 pages.
AVM News, Thomson Media, vol. 3, Issue 1, Jan. 2004, 24 pages.
AVM News, Thomson Media, vol. 3, Issue 10, Oct. 2004, 55 pages.
AVM News, Thomson Media, vol. 3, Issue 11, Nov. 2004, 54 pages.
AVM News, Thomson Media, vol. 3, Issue 12, Dec. 2004, 18 pages.
AVM News, Thomson Media, vol. 3, Issue 2, Feb. 2004, 26 pages.
AVM News, Thomson Media, vol. 3, Issue 3, Mar. 2004, 31 pages.
AVM News, Thomson Media, vol. 3, Issue 4, Apr. 2004, 36 pages.
AVM News, Thomson Media, vol. 3, Issue 5, May 2004, 37 pages.
AVM News, Thomson Media, vol. 3, Issue 6, Jun. 2004, 35 pages.
AVM News, Thomson Media, vol. 3, Issue 7, Jul. 2004, 49 pages.
AVM News, Thomson Media, vol. 3, Issue 8, Aug. 2004, 37 pages.
AVM News, Thomson Media, vol. 3, Issue 9, Sep. 2004, 31 pages.
AVM News, Thomson Media, vol. 4, Issue 1, Jan. 2005, 45 pages.
AVM News, Thomson Media, vol. 4, Issue 10, Oct. 2005, 51 pages.
AVM News, Thomson Media, vol. 4, Issue 11, Nov. 2005, 52 pages.
AVM News, Thomson Media, vol. 4, Issue 12, Dec. 2005, 56 pages.
AVM News, Thomson Media, vol. 4, Issue 2, Feb. 2005, 31 pages.
AVM News, Thomson Media, vol. 4, Issue 3, Mar. 2005, 39 pages.
AVM News, Thomson Media, vol. 4, Issue 4, Apr. 2005, 40 pages.
AVM News, Thomson Media, vol. 4, Issue 5, May 2005, 51 pages.
AVM News, Thomson Media, vol. 4, Issue 6, Jun. 2005, 34 pages.
AVM News, Thomson Media, vol. 4, Issue 7, Jul. 2005, 53 pages.
AVM News, Thomson Media, vol. 4, Issue 8, Aug. 2005, 30 pages.
AVM News, Thomson Media, vol. 4, Issue 9, Sep. 2005, 48 pages.
AVM News, Thomson Media, vol. 5, Issue 1, Jan. 2006, 58 pages.
AVM News, Thomson Media, vol. 5, Issue 10, Oct. 2006, 85 pages.
AVM News, Thomson Media, vol. 5, Issue 11, Nov. 2006, 86 pages.
AVM News, Thomson Media, vol. 5, Issue 12, Dec. 2006, 54 pages.
AVM News, Thomson Media, vol. 5, Issue 2, Feb. 2006, 53 pages.
AVM News, Thomson Media, vol. 5, Issue 3, Mar. 2006, 41 pages.
AVM News, Thomson Media, vol. 5, Issue 4, Apr. 2006, 54 pages.
AVM News, Thomson Media, vol. 5, Issue 5, May 2006, 48 pages.
AVM News, Thomson Media, vol. 5, Issue 6, Jun. 2006, 62 pages.
AVM News, Thomson Media, vol. 5, Issue 7, Jul. 2006, 74 pages.
AVM News, Thomson Media, vol. 5, Issue 8, Aug. 2006, 57 pages.
AVM News, Thomson Media, vol. 5, Issue 9, Sep. 2006, 63 pages.
AVM News, Thomson Media, vol. 6 Issue 3, Mar. 2007, 49 pages.
AVM News, Thomson Media, vol. 6, Issue 1, Jan. 2007, 42 pages.
AVM News, Thomson Media, vol. 6, Issue 10, Oct. 2007, 52 pages.
AVM News, Thomson Media, vol. 6, Issue 11, Nov. 2007, 23 pages.
AVM News, Thomson Media, vol. 6, Issue 2, Feb. 2007, 47 pages.
AVM News, Thomson Media, vol. 6, Issue 4, Apr. 2007, 59 pages.
AVM News, Thomson Media, vol. 6, Issue 5, May 2007, 66 pages.
AVM News, Thomson Media, vol. 6, Issue 6, Dec. 2007, 38 pages.
AVM News, Thomson Media, vol. 6, Issue 6, Jun. 2007, 46 pages.
AVM News, Thomson Media, vol. 6, Issue 8, Aug. 2007, 35 pages.
AVM News, Thomson Media, vol. 6, Issue 9, Sep. 2007, 37 pages.
AVM News, Thomson Media, vol. 6, Issue7, Jul. 2007, 51 pages.
AVM News, Thomson Media, vol. 7, Issue 07-08, Jul.-Aug. 2008, 56 pages.
AVM News, Thomson Media, vol. 7, Issue 1, Jan. 2008, 44 pages.
AVM News, Thomson Media, vol. 7, Issue 11-12, Nov.-Dec. 2008, 52 pages.
AVM News, Thomson Media, vol. 7, Issue 2, Feb. 2008, 35 pages.
AVM News, Thomson Media, vol. 7, Issue 3, Mar. 2008, 34 pages.
AVM News, Thomson Media, vol. 7, Issue 4, Apr. 2008, 33 pages.

(56) References Cited

OTHER PUBLICATIONS

AVM News, Thomson Media, vol. 7, Issue 4-5, May-Jun. 2008, 46 pages.
AVM News, Thomson Media, vol. 7, Issue 9-10, Sep.-Oct. 2008, 68 pages.
AVM News, Thomson Media, vol. 8, Issue 1-2, Jan.-Feb. 2009, 71 pages.
AVM News, Thomson Media, vol. 8, Issue 11-12, Nov.-Dec. 2009, 62 pages.
AVM News, Thomson Media, vol. 8, Issue 3-4, Mar.-Apr. 2009, 45 pages.
AVM News, Thomson Media, vol. 8, Issue 5-6, May-Jun. 2009, 65 pages.
AVM News, Thomson Media, vol. 8, Issue 7-8, Jul.-Aug. 2009, 71 pages.
AVM News, Thomson Media, vol. 8, Issue 9-10, Sep.-Oct. 2009, 53 pages.
AVM News, Thomson Media, vol. 9, Issue 1-2, Jan.-Feb. 2010, 66 pages.
AVM News, Thomson Media, vol. 9, Issue 11-12, Nov.-Dec. 2010, 75 pages.
AVM News, Thomson Media, vol. 9, Issue 3-4, Mar.-Apr. 2010, 63 pages.
AVM News, Thomson Media, vol. 9, Issue 5-6, May-Jun. 2010, 69 pages.
AVM News, Thomson Media, vol. 9, Issue 7-8, Jul.-Aug. 2010, 63 pages.
AVM News, Thomson Media, vol. 9, Issue 9-10, Sep.-Oct. 2010, 69 pages.
Bailey, Martin J. et al., A Regression Method for Real Estate Price Index Construction, Journal of the American Statistical Association, vol. 58, No. 304 (Dec. 1963), Published by: American Statistical Association, Stable URL: http://www.jstor.org/stable/2283324, pp. 933-942, 11 pages.
Basch, Mark, "Basis100 Sold to California Firm," The Florida Times Union, Jacksonville.com, Jul. 1, 2004, 2 pages.
Bennett, Kristin P. et al.., "Support Vector Machines: Hype or Hallelujah?" SIGKDD Explorations, Dec. 2000, , vol. 2, issue 2, ACM SIGKDD, 13 pages.
Beracha, E., et al., "The Rent versus Buy Decision: Investigating the Needed Property Appreciation Rates to be Indifferent between Renting and Buying Property." Journal of Real Estate Practice and Education, 15(2), 71-88.
Borst, Richard A. et al., "An Evaluation of Multiple Regression Analysis, Comparable Sales Analysis and Artificial Neural Networks for the Mass Appraisal of Residential Properties in Northern Ireland," 1996, 16 pages.
Borst, Richard A. et al., "Use of GIS to Establish and Update CAMA Neighborhoods in Northern Ireland," Available prior to Sep. 1997, 9 pages.
Borst, Richard A., "A Valuation and Value Updating of Geographically Diverse Commercial Properties Using Artificial Neural Networks," 1993, 2 pages.
Borst, Richard A., "Computer Assisted Mass Appraisal, A New Growth Industry in the United States," Accessed from International Association of Assessing Officers Research and Technical Services Department, Document 00994, Dated no later than Jun. 8, 1979, 28 pages.
Borst, Richard A., "The Common Thread in Market Data Systems," World Congress on Computer-Assisted Valuation, Aug. 1-6, 1982, 14 pages.
Boston Housing Data, http://www.ics.uci.edu/~mlearn/databases/housing/housing.names, [accessed Dec. 13, 2005], 1 page.
Breiman et al., "Random Forest," Classification Description, http://www.stat.berkeley.edu/users/breiman/RandomForests/cc_home.htm, [accessed Dec. 13, 2005], pp. 1-28.
Breiman, L, "Random Forests," Machine Learning, 45, 2001, Kluwer Academic Publishers, The Netherlands, pp. 5-32.
Breiman, Leo et al., Random Forests, R Mathematical Software Package, licensed by Salford Systems, available at URL cran.r-project.org, and described at "Package 'randomForest'", version 4.6-7, Feb. 15, 2013, Published Oct. 16, 2012, available at URL cran.r-project.org/web/packages/randomforest/randomForest.pdf., 29 pages.
Calhoun, Charles A., "Property Valuation Methods and Data in the United States," Housing Finance International Journal 16.2, Dec. 2001, pp. 12-23.
Casa Property Valuation screen capture, dated at least by Jan. 24, 2005, 1 page.
Case, Karl E., et al., "Prices of Single Family Homes Since 1970: New Indexes for Four Cities," Cowles Foundation for Research in Economics at Yale University, New Haven, Connecticut, Discussion Paper No. 851, Oct. 1987, 54 pages.
CDR Business Solutions, LLC, What is RELAR, <http://www.relar.com/relarsystem.aspx> Aug. 24, 2011, Archived by Internet Wayback Machine <http://web.archive.org/web/20110824084613/http://www.relar.com/relarsystem.aspx> viewed Aug. 20, 2015, pp. 1-4.
Centre for Mathematical Sciences, Lund University, "Classification and Regression with Random Forest," http://web.archive.org/web/20060205051957/http://www.maths.lth.se/help/R/.R/library/randomForest/html/randomForest.html, [internet archive date: Feb. 5, 2006], pp. 1-4.
Complaint for Patent Infringement, Demand for Jury Trial for U.S. Pat. No. 7,970,674, Case 2:12-cv-01549-JLR, Sep. 12, 2012, 8 pages.
Cozzi, Guy, Real Estate Appraising from A to Z, 4th Edition, Nemmar Real Estate Training, Jan. 1, 2002, 226 pages, Parts 1-2.
Crowston, Kevin, et al., "Real Estate War in Cyberspace: An Emerging Electronic Market?," Syracuse University Surface, School of Information Studies (iSchool), Jan. 1, 1999, 14 pages.
Curriculum Vitae of Steven R. Kursh, Ph.D., CSDP, CLP, Aug. 2013, 9 pages.
Cypress Software Introduces AVM Module for Mark IV Application; Module Provides Instant Home Appraisal for Loans Processed by the Loan-Decisioning Platform, Business Wire, Nov. 15, 2005, 2 pages.
Decision—Institution of Covered Business Method Patent Review for U.S. Pat. No. 7,970,674, Case CBM2013-00056, Entered Mar. 10, 2014, 36 pages.
Decision—Institution of Inter Partes Review for U.S. Pat. No. 7,970,674, Case No. IPR2013-00034, Apr. 2, 2013, 28 pages.
Decision on Appeal for U.S. Appl. No. 11/524,048, dated Oct. 19, 2012, 7 pages.
Decision on Request for Rehearing for U.S. Pat. No. 7,970,674, Case No. IPR2013-00034, Apr. 22, 2013, 5 pages.
Declaration Brooke A.M. Taylor in Support of Plaintiff Vasudevan Software, Inc.'s Motion for Sanctions Against Microstrategy, Case No. 3:11-06637-RS-PSG, Nov. 20, 2012, 3 pages.
Declaration of Dr. Richard Borst, Aug. 26, 2013, 43 pages.
Declaration of John Kilpatrick, Case No. IPR2013-00034, Jun. 14, 2013, 23 pages.
Declaration of Jordan Connors in Support of Plaintiff Vasudevan Software, Inc.'s Motion for Sanctions Against Microstraqtegy, Case No. 3:11-06637-RS-PSG, Nov. 20, 2012, 4 pages.
Declaration of Leslie V. Payne in Support of Plaintiff Vasudevan Software, Inc.'s Motion for Sanctions Against Microstrategy, Case No. 3:11-06637-RS-PSG, Nov. 20, 2012, 3 pages.
Declaration of Steven R. Kursh, Ph.D., CSDP, CLP, CBM 2013-00056, Filed Sep. 11, 2013, 108 pages.
Declaration of Steven R. Kursh, Ph.D., CSDP, CLP, CBM2014-00115, Filed Apr. 10, 2014, 108 pages.
Defendant Trulia, Inc.'s Answer to Complaint for Patent Infringement and Counterclaim, Demand for Jury Trial, Case No. 2:12-cv-01549-JLR, Mar. 1, 2013, 10 pages.
Defendant Trulia, Inc.'s Non-Infringement and Invalidity Contentions, Case No. 2:12-cv-01549-JLR, Jun. 21, 2013, 24 pages.
Defendant Trulia, Inc.'s Non-Infringement and Invalidity Contentions, Exhibit A, Case No. 2:12-cv-01549-JLR, Jun. 21, 2013, 267 pages.
Dempster, A.P. et al., "Maximum Likelihood from Incomplete Data via the Algorithm," Journal of the Royal Statistical Society, 1977, Series B 39 (1): 1-38, JSTOR 2984875, MR 0501537, [online],

(56) References Cited

OTHER PUBLICATIONS

Retrieved from the Internet: URL: http://www.jstor.org/stable/2984875?origin=JSTOR-pdf, 38 pages.
Department of the Treasury, Internal Revenue Service, "How to Depreciate Property," Publication 946, made available at www.irs.gov by dated at least 2004, 112 pages.
Deposition Transcription of John A. Kilpatrick, Ph.D., Aug. 8, 2013, 263 pages.
European Examination Report, Application No. 07018380.1, dated May 16, 2013, 6 pages.
European Examination Report, Application No. 07018380.1, dated Oct. 24, 2008, 6 pages.
European Examination Report, Application No. 07018380.1, dated Nov. 8, 2012, 6 pages.
Evaluation Services, Inc. Warranty to Lender's Service, Inc., dated at least by Feb. 12, 1997, 144 pages.
Evans, Blanche, "Microsoft HomeAdvisor: Software Giant, Real Estate Portal," Realty Times, Mar. 30, 2000, 3 pages.
Evans, Blanche, The Hottest E-careers in Real Estate, Dearborn Financial Publishing Inc., 2000, 241 pages.
Examiner's Answer for U.S. Appl. No. 11/524,048, dated Oct. 28, 2010, 13 pages.
Fannie Mae Form 2055, Federal National Mortgage Association [online], Mar. 2005, Retrieved from the Internet: URL: https://www.fanniemae.com/content/guide_form/2055.pdf, 8 pages.
Fannie Mae Form 2075, Desktop Underwriter Property Inspection Report, Federal National Mortgage Association [online], not dated, Retrieved from the Internet: URL: https://www.fanniemae.com/content/guide_form/2075.pdf, 3 pages.
Feldman, David et al., "Mortgage Default: Classification Trees Analysis," The Pinhas Sapir Center for Development Tel-Aviv University, Discussion Paper No. 3-2003, Oct. 2003, 46 pages.
FHFA, "Distress-Free House Price Indexes." https://www.fhfa.gov/DataTools/Downloads/Documents/HPI_Focus_Pieces/2012Q2_HPI_N508.pdf. Jul. 13, 2014.
File History of U.S. Pat. No. 7,970,674, dated Feb. 3, 2006-Apr. 2, 2013, 404 pages, Parts 1-4.
Final Office Action for U.S. Appl. No. 11/347,000, dated Jan. 3, 2012, 17 pages.
Final Office Action for U.S. Appl. No. 11/347,024, dated Feb. 3, 2011, 28 pages.
Final Office Action for U.S. Appl. No. 11/524,047, dated Jul. 23, 2010, 7 pages.
Final Office Action for U.S. Appl. No. 11/524,047, dated Sep. 28, 12, 8 pages.
Final Office Action for U.S. Appl. No. 11/524,047, dated Jun. 12, 2015, 31 pages.
Final Office Action for U.S. Appl. No. 11/524,048, dated Dec. 8, 2009, 11 pages.
Final Office Action for U.S. Appl. No. 12/924,037, dated Jul. 19, 2017, 25 pages.
Final Office Action for U.S. Appl. No. 13/044,480, dated Feb. 19, 2014, 31 pages.
Final Office Action for U.S. Appl. No. 13/044,480, dated Jul. 10, 2015, 35 pages.
Final Office Action for U.S. Appl. No. 13/044,490, dated Mar. 14, 2013, 35 pages.
Final Office Action for U.S. Appl. No. 13/044,490, dated May 7, 2015, 36 pages.
Final Office Action for U.S. Appl. No. 13/417,804, dated Aug. 13, 2014, 14 pages.
Final Office Action for U.S. Appl. No. 13/943,604, dated Mar. 6, 2015, 28 pages.
Final Office Action for U.S. Appl. No. 14/078,076, dated Jul. 27, 2017, 32 pages.
Final Office Action for U.S. Appl. No. 14/167,962, dated Sep. 30, 2015, 13 pages.
Final Office Action for U.S. Appl. No. 14/167,962, dated Nov. 9, 2017, 23 pages.
Final Office Action for U.S. Appl. No. 14/191,388, dated Dec. 15, 2014, 12 pages.
Final Office Action for U.S. Appl. No. 14/318,536, dated Dec. 11, 2014, 47 pages.
Final Office Action for U.S. Appl. No. 11/927,623, dated Sep. 19, 2011, 13 pages.
Final Office Action for U.S. Appl. No. 11/927,623, dated Nov. 3, 2016, 15 pages.
Final Office Action for U.S. Appl. No. 12/924,037, dated May 16, 2013, 11 pages.
Final Office Action for U.S. Appl. No. 12/924,037, dated Jun. 16, 2015, 19 pages.
Final Office Action for U.S. Appl. No. 13/044,480, dated Jun. 12, 2017, 55 pages.
Final Office Action for U.S. Appl. No. 13/044,490, dated Mar. 29, 2017, 7 pages.
Final Office Action for U.S. Appl. No. 13/417,804, dated Oct. 14, 2015, 11 pages.
Final Office Action for U.S. Appl. No. 13/828,680, dated Jul. 26, 2016, 59 pages.
Final Office Action for U.S. Appl. No. 13/830,497, dated Jun. 8, 2017, 57 pages.
Final Office Action for U.S. Appl. No. 13/843,577, dated Mar. 22, 2016, 63 pages.
Final Office Action for U.S. Appl. No. 13/843,577, dated Oct. 6, 2017, 83 pages.
Final Office Action for U.S. Appl. No. 14/041,450, dated Apr. 6, 2017, 47 pages.
Final Office Action for U.S. Appl. No. 14/078,076, dated Feb. 26, 2016, 21 pages.
Final Written Decision for U.S. Pat. No. 7,970,674, Case IPR2013-00034, Entered Mar. 27, 2014, 44 pages.
Finkelstein, Brad, "PlatinumData Improving Value of Its Information," Origination News and SourceMedia, Inc., vol. 15, Section: Special Report, Section:2, Nov. 1, 2005, 2 pages.
First American Real Estate Solutions Releases ValuePoint4, AVM News, Thomson Media, vol. 1, Issue 10, Oct. 2002, pp. 28-29.
Fletcher, June, "High-Tech Is Coming for High-End House Sales," Wall Street Journal, Sep. 19, 1997, 1 page.
Fletcher, June, "On the Web: What's Your House Worth?," Wall Street Journal, Sep. 26, 1997, 1 page.
Fletcher, June, "Touring the Tangled Web of For-Sale-by-Owner Homes," The Wall Street Journal, Jun. 6, 1997, 1 page.
Freddie Mac Form 70, Uniform Residential Appraisal Report, Federal Home Loan Mortgage Corporation [online], Mar. 2005, Retrieved from the Internet: URL: https://www.fanniemae.com/content/guide_form/1004.pdf, 8 pages.
Freddie Mac's Home Value Explorer screen capture, dated at least by Jul. 15, 2003, 1 page.
Google, Google Trends, retrieved from the internet Oct. 12, 2015 <http://www.google.com/trends> (website address only—No document).
Great Britain Examination Report in Application No. GB0701944.1, dated May 5, 2010, 3 pages.
Great Britain Search Report for GB0701944.1, dated Mar. 23, 2007, 3 pages.
Hill, T. and Lewicki, P., "K-Nearest Neighbors," Statistics Methods and Applications, 2007, http://www.statsoft.com/textbook/stknn.html, [internet accessed on [Dec. 6, 2007], 5 pages.
Hochgraf, Lisa, "Tools for Top Speed," Credit Union Management, vol. 26, Issue 8, Aug. 1, 2003, 4 pages.
HomeSearch Report, [online], Retrieved from the Internet via the Wayback Machine dated Dec. 10, 2005 on Jun. 19, 2013, URL: http://homesmartreports.com/samples/samplehomesearch.htm, 3 pages.
HomeSmart About, [online], Retrieved from the Internet via the Wayback Machine dated Dec. 10, 2005 http://homesmartreports.com/hs_about.htm, 2 pages.
HomeSmart Reports, [online], Retrieved from the Internet via the Wayback Machine dated Dec. 10, 2005 on Jun. 19, 2013, URL: http://homesmartreports.com/default.aspx, 1 page.
HomeSmart Sellers, [online], Retrieved from the Internet via the Wayback Machine dated Dec. 10, 2005 on Jun. 19, 2013, URL: http://homesmartreports.com/hs_owners.htm, 1 page.

(56) References Cited

OTHER PUBLICATIONS

HomeSmart Terms of Use, [online], Retrieved from the Internet via the Wayback Machine dated Dec. 10, 2005 on Jun. 19, 2013, URL: http://homesmartreports.com/hs_disclaimer.htm, 3 pages.

Homesmartreports, [online], Retrieved from the Internet via the Wayback Machine dated Oct. 13, 2005 on Jun. 19, 2013, URL: http://homesmartreports.com/, 2 pages.

Indeed, Job Trends: Podcast, retrieved from the internet Oct. 12, 2015 <http://www.indeed.com/jobtrends> (website only—No document).

Infinite Regression, Certificate of Copyright Registration Filing, Apr. 2, 1984, 3 pages.

Inman, "Zilpy, the new 'Z' site in online real estate", published Feb. 7, 2008, retrieved from http://www.inman.com/2008/02/07/zilpy-new-z-site-in-online-real-estate/ on Aug. 11, 2016, 2 pages.

Jensen, David L., "Alternative Modeling Techniques in Computer-Assisted Mass Appraisal," Property Tax Journal, vol. 6, No. 3, Sep. 1987, pp. 193-237.

Jobster, Job Search Trends for Keywords and Locations, retrieved from the internet Oct. 12, 2015 <http://www.jobster.com/find/US/jon/search/trends> (website only—No document).

John Battelle's Searchblog,: The Database of Intentions, Nov. 13, 2003.

Kilpatrick, John A., "The Future Of Real Estate Information," Real Estate Issues, Spring 2001, 8 pages.

Kilpatrick, John A., et al., "House Price Impacts of School District Choice," South Carolina Center for Applied Real Estate Education and Research, Dec. 28, 1998, 25 pages.

Krasilovsky, Peter, "Chris Terrill Discusses ServiceMagic's Rebranding to 'Home Advisor,'" Home Advisor, Oct. 17, 2012, 5 pages.

Lankarge, Vicki, et al., How to Increase the Value of Your Home: Simple, Budget-Conscious Techniques and Ideas That Will Make Your Home Worth Up to $100,000 More!, McGraw-Hill, 2004, 176 pages.

Leonhardt, David, The Internet Knows What You'll Do Next, Jul. 5, 2006, http://www.nytimes.com/2006/07/05/business/05leonhardt.html?ex=1309752000&en=8be0be92819a6f8f&ei=5088&partner=rssnyt&emc=rss.

McCluskey, William J. et al., "An Evaluation of MRA, Comparable Sales Analysis, and ANNs for the Mass Appraisal of Residential Properties in Northern Ireland," Assessment Journal, Jan./Feb. 1997, 8 pages.

McGarity, M., "The Values Debate," Mortgage Banking, vol. 65, Issue 6, Mar. 1, 2005, 14 pages.

McWilliams, Charlyne H., "The Tale of AVMs," Mortgage Banking, vol. 64, Issue 5, Feb. 1, 2004, 7 pages.

Melville, J., "How much should I charge to rent my house?", published Dec. 5, 2010, retrieved from http://homeguides.sfgate.com/much-should-charge-rent-house-8314.html on Aug. 11, 2016, 2 pages.

Meyer, Robert T., "The Learning of Multiattribute Judgment Policies," The Journal of Consumer Research, vol. 14, No. 2, Sep. 1987, 20 pages.

Microstrategy Inc.'s Opposition to Plaintiff Vasudevan Software, Inc.'s Motion for Sanctions, Case No. 11-CV-06637-RS-PSG, Jan. 4, 2013, 23 pages.

Miller et al., A Note on Leading Indicators of Housing Market Price Trends, vol. 1, No. 1, 1986.

Miller et al., Multiple Regression Condominium Valuation with a Touch of Behavioral Theory, The Appraisal Journal 1987.

Miller et al., Pricing Strategies and Residential Property Selling Prices, The Journal of Real Estate Research, vol. 2, No. 1, Nov. 1, 1987.

Miller et al., The Impact of Interest Rates and Employment on Nominal Housing Prices, International Real Estate Review, vol. 8 No. 1, pp. 26-42, 2005.

Mobasher B. "Classification Via Decision Trees in WEKA," DePaul University, Computer Science, Telecommunications, and Information Systems, ECT 584-Web Data Mining, 2005, http://maya.cs.depaul.edu/~classes/Ect584/WEKA/classify.html, [internet accessed on Dec. 6, 2007], 5 pages.

Morton, T. Gregory, Regression Analysis Appraisal Models: Selected Topics and Issues, Center for Real Estate and Urban Economic Studies, University of Connecticut, Real Estate Report: No. 19, Oct. 1976, 85 pages.

Motion for Pro Hac Vice Admission and Exhibit A for U.S. Pat. No. 7,970,674, Case No. IPR2013-00034, Filing Date Dec. 17, 2012, 13 pages.

MRMLS Realist Tax System Foreclosure User Guide, crmls.org/help/realist_manuals/realist_foreclosure.pdf. Oct. 30, 2007.

MSN House & Home—More Useful Everyday screen capture, [online], Retrieved from the Internet via the Wayback Machine dated Mar. 23, 2003 on Jun. 19, 2013, URL: http://web.archive.Org/web/20030323183505/http://houseandhome.msn.com/, 2 pages.

Mullaney, Timothy J., "A new Home Site on the Block," Bloomberg Businessweek [online], Feb. 7, 2006, Retrieved from the Internet: URL: http://www.businessweek.com/stories/2006-02-07/a-new-home-site-on-the-block, 3 pages.

Munarriz, Rick A., "Pop Goes the Bubble," The Motley Fool, Fool.com [online] Feb. 14, 2006, Retrieved from the Internet; URL: http://www.fool.com/investing/small-cap/2006/02/14/pop-goes-the-bubble.aspx, 4 pages.

Non-Final Office Action for U.S. Appl. No. 11/524,047, dated May 7, 2012, 7 pages.

Non-Final Office Action for U.S. Appl. No. 11/524,047, dated Nov. 4, 2013, 8 pages.

Non-Final Office Action for U.S. Appl. No. 13/044,480, dated Oct. 24, 2013, 29 pages.

Non-Final Office Action for U.S. Appl. No. 14/041,450, dated Nov. 16, 2017, 11 pages.

Non-Final Office Action for U.S. Appl. No. 14/704,567, dated Dec. 7, 2017, 19 pages.

Non-Final Office Action for U.S. Appl. No. 11/347,000, dated Oct. 27, 2010, 23 pages.

Non-Final Office Action for U.S. Appl. No. 11/347,000, dated Nov. 23, 2012, 6 pages.

Non-Final Office Action for U.S. Appl. No. 11/347,000, dated Apr. 9, 2010, 18 pages.

Non-Final Office Action for U.S. Appl. No. 11/347,000, dated May 27, 2011, 13 pages.

Non-Final Office Action for U.S. Appl. No. 11/347,024, dated Dec. 10, 2009, 45 pages.

Non-Final Office Action for U.S. Appl. No. 11/347,024, dated May 13, 2010, 33 pages.

Non-Final Office Action for U.S. Appl. No. 11/524,047, dated Dec. 1, 2014, 26 pages.

Non-Final Office Action for U.S. Appl. No. 11/524,047, dated Oct. 28, 2009, dated 8 pages.

Non-Final Office Action for U.S. Appl. No. 11/524,047, dated Jul. 8, 2011, 7 pages.

Non-Final Office Action for U.S. Appl. No. 11/524,048, dated Apr. 29, 2009, 10 pages.

Non-Final Office Action for U.S. Appl. No. 11/927,623, dated Jan. 11, 2016, 13 pages.

Non-Final Office Action for U.S. Appl. No. 11/927,623, dated Dec. 28, 2010, 10 pages.

Non-Final Office Action for U.S. Appl. No. 11/971,758, dated Feb. 2, 2011, 22 pages.

Non-Final Office Action for U.S. Appl. No. 12/924,037, dated Jan. 10, 2018, 17 pages.

Non-Final Office Action for U.S. Appl. No. 13/044,480, dated Jul. 17, 2014, 31 pages.

Non-Final Office Action for U.S. Appl. No. 13/044,480, dated Mar. 12, 2015, 32 pages.

Non-Final Office Action for U.S. Appl. No. 13/044,490, dated Jan. 14, 2016, 18 pages.

Non-Final Office Action for U.S. Appl. No. 13/044,490, dated Dec. 17, 2014, 30 pages.

Non-Final Office Action for U.S. Appl. No. 13/044,490, dated Oct. 11, 2012, 30 pages.

(56) References Cited

OTHER PUBLICATIONS

Non-Final Office Action for U.S. Appl. No. 13/417,804, dated Jan. 28, 2015, 12 pages.
Non-Final Office Action for U.S. Appl. No. 13/417,804, dated Feb. 26, 2014, 13 pages.
Non-Final Office Action for U.S. Appl. No. 13/828,680, dated Nov. 16, 2017, 47 pages.
Non-Final Office Action for U.S. Appl. No. 13/828,680, dated Dec. 15, 2015, 42 pages.
Non-Final Office Action for U.S. Appl. No. 13/830,497, dated Sep. 14, 2016, 52 pages.
Non-Final Office Action for U.S. Appl. No. 13/843,577, dated Sep. 24, 2015, 50 pages.
Non-Final Office Action for U.S. Appl. No. 13/843,577, dated Dec. 19, 2016, 80 pages.
Non-Final Office Action for U.S. Appl. No. 13/943,604, dated Nov. 19, 2014, 24 pages.
Non-Final Office Action for U.S. Appl. No. 14/078,076, dated Oct. 19, 2016, 29 pages.
Non-Final Office Action for U.S. Appl. No. 14/167,962, dated Mar. 3, 2015, 26 pages.
Non-Final Office Action for U.S. Appl. No. 14/167,962, dated Oct. 31, 2014, 23 pages.
Non-Final Office Action for U.S. Appl. No. 14/191,388, dated Aug. 7, 2014, 5 pages.
Non-Final Office Action for U.S. Appl. No. 14/318,536, dated Aug. 8, 2014, 38 pages.
Non-Final Office Action for U.S. Appl. No. 14/325,094, dated Oct. 31, 2017, 69 pages.
Non-Final Office Action for U.S. Appl. No. 14/524,148, dated Dec. 15, 2017, 27 pages.
Non-Final Office Action for U.S. Appl. No. 14/721,437, dated Dec. 18, 2017, 53 pages.
Non-Final Office Action for U.S. Appl. No. 14/846,632, dated Jan. 16, 2018, 9 pages.
Non-Final Office Action for U.S. Appl. No. 11/927,623, dated Oct. 6, 2017, 15 pages.
Non-Final Office Action for U.S. Appl. No. 12/924,037, dated Nov. 17, 2014, 13 pages.
Non-Final Office Action for U.S. Appl. No. 14/167,962, dated Apr. 6, 2017, 22 pages.
Non-Final Office Action for U.S. Appl. No. 12/924,037, dated Jan. 10, 2013, 9 pages.
Non-Final Office Action for U.S. Appl. No. 12/924,037, dated Nov. 10, 2016, 19 pages.
Non-Final Office Action for U.S. Appl. No. 12/924,037, dated May 27, 2014, 14 pages.
Non-Final Office Action for U.S. Appl. No. 13/044,480, dated Aug. 17, 2016, 40 pages.
Non-Final Office Action for U.S. Appl. No. 13/044,490, dated Jul. 22, 2016, 11 pages.
Non-Final Office Action for U.S. Appl. No. 14/041,450, dated Aug. 18, 2016, 48 pages.
Non-Final Office Action for U.S. Appl. No. 14/078,076, dated Aug. 14, 2015, 15 pages.
Notice of Allowability and Examiner-Initiated Interview Summary for U.S. Appl. No. 11/524,048, dated Jul. 3, 2013, 11 pages.
Notice of Allowance for U.S. Appl. No. 11/347,024, dated Apr. 18, 2011, 7 pages.
Notice of Allowance for U.S. Appl. No. 11/524,048, dated Feb. 25, 13, 14 pages.
Notice of Allowance for U.S. Appl. No. 11/971,758, dated Nov. 10, 2011, 12 pages.
Notice of Allowance for U.S. Appl. No. 11/347,000, dated Oct. 24, 2013, 12 pages.
Notice of Allowance for U.S. Appl. No. 11/524,048, dated Jul. 18, 2013, 10 pages.
Notice of Allowance for U.S. Appl. No. 13/417,804, dated Aug. 18, 2016, 15 pages.
Notice of Allowance for U.S. Appl. No. 14/191,388, dated Jun. 25, 2014, 9 pages.
Notice of Appeal for U.S. Pat. No. 7,970,674, Case IPR2013-00034, May 1, 2014, 5 pages.
O'Brien, Jeffrey M., "What's Your House Really Worth?," Fortune [online], Feb. 15, 2007, Retrieved from the Internet: URL: http://money.cnn.com/magazines/fortune/fortune_archive/2007/02/19/8400262/index.htm, 6 pages.
Oldham, Jennifer, "Pricing's Tangled Web, Consumers Using the Internet to Calculate Home Values Find that the Results—and Data They're Based on—Vary," Los Angeles Times, Jul. 30, 2000, 5 pages.
One-month Office Action for U.S. Appl. No. 11/347,000, dated Jul. 26, 2013, 6 pages.
Oral Hearing Petitioner Demonstratives, U.S. Pat. No. 7,970,674, Case IPR2013-00034, Email Date Nov. 14, 2013, 85 pages.
Oral Hearing Transcript for U.S. Pat. No. 7,970,674, Case IPR2013-00034, Held Nov. 21, 2013, Entered Feb. 20, 2014, 96 pages.
Order Authorizing Motion for Pro Hac Vice Admission for U.S. Pat. No. 7,970,674, Case No. IPR2013-00034, Filing Date Jan. 3, 2013, 4 pages.
Pagourtzi, E. et al., "Real Estate Appraisal: A Review of Valuation Methods," Journal of Property Investment & Finance, vol. 21, No. 4, 2003, pp. 383-401.
Palmquist, Raymond B., "Alternative Techniques for Developing Real Estate Price Indexes," The Review of Economics and Statistics, vol. 62, No. 3 (Aug. 1980), pp. 442-448.
PASS screen capture, dated at least by Oct. 20, 2004, 1 page.
Patent Owner's Demonstrative Exhibit for Oral Hearing, U.S. Pat. No. 7,970,674, Case IPR2013-00034, Exhibit 2023, Email Date Nov. 21, 2013, 56 pages.
Patent Owner's Observations on Cross Examination of Dr. Richard A. Borst, Ph.D., U.S. Pat. No. 7,970,674, Case IPR2013-00034, Oct. 10, 2013, 9 pages.
Patent Owner's Response to Revised Petition for Inter Partes Review for U.S. Pat. No. 7,970,674, Case No. IPR2013-00034, dated Jun. 14, 2013, 41 pages.
Patent Owner's Response to the Petition for Covered Business Method Patent Review for U.S. Pat. No. 7,970,674, Case No. CBM2013-00056, dated Jun. 20, 2014, 72 pages.
Petition for Covered Business Method Patent Review for U.S. Pat. No. 7,970,674, CBM2013-00056, dated Sep. 11, 2013, 87 pages.
Petition for Covered Business Method Patent Review for U.S. Pat. No. 7,970,674, CBM2014-00115, dated Apr. 10, 2014, 69 pages.
Petition for Inter Partes Review for U.S. Pat. No. 7,970,674, Case No. IPR2013-00034, dated Oct. 26, 2012, 65 pages.
Petitioner Response to Patent Owner's Observations on Cross Examination of Dr. Richard A. Borst, Ph.D., U.S. Pat. No. 7,970,674, Case IPR2013-00034, dated Oct. 24, 2013, 7 pages.
Petitioner's Reply to Patent Owner Response to Petition, U.S. Pat. No. 7,970,674, Case No. IPR2013-00034, dated Aug. 26, 2013, 20 pages.
Plaintiff Vasudevan Software, Inc.'s Notice of Motion and Motion for Sanctions Against Microstrategy, Case No. 3:11-06637-RS-PSG, dated Dec. 12, 2012, 23 pages.
Plaintiff Vasudevan Software, Inc.'s Reply in Support of Motion for Sanctions Against Microstrategy, Case No. 3:11-06637-RS-PSG, dated Jan. 24, 2013, 25 pages.
Potharst, R. et al., "Classification Trees for Problems with Monotonicity Constraints," ACM SIGKDD Explorations Newsletter 4.1, 2002, pp. 1-10.
Potharst, R. et al., "Classification Trees for Problems with Monotonicity Constraints," ERIM Report Series Research in Management, Erasmus Research Institute of Management, Apr. 2002, 39 pages.
PowerBase 6.0 screen capture, dated at least by Oct. 20, 2004, 1 page.
Prasad, Nalini et al., "Measuring Housing Price Growth—Using Stratification to Improve Median-based Measures", Reserve Bank of Australia, 2006, p. 1.
Preliminary Patent Owner Response and Exhibits for U.S. Pat. No. 7,970,674, Case No. IPR2013-00034, dated Feb. 15, 2013, 228 pages.

(56) References Cited

OTHER PUBLICATIONS

Preliminary Patent Owner Response for U.S. Pat. No. 7,970,674, Case No. CBM2013-00056, dated Dec. 18, 2013, 85 pages.
Preliminary Patent Owner Response for U.S. Pat. No. 7,970,674, Case No. IPR2013-00034, dated Feb. 15, 2013, 39 pages.
Quinlan, Ross J., "C4.5: Programs for Machine Learning," Machine Learning, 1993, Morgan Kaufmann Publishers, San Francisco, CA, USA., 302 pages.
Quirk, B., "Zilpy.com launches a rental data website built in partnership with Zillow!!!", published Jan. 29, 2008, retrieved from http://www.propertymanagementmavens.com/archives/2008/1 on Aug. 11, 2016, 3 pages.
Real Info Inc., RELAR Sample Report, <http://www.real-info.com/products_RELAR.asp> Aug. 18, 2010, Archived by Internet Wayback Machine <http://web.archive.org/web/20100818012252/http://www.real-info.com/products_RELAR.asp> viewed Aug. 24, 2015, pp. 1-4.
Real-info.com, "What is an AVM," www.real-info.com/products_avm.asp? Internet Archive Date: Oct. 30, 2005, [accessed Mar. 21, 2007], 5 pages.
RealEstateABC.com, see paragraph headed "How do I make the estimate more accurate?" www.realestateabc.com/home-values/ <http://www.realestateabc.com/home-values/>, Internet Archive Dated: Apr. 5, 2006, [accessed Mar. 20, 2007], 4 pages.
RealQuest.com screen capture, dated at least by Dec. 12, 2002, 1 page.
RealQuest.com screen capture, dated at least by Oct. 20, 2004, 1 page.
RealQuest.com ValuePoint R4 Report screen capture, dated at least by Sep. 30, 2002, 1 page.
RealQuest.com Vector screen capture, dated at least by Oct. 20, 2004, 1 page.
Redfin, https://web.archive.org/web/20060907212454/http://www.redfin.com/stingray/do/terms-ofuse?rt=fn-tl, Wayback Machine Sep. 7, 2006.
Reis SE 2.0 User Guide Book, Reis, 2004, 40 pages.
Reis SE 2.0 User Guide Book, Reis, 2005, 37 pages.
Reis Valuation and Credit Risk Analysis Module Overview, [online], Sep. 18, 2003, Retrieved from the Internet via the Wayback Machine dated Sep. 19, 2003 on Jun. 17, 2013, URL: http://www.reiscom/valuation/valuationOverview.cfm, 2 pages.
Replacement Demonstrative Exhibit for Oral Hearing, U.S. Pat. No. 7,970,674, Case IPR2013-00034, File Date Nov. 21, 2013, 83 pages.
Replacement Patent Owner's Demonstrative Exhibit for Oral Hearing, U.S. Pat. No. 7,970,674, Case IPR2013-00034, File Date Nov. 21, 2013, 36 pages.
Reply Brief for U.S. Appl. No. 11/524,048, dated Dec. 22, 2010, 6 pages.
Request for Rehearing for U.S. Pat. No. 7,970,674, Case No. IPR2013-00034, dated Apr. 16, 2013, 8 pages.
Requirement Under Rule 105 for U.S. Appl. No. 11/927,623, dated Jul. 2, 2014, 4 pages.
Response to Decision on Appeal for U.S. Appl. No. 11/524,048, dated Dec. 19, 2012, 7 pages.
Response to Final Office Action for U.S. Appl. No. 11/347,024, dated Mar. 4, 2011, 17 pages.
Revised Petition for Inter Partes Review for U.S. Pat. No. 7,970,674, Case No. IPR2013-00034, dated Nov. 13, 2012, 55 pages.
Rossini, Peter, "Using Expert Systems and Artificial Intelligence for Real Estate Forecasting," Sixth Annual Pacific-Rim Real Estate Society Conference, Sydney, Australia, Jan. 24-27, 2000, 10 pages.
Rye, Owen E., "A Multiple Criteria Analysis Model For Real Estate Evaluation," Journal of Global Optimization 12.2, Mar. 1998, pp. 197-214.
Rye, Owen E., "Automated Property Assessment,"Transactions of the American Association of Cost Engineers, Nov. 2004, pp. 28-32.
Sample Appraisal Report of a Single-Family Residence, U.S. Appraisal, dated Sep. 15, 1982, 16 pages.
Sample HomeSmart Value Report, [online], Retrieved from the Internet via the Wayback Machine dated Dec. 10, 2005 on Jun. 19, 2013, URL: http://homesmartreports.com/samples/samplevaluation.htm, 4 pages.
Sample Residential Appraisal Report, U.S.Appraisal, dated Jul. 16, 1982, 2 pages.
Second Office Action in Chinese Patent Application No. 200710306194.8, dated Apr. 1, 2010, 9 pages, english translation.
Simons, R. A., "Chapter 6: Valuation of Impaired Property," When Bad Things Happen To Good Property, Throupe, R et al., Environmental Law Institute, May 2006, 30 pages.
Software Referral Agreement with Sole Source Provision between Sperry Corporation and U.S.Appraisal, May 1985, 47 pages.
Standard & Poors, "Guidelines for the use of Automated Valuation Models for U.K. RMBS Transactions," http://www.rics.org/NR/rdonlyres/8Fcdd20c-7FAC-4549-86FB-3930CD0CBC05/0/StandardandPoorsReportonAVMs.pdf, Published Feb. 20, 2004, 4 pages.
Statsoft, Inc., "Classification Trees," http://www.statsoft.com/textbook/stclatre.html, ã1984-2003 [accessed Dec. 13, 2005], pp. 1-20.
Svetnik et al., "Random Forest: A Classification and Regression Tool for Compound Classification and QSAR Modeling", J Chem Info. Computer Science, vol. 43, 2003, pp. 1947-1958.
System Operations Manual for "The Research Assistant", Evaluation Services, Inc., Feb. 12, 1997, 92 pages.
System Operations Manual, "The Research Assistant", Database Valuation Version, Evaluation Services, Inc., Feb. 12, 1997, 35 pages.
Tay et al., "Artificial Intelligence and the Mass Appraisal of Residential Apartments," Journal of Property Valuation and Investment, Feb. 1, 1992, 17 pages.
The Assessor, A Computerized Assessment System, NCR Corporation, 1986, 6 pages.
The MicroAppraisal, Certificate of Copyright Registration, Feb. 2, 1984, 2 pages.
Transcript of Deposition of R. A. Borst, Ph. D., Case IPR2013-00034 (JL), Transcribed Sep. 19, 2013, 177 pages.
Transcript of Proceedings in Case No. C 11-06637 RS, Jan. 24, 2013, 24 pages.
U.S. Appraisal Business Plan, dated at least since Aug. 1, 1985, 30 pages.
U.S. Appraisal Offering Memorandum, Sep. 12, 1984, 66 pages.
US. Appraisal Profit and Loss Proforma, dated at least since Aug. 1, 1985, 38 pages.
Valuation Reports, Schedule A, U.S. Appraisal, dated at least by Nov. 1, 1986, 6 pages.
Valuations, Claims Cross Engines, Inman News Features, Dec. 10, 2002, 1 page.
ValuePoint4 Report; File No. 04040103629, Apr. 12, 2004, 3 pages.
Vapnik et al., "Support-Vector Networks," Machine Learning, vol. 20, 1995, 25 pages.
VeroValue screen capture, dated at least by Sep. 30, 2004, 1 page.
Visual PAMSPro 2000, [online], Retrieved from the Internet via the Wayback Machine dated Mar. 4, 2001 on Jun. 19, 2013, URL: http://www.visualpamspro.com/prod01.htm, 2 pages.
Visual PAMSPro Custom Add Ins, [online], Retrieved from the Internet via the Wayback Machine dated Mar. 5, 2001 on Jun. 19, 2013, URL: http://www.visualpamspro.com/serv04.htm, 2 pages.
Visual PAMSPro Downloads, [online], Retrieved from the Internet via the Wayback Machine dated Mar. 2, 2001 on Jun. 19, 2013, URL: http://www.visualpamspro.com/download.htm, 1 page.
Visual PAMSPro Home, [online], Retrieved from the Internet via the Wayback Machine dated Mar. 2, 2001 on Jun. 19, 2013, URL: http://www.visualpamspro.com/, 1 page.
Visual PAMSPro News, [online], Retrieved from the Internet via the Wayback Machine dated Mar. 2, 2001 on Jun. 19, 2013, URL: http://www.visualpamspro.com/news.htm, 2 pages.
Visual PAMSPro Products, [online], Retrieved from the Internet via the Wayback Machine dated Mar. 2, 2001 on Jun. 19, 2013, URL: http://www.visualpamspro.com/products.htm, 1 page.
Visual PAMSPro Real Estate Appraisal Software, Appraisal Software Real Estate, [online], Retrieved from the Internet via the

(56) References Cited

OTHER PUBLICATIONS

Wayback Machine dated Sep. 2, 2001 on Jun. 19, 2013, URL: http://www.visualpamspro.com/prodvpp2.htm, 6 pages.
Visual PAMSPro Tips and Tricks, [online], Retrieved from the Internet via the Wayback Machine dated Mar. 2, 2001 on Jun. 19, 2013, URL: http://www.visualpamspro.com/Tips-Tricks.htm, 1 page.
Wikipedia, Expectation-maximization Algorithm, [online] Retrieved from the Internet via the Wayback Machine dated Dec. 21, 2013 on Feb. 28, 2014, URL: http://en.wikipedia.org/wiki/Expectation%E2%80%93maximization_algorithm, 13 pages.
Wikipedia, Survival Analysis, <http://en.wikipedia.org/wiki/Survival_analysis> Oct. 16, 2011, Archived by Internet Wayback Machine <http://web.archive.org/web/20111016061152/http://!en.wikipedia.org/wiki/Survival_analysis>, viewed Aug. 28, 2015, pp. 1-5.
Zillow.com, Quarterly Report 2Q 2006, A Review of the San Francisco Real Estate Market.
Final Office Action for U.S. Appl. No. 15/698,276, dated Apr. 9, 2020, 32 pages.
Final Office Action for U.S. Appl. No. 14/846,632, dated May 7, 2020; 22 pages.
Final Office Action for U.S. Appl. No. 14/325,094, dated Apr. 22, 2020, 53 pages.
Final Office Action for U.S. Appl. No. 14/524,148, dated Mar. 9, 2020, 62 pages.
Final Office Action for U.S. Appl. No. 14/640,860, dated Apr. 14, 2020, 85 pages.
Final Office Action for U.S. Appl. No. 15/446,283, dated Apr. 22, 2020, 17 pages.
Final Office Action for U.S. Appl. No. 14/721,437, dated Apr. 16, 2020, 103 pages.
Final Office Action for U.S. Appl. No. 11/927,623, dated Jun. 12, 2020, 15 pages.
Mikhed, V., et al., "Testing for Bubbles in Housing Markets: A Panel Data Approach," The Journal of Real Estate Finance and Economics, vol. 38, 2007, pp. 366-386.
Nazerzadeh, H., "Internet Advertising: Optimization and Economic Aspects," Stanford University, 2009, 6 pages.
Non-Final Office Action for U.S. Appl. No. 16/125,318, dated Mar. 13, 2020, 20 pages.
Notice of Allowance for U.S. Appl. No. 14/704,567, dated Jun. 25, 2020, 17 pages.
Notice of Allowance for U.S. Appl. No. 15/439,388, dated Jan. 23, 2020, 12 pages.
Notice of Allowance for U.S. Appl. No. 15/439,388, dated May 27, 2020, 12 pages.
Notice of Allowance for U.S. Appl. No. 14/078,076, dated Apr. 10, 2020, 9 pages.
Notice of Allowance for U.S. Appl. No. 14/078,076, dated May 20, 2020, 17 pages.
Remodeling Magazine, Remodeling Cost vs Value Report 2006, Hanley Wood LLC, pp. 1-6.
Turner, J., "Ad Slotting and Pricing: New Media Planning Models For New Media," Carnegie Mellon University, Apr. 23, 2010, 132 pages.
Final Office Action for U.S. Appl. No. 11/927,623, dated Apr. 1, 2021, 18 pages.
Final Office Action for U.S. Appl. No. 13/828,680, dated Dec. 15, 2020, 59 pages.
Final Office Action for U.S. Appl. No. 14/524,148, dated Jan. 29, 2021, 55 pages.
Final Office Action for U.S. Appl. No. 14/709,719, dated Mar. 9, 2021, 42 pages.
Final Office Action for U.S. Appl. No. 15/715,098, dated Jul. 13, 2021, 31 pages.
Final Office Action for U.S. Appl. No. 15/698,276, dated Jun. 24, 2021, 7 pages.
Hamzaoui, Y. E. et al., "Application of Artificial Neural Networks to Predict the Selling Price in the Real Estate Valuation Process," 2011 10th Mexican International Conference on Artificial Intelligence, Puebla, 2011, pp. 175-181 (Year: 2011).
Jianxiao, G. et al., "Analysis of influencing factors in real estate prices based on stochastic gradient regression model," 2009 16th International Conference on Industrial Engineering and Engineering Management, Beijing, 2009.
Khalafallah, A. "Neural network based model for predicting housing market performance," in Tsinghua Science and Technology, vol. 13, No. S1, pp. 325-328, Oct. 2008 (Year: 2008).
Liang, Y et al., "Research on real estate and its application of refraining the speculation," BioTechnology, An Indian Journal, 10(9), 3160-3166, 2014.
New CoreLogic Data Reveals Q2 Negative Equity Declines in Hardest Hit Markets and 8 Million Negative Equity Borrowers Have Above Market Rates, CoreLogic Press Release. Sep. 13, 2011, 5 pages.
Non-Final Office Action for U.S. Appl. No. 14/640,860, dated Jul. 15, 2021, 109 pages.
Non-Final Office Action for U.S. Appl. No. 14/709,719, dated Aug. 4, 2021, 40 pages.
Non-Final Office Action for U.S. Appl. No. 14/721,437, dated Jan. 4, 2021, 72 pages.
Non-Final Office Action for U.S. Appl. No. 15/698,276, dated Feb. 5, 2021, 41 pages.
Non-Final Office Action for U.S. Appl. No. 15/715,098, dated Jan. 4, 2021, 26 pages.
Non-Final Office Action for U.S. Appl. No. 16/125,318, dated Apr. 29, 2021, 25 pages.
Non-Final Office Action for U.S. Appl. No. 16/129,282, dated Feb. 1, 2021, 33 pages.
Non-Final Office Action for U.S. Appl. No. 16/235,009, dated Dec. 4, 2020, 9 pages.
Non-Final Office Action for U.S. Appl. No. 16/449,210, dated Mar. 26, 2021, 17 pages.
Non-Final Office Action for U.S. Appl. No. 16/748,172, dated May 12, 2021, 58 pages.
Notice of Allowance for U.S. Appl. No. 14/325,094, dated Dec. 16, 2020, 10 pages.
Notice of Allowance for U.S. Appl. No. 14/721,437, dated Apr. 14, 2021, 13 pages.
Notice of Allowance for U.S. Appl. No. 16/235,009, dated Mar. 24, 2021, 7 pages.
The Tim. Top 30 Cities: Price to Rent & Price to Income Ratios (2011). Seattle Bubble, Mar. 29, 2013, 14 pages.
Trulia.com. Trulia's rent vs. buy index reveals top 10 cities for renting, owning homes. Oct. 2010, pp. 1-4.
Alford, P., "Rent Ratio Tells You Whether Renting or Buying is the Better Deal." Forbes.com, Nov. 2, 2021 pp. 1-4. <https://www.forbes.com/sites/greatspeculations/2010/11/02/rent-ratio-tells-you-whether-renting-or-buying-is-the-better-deal/?sh=701a7ed6e9d0>.
Dialog NPL (Non-Patent Literatures) Search Report, dated Sep. 21, 2021 (Year: 2021).
Final Office Action for U.S. Appl. No. 16/449,210, dated Aug. 20, 2021, 18 pages.
Google Scholar Article NPL Search Report, dated Sep. 21, 2021 (Year: 2021).
Google Scholar Case Law NPL Search Report, dated Sep. 21, 2021 (Year: 2021).
Himmelberg, C. et al., "Assessing High House Prices: Bubbles, Fundamentals and Misperceptions," Journal of Economic Perspectives, 2005, v19(4, Fall), pp. 1-42.
Non-Final Office Action for U.S. Appl. No. 15/715,098, dated Oct. 21, 2021, 32 pages.
Non-Final Office Action for U.S. Appl. No. 15/698,276, dated Oct. 27, 2021, 9 pages.
Non-Final Office Action for U.S. Appl. No. 14/524,148, dated Aug. 19, 2021, 83 pages.
Non-Final Office Action for U.S. Appl. No. 16/916,552, dated Aug. 30, 2021, 10 pages.
Notice of Allowance for U.S. Appl. No. 16/125,318, dated Sep. 29, 2021, 12 pages.
Notice of Allowance for U.S. Appl. No. 16/916,552, dated Sep. 22, 2021, 9 pages.
U.S. Appl. No. 17/130,922 for Ma et al., filed Dec. 22, 2020.
U.S. Appl. No. 17/231,880 for Humphries et al., filed Apr. 15, 2021.

(56) References Cited

OTHER PUBLICATIONS

U.S. Appl. No. 17/206,838 for Bruce et al., filed Mar. 19, 2021.
U.S. Appl. No. 17/354,837 for Humphries et al., filed Jun. 22, 2021.
U.S. Appl. No. 17/373,446 for Humphries et al., filed Jul. 12, 2021.
U.S. Appl. No. 16/748,172 for Wang et al., filed Jan. 21, 2020.
U.S. Appl. No. 17/322,208 for Fagnan et al., filed May 17, 2021.

* cited by examiner

Home Facts

Zillow's Facts

| | |
|---|---|
| Residence: | Single family |
| Bedrooms: | 5 |
| Baths: | 3.5 |
| Sq ft: | 3,680 |
| Lot size: | 5,310 sq ft / 0.12 acre |
| Year built: | 1900 |
| Heating: | Forced air |
| Cooling: | -- |
| Garage: | Basement |
| Fireplace: | Yes |

Zestimate: $770,718

⊕ Show all Home Facts

Owner's Facts

The owner has not updated home facts or created an estimate yet.

Are you the owner?
[Edit home facts]
Learn more

[Create an estimate]
Learn more

After you're done, your updated home facts will appear in this space. You can also make your estimate public or keep it private!

Home Facts

Zillow's Facts

| | |
|---|---|
| Residence: | Single family — 1411 |
| Bedrooms: | 5 |
| Baths: | 3.5 — 1412 |
| Sq ft: | 3,680 — 1413 |
| Lot size: | 5,310 sq ft / 0.12 acre |
| Year built: | 1900 |
| Heating: | Forced air |
| Cooling: | -- — 1414 |
| Garage: | Basement |
| Fireplace: | Yes |

Zestimate : $770,718 — 1430

⊙ Show all Home Facts — 1440

Owner's Facts (as of 5/10/06)
Edit my facts | Remove my facts

| | |
|---|---|
| | Single family |
| | 6 — 1451 |
| | 4 — 1452 |
| | 4210 — 1453 |
| | 5,310 sq ft / 0.12 acre |
| | 1900 |
| | Forced air |
| | Central air — 1454 |
| | Basement |
| | Yes |

Create an Estimate — 1460

Home Facts

Zillow's Facts

| | |
|---|---|
| Residence: | Single family |
| Bedrooms: | 5 |
| Baths: | 3.5 |
| Sq ft: | 3,680 |
| Lot size: | 5,310 sq ft / 0.12 acre |
| Year built: | 1900 |
| Heating: | Forced air |
| Cooling: | -- |
| Garage: | Basement |
| Fireplace: | Yes |
| Zestimate: | $770,718 |

Owner's Facts (as of 5/10/06)
Report this

| | |
|---|---|
| | Single family |
| | 6 |
| | 4 |
| | 4210 |
| | 5,310 sq ft / 0.12 acre |
| | 1900 |
| | Forced air |
| | Central air |
| | Basement |
| | Yes |
| | Owner's Estimate: $790,234 |
| | (as of 5/10/06) |

Show all Home Facts

*FIG. 15*

FIG. 16 property attribute value table (1600)

| PropertyID | PropertyAttributeTypeID | DataSourceTypeID | SeqNbr | AttributeValueEnumID | AttributeValue | AttributeUsageID | UseRank |
|---|---|---|---|---|---|---|---|
| 11111111 | 111 | 1 | 1 |  | 5 | 1 | 3 |
| 11111111 | 111 | 2 | 1 |  | 6 | 1 | 3 |
| 11111111 | 112 | 1 | 1 |  | 3.5 | 1 | 4 |
| 11111111 | 112 | 2 | 1 |  | 4 | 1 | 4 |
| 11111111 | 113 | 1 | 1 |  | 5310 | 3 | 8 |
| 11111111 | 114 | 1 | 1 |  | 3680 | 3 | 7 |
| 11111111 | 114 | 2 | 1 |  | 4210 | 3 | 7 |
| 11111111 | 115 | 1 | 1 |  | 12 | 1 | 6 |
| 11111111 | 115 | 2 | 1 |  | 14 | 1 | 6 |
| 11111111 | 116 | 1 | 1 | 4 |  | 2 | 22 |
| 11111111 | 116 | 2 | 1 | 5 |  | 2 | 22 |
| 11111111 | 117 | 1 | 1 |  | 2 | 1 | 11 |
| 11111111 | 118 | 2 | 1 | 3 |  | 2 | 22 |
| 11111112 | 111 |  | 1 |  | 5 | 1 | 3 |
| ... | ... | ... | ... | ... | ... | ... | ... |

1601  1602  1603  1604  1605  1606  1607  1608

FIG. 17 property table — 1700

| property ID | address | county | city | state | zip |
|---|---|---|---|---|---|
| 11111111 | 1234 Holly Ave. | King | Seattle | WA | 98122 |
| 11111112 | 567 Oak Ln. | King | Seattle | WA | 98122 |

1701, 1702, 1703, 1704 (1711), 1705 (1712), 1706

FIG. 18 property attribute type table — 1800

| PropertyAttributeTypeID | PropertyAttributeTypeDesc |
|---|---|
| 111 | number of bedrooms |
| 112 | number of bathrooms |
| 113 | lot size |
| 114 | home size |
| 115 | total number of rooms |
| 116 | cooling |
| 117 | number of floors |
| 118 | roof type |
| ... | ... |

1801, 1802, 1811–1818 data source type table — 1900

| DataSourceTypeID | DataSourceTypeDesc |
|---|---|
| 1 | local government |
| 2 | current owner | attribute value enum table — 2000

| AttributeValueEnumID | PropertyAttributeTypeID | AttributeValueEnumDesc |
|---|---|---|
| 1 | 111 | composite |
| 2 | 111 | cedar shake |
| 3 | 111 | clay tile |
| 4 | 116 | none |
| 5 | 116 | central |
| 6 | 116 | window |
| 7 | 116 | in-floor |

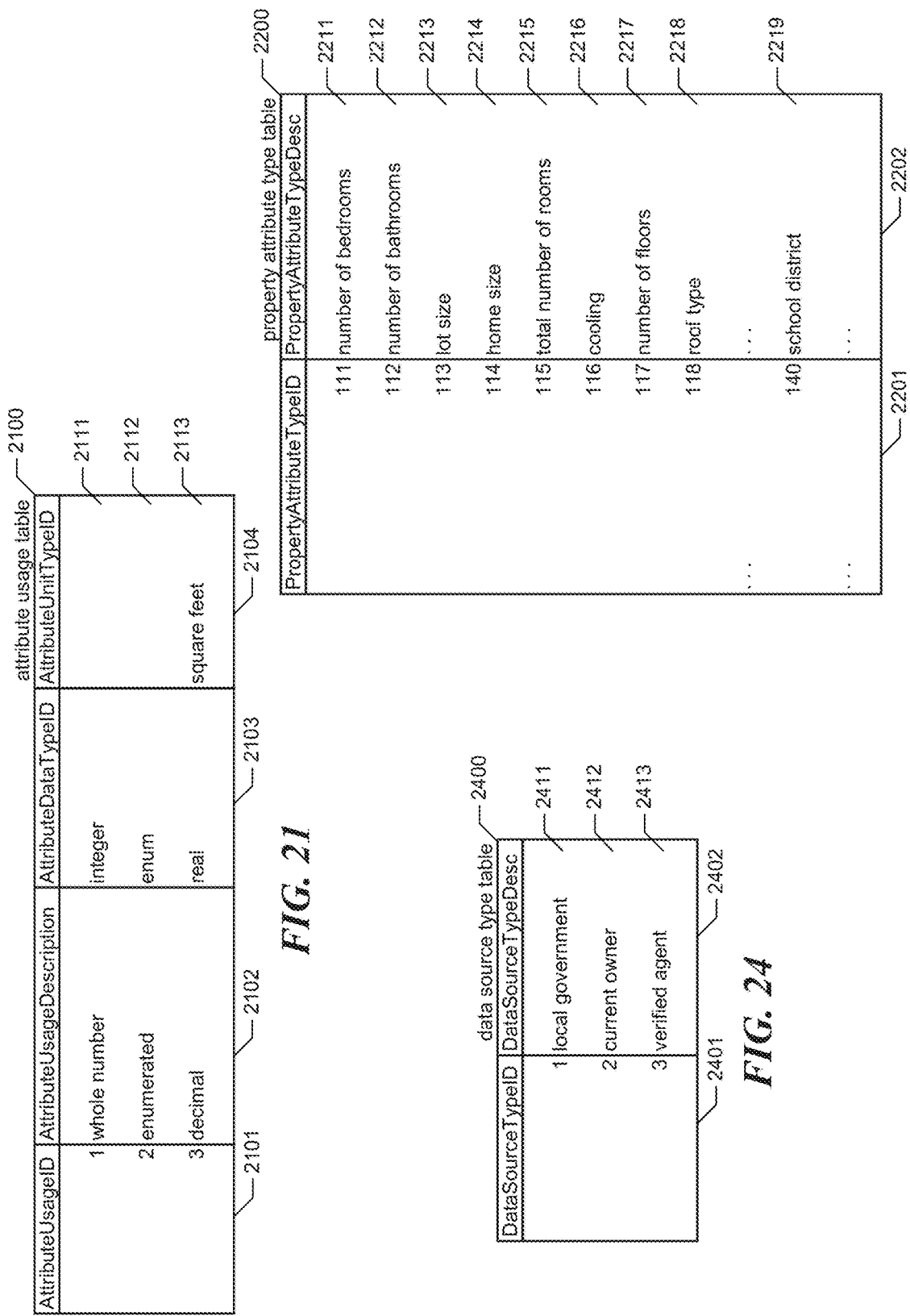

| PropertyID | PropertyAttributeTypeID | DataSourceTypeID | SeqNbr | AttributeValueEnumID | AttributeValue | AttributeUsageID | UseRank |
|---|---|---|---|---|---|---|---|
| 11111111 | 111 | 1 | 1 |  | 5 | 1 | 3 |
| 11111111 | 111 | 2 | 1 |  | 6 | 1 | 3 |
| 11111111 | 112 | 1 | 1 |  | 3.5 | 1 | 4 |
| 11111111 | 112 | 2 | 1 |  | 4 | 1 | 4 |
| 11111111 | 113 | 1 | 1 |  | 5310 | 3 | 8 |
| 11111111 | 114 | 1 | 1 |  | 3680 | 3 | 7 |
| 11111111 | 114 | 2 | 1 |  | 4210 | 3 | 7 |
| 11111111 | 115 | 1 | 1 | 4 | 12 | 1 | 6 |
| 11111111 | 115 | 2 | 1 | 5 | 14 | 1 | 6 |
| 11111111 | 116 | 1 | 1 | 3 |  | 2 | 22 |
| 11111111 | 116 | 2 | 1 |  |  | 2 | 22 |
| 11111111 | 117 | 1 | 1 |  | 2 | 1 | 11 |
| 11111111 | 118 | 2 | 1 |  |  | 2 | 22 |
| 11111111 | 140 | 2 | 1 |  | 203 | 1 | 63 |
| 11111112 | 111 | 1 | 1 |  | 5 | 1 | 3 |

*FIG. 23*

| PropertyID | PropertyAttributeTypeID | DataSourceTypeID | SeqNbr | AttributeValueEnumID | AttributeValue | AttributeUsageID | UseRank |
|---|---|---|---|---|---|---|---|
| 11111111 | 111 | 1 | 1 |  | 5 | 1 | 3 |
| 11111111 | 111 | 2 | 1 |  | 6 | 1 | 3 |
| 11111111 | 112 | 1 | 1 |  | 3.5 | 1 | 4 |
| 11111111 | 112 | 2 | 1 |  | 4 | 1 | 4 |
| 11111111 | 113 | 1 | 1 |  | 5310 | 3 | 8 |
| 11111111 | 113 | 3 | 1 |  | 5350 | 3 | 8 |
| 11111111 | 114 | 1 | 1 |  | 3680 | 3 | 7 |
| 11111111 | 114 | 2 | 1 |  | 4210 | 3 | 7 |
| 11111111 | 115 | 1 | 1 |  | 12 | 1 | 6 |
| 11111111 | 115 | 2 | 1 | 4 |  | 1 | 6 |
| 11111111 | 116 | 1 | 1 | 5 | 14 | 2 | 22 |
| 11111111 | 116 | 2 | 1 |  |  | 2 | 22 |
| 11111111 | 117 | 1 | 1 | 3 | 2 | 1 | 11 |
| 11111111 | 118 | 2 | 1 |  |  | 2 | 22 |
| 11111111 | 140 | 2 | 1 |  | 203 | 1 | 63 |
| 11111112 | 111 | 1 | 1 |  | 5 | 1 | 3 | property attribute value table — 2500

*FIG. 25*

COLLECTING AND REPRESENTING HOME ATTRIBUTES

CROSS-REFERENCE TO RELATED APPLICATIONS

This application is a continuation of U.S. patent application Ser. No. 15/456,235, filed Mar. 10, 2017, entitled "COLLECTING AND REPRESENTING HOME ATTRIBUTES," which is a continuation of U.S. patent application Ser. No. 15/220,518, filed Jul. 27, 2016, entitled "COLLECTING AND REPRESENTING HOME ATTRIBUTES," which is a continuation of U.S. patent application Ser. No. 15/096,363, filed on Apr. 12, 2016, entitled "COLLECTING AND REPRESENTING HOME ATTRIBUTES," which is a continuation of U.S. patent application Ser. No. 14/982,338, filed on Dec. 29, 2015, entitled "COLLECTING AND REPRESENTING HOME ATTRIBUTES," which is a continuation of U.S. patent application Ser. No. 14/852,418, filed on Sep. 11, 2015, entitled "COLLECTING AND REPRESENTING HOME ATTRIBUTES," which is a continuation of U.S. patent application Ser. No. 11/524,047, filed on Sep. 19, 2006, entitled "COLLECTING AND REPRESENTING HOME ATTRIBUTES," each of which is incorporated herein by reference in its entirety.

TECHNICAL FIELD

The described technology is directed to the fields of information gathering and representation.

BACKGROUND

It can be useful to have information about the attributes of one or more properties, such as one or more residential properties. Typical examples of such "home facts" include lot size, number of bedrooms, number of bathrooms, total floor space, view type, and roof type. By obtaining home facts for a home of interest, a person can arrive at a better sense of the home and its level of suitability to particular buyers.

In many cases, information about at least some home facts of a particular home is compiled by a governmental agency, such as the assessor's office for the county in which the home is located. Such information may be available directly from the governmental agency, and/or an intermediary information provider.

Unfortunately, information about home facts obtained in this way is frequently incomplete, in that it may cover only a few of a longer list of home facts that are of interest. Additionally, information about home facts obtained in this way is often out of date, or otherwise inaccurate. These deficiencies, typical of home facts information derived from common sources, tend to limit the value of presently-available home facts information.

Accordingly, an approach capable of acquiring, storing, and using a more complete and accurate set of home facts for a particular house than is available from government sources would have significant utility.

BRIEF DESCRIPTION OF THE DRAWINGS

FIG. 3 is a display diagram showing a sample display typically presented by the facility before the owner for a particular home has inputted home facts—i.e., attribute values—for a particular home.

FIG. 8 is a display diagram showing a typical display presented by the facility in order to obtain credit card information from the user.

FIG. 12 is a display diagram showing an initial version of a display usable by a user identified as the owner of the home to provide attribute values for the home.

FIG. 13 is a display diagram showing the second version of the display shown in FIG. 12.

FIG. 14 is a display diagram showing a sample display presented by the facility in response to receiving home facts from the user identified as the owner of the home.

FIG. 15 is a display diagram showing a sample display presented by the facility containing a valuation of the home generated at least in part based upon the attribute values provided by the owner.

FIG. 16 is a table diagram showing sample contents of the property attribute value table.

FIG. 17 is a table diagram showing sample contents of the property table in the first state of the home facts database.

FIG. 18 is a table diagram showing sample contents of the property attribute type table in the first state of the home facts database.

FIG. 21 is a table diagram showing sample contents of the attribute usage table in a first state of the home facts database.

FIG. 22 is a table diagram showing sample contents of the property attribute type table in the second state of the home facts database.

FIG. 23 is a table diagram showing several contents of the property attribute value table in the second state of the home facts database.

FIG. 24 is a table diagram showing sample contents of the data source type table in the third state of the home facts database.

FIG. 25 is a table diagram showing sample contents of the property attribute value table 2500 in the third state of the home facts database.

DETAILED DESCRIPTION

A software facility for managing information about home facts ("the facility") is described. The facility takes advantage of an extensible storage architecture for home facts information, which can be easily expanded to accommodate new home facts or updated ranges of values for existing home facts. In some embodiments, the storage architecture simultaneously stores home facts information from multiple sources about the same home, such as home facts information from a government agency, home facts obtained from a user identified as the owner of the home, and home facts obtained from a user identified as having some other role with respect to the home, such as a former owner, an appraiser charged with appraising the house, or a listing agent who is undertaking to sell the house.

In some embodiments, the facility provides a user interface that the owner of a home or another user knowledgeable about the home can use to correct information provided for the home by another source; confirm information provided for the home by another source; or provide information about the home not available from another source. The home facts information provided using the user interface can include various types of data, such as numerical values, text, items selected from enumerated lists, photos or videos of the home, documents relating to the home such as appraisals or inspection reports, etc.

In some embodiments, the facility displays together home facts information about a particular home from multiple sources, or otherwise uses home facts information about a particular home from multiple sources. In some embodiments, the facility employs logic for combining home facts information from multiple sources to obtain composite home facts information for a home whose completeness and/or accuracy may exceed those of home facts information from a government agency. As useful home facts information for a home becomes available from additional sources, the quality of the composite home facts obtained for the home using the combination logic may continue to increase.

In some embodiments, the facility employs one or more approaches to identifying the current owner of a home, so as to limit the ability of non-owners to inaccurately identify themselves as owners and submit unreliable home facts.

Figure 1:
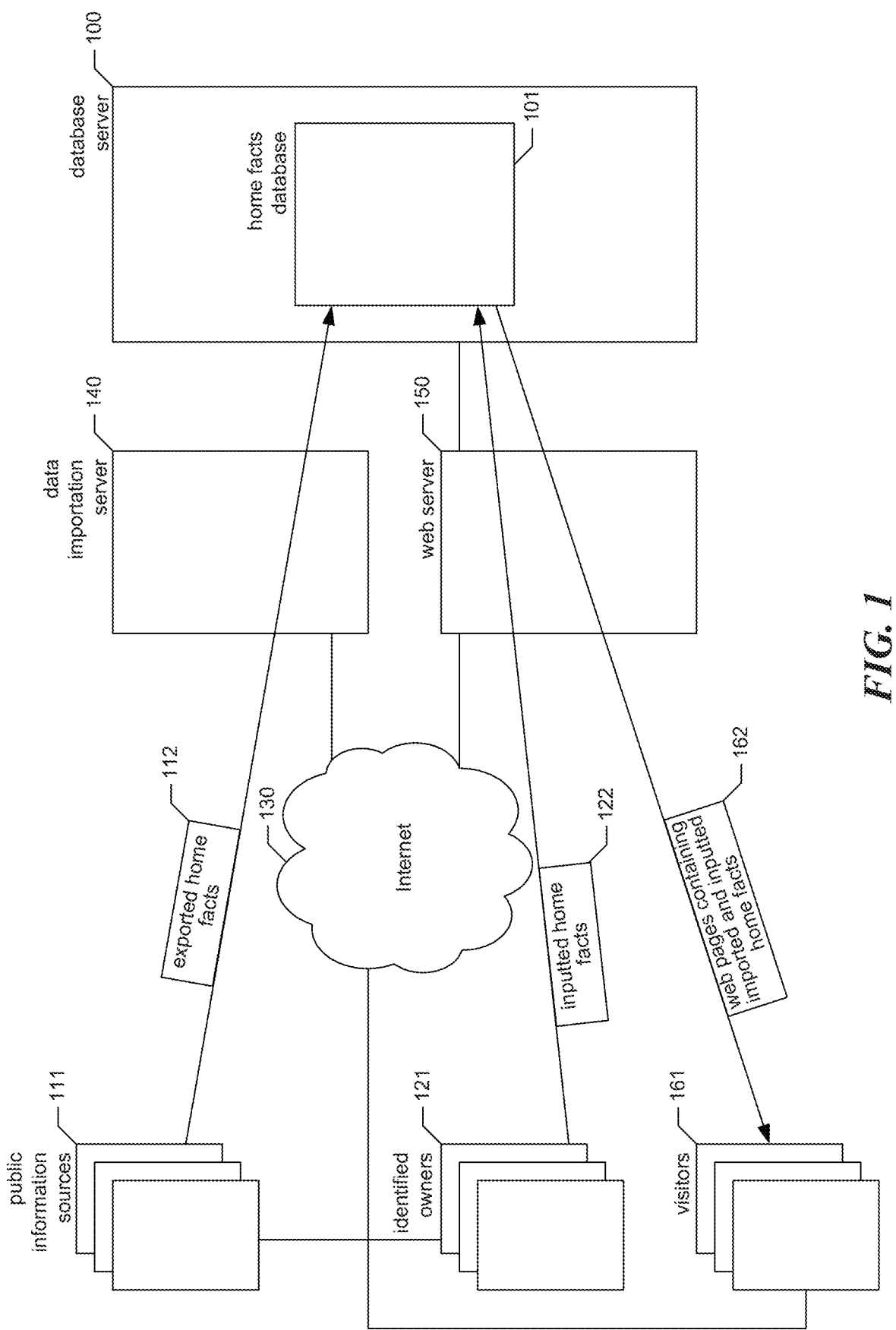
FIG. 1 is a high-level data flow diagram showing data flow within a typical arrangement of components used to provide the facility.

FIG. 1 is a high-level data flow diagram showing data flow within a typical arrangement of components used to provide the facility. FIG. 1 shows a home facts database 101 in which the facility stores home facts information obtained from multiple sources, which is hosted by one or more database servers 100. As examples, the home facts database contains home facts information 112 exploited from public information sources such as title recording offices, property tax assessment or collection agencies, or intermediaries providing access to such data, via the Internet 130 and a data importation server 140. Additionally, the home facts database contains home facts 122 inputted by users identified as owners of the subject homes via the Internet and a web server 150. All of the contents of the home facts database are potentially available for inclusion in web pages 162 generated by the facility containing information about particular houses or groups of houses and served to visitors 161.

While various embodiments are described in terms of the environment described above, those skilled in the art will appreciate that the facility may be implemented in a variety of other environments including a single, monolithic computer system, as well as various other combinations of computer systems or similar devices connected in various ways. In various embodiments, a variety of computing systems or other different client devices may be used in place of the web client computer systems, such as mobile phones, personal digital assistants, televisions, cameras, etc.

Figure 2:
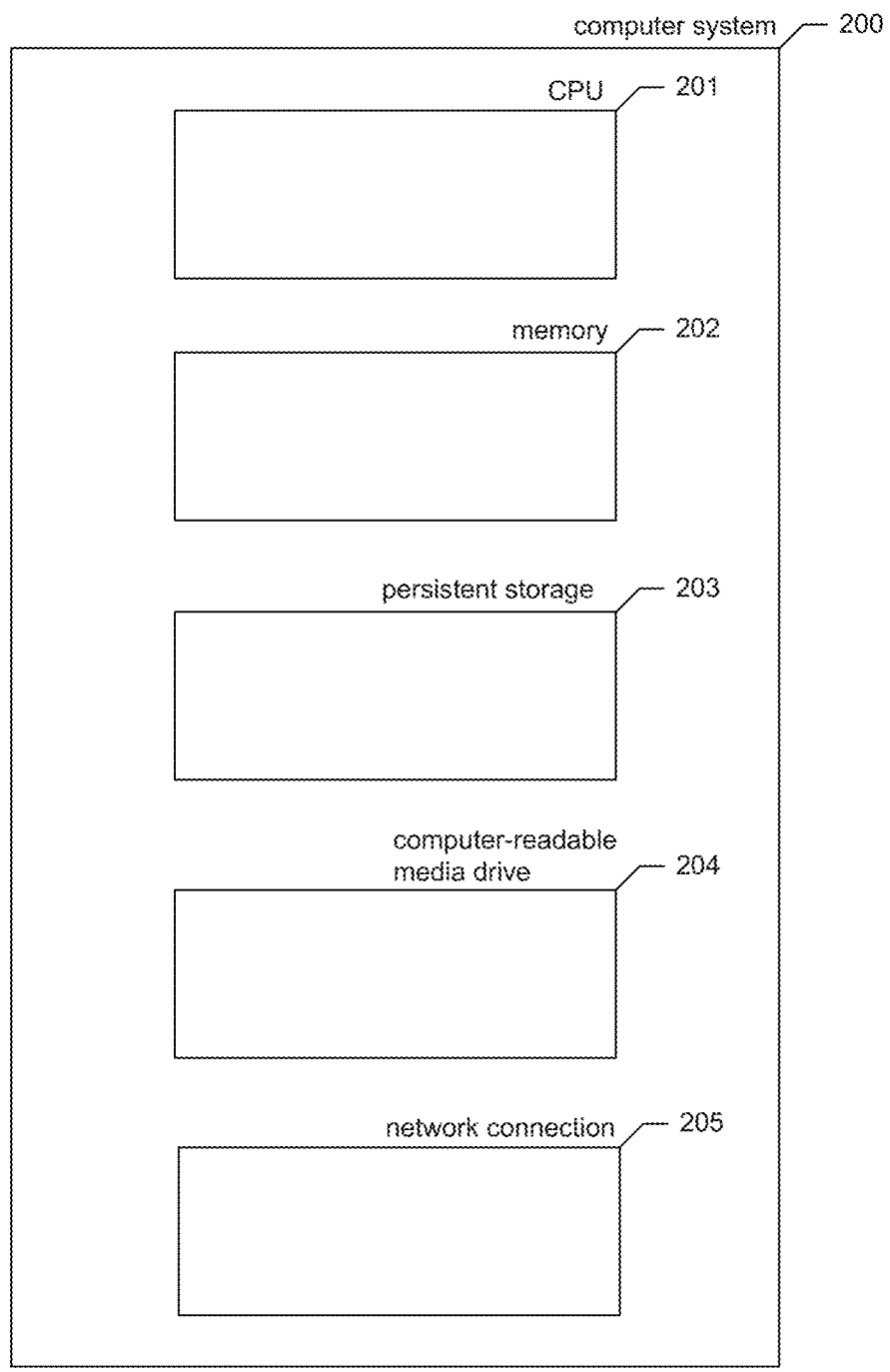
FIG. 2 is a block diagram showing some of the components typically incorporated in at least some of the computer systems and other devices on which the facility executes.

FIG. 2 is a block diagram showing some of the components typically incorporated in at least some of the computer systems and other devices on which the facility executes. These computer systems and devices 200 may include one or more central processing units ("CPUs") 201 for executing computer programs; a computer memory 202 for storing programs and data while they are being used; a persistent storage device 203, such as a hard drive for persistently storing programs and data; a computer-readable media drive 204, such as a CD-ROM drive, for reading programs and data stored on a computer-readable medium; and a network connection 205 for connecting the computer system to other computer systems, such as via the Internet. While computer systems configured as described above are typically used to support the operation of the facility, those skilled in the art will appreciate that the facility may be implemented using devices of various types and configurations, and having various components.

In some embodiments, identified owners and/or visitors may use a variety of devices in order to input home facts or view home facts provided form the home facts database. These users may use desktop computers, laptop computers, wireless email devices, wireless phones, set top boxes, automobile computers, or other devices having a web browser to interact with web pages with respect to such information. Additionally, these users may use these or other types of devices to communicate directly or indirectly with the server in a variety of other modes, including via email, text message, voice message, live voice call, etc.

FIG. 3 is a display diagram showing a sample display typically presented by the facility before the owner for a particular home has inputted home facts—i.e., attribute values—for a particular home. The display 300 indicates attribute values 310 obtained from a source other than the owner, such as attribute values obtained from government sources. The display further shows a valuation 330 determined in accordance with these attribute values, and a control 340 that the user may activate to display all such attribute values. The display further includes an indication that attribute values have not yet been received for this home by the home's owner, and a control 349 that the user may activate in order to provide attribute values for the home.

While FIG. 3 in each of the display diagrams discussed below show particular display contents and organization, generally formatted as a web page or a portion of a web page, those skilled in the art will appreciate that actual displays used by the facility to present information may differ from those shown, in that they, for example, may contain different information, information that is portrayed differently, a different organization, a different format, etc.

Figure 4A:
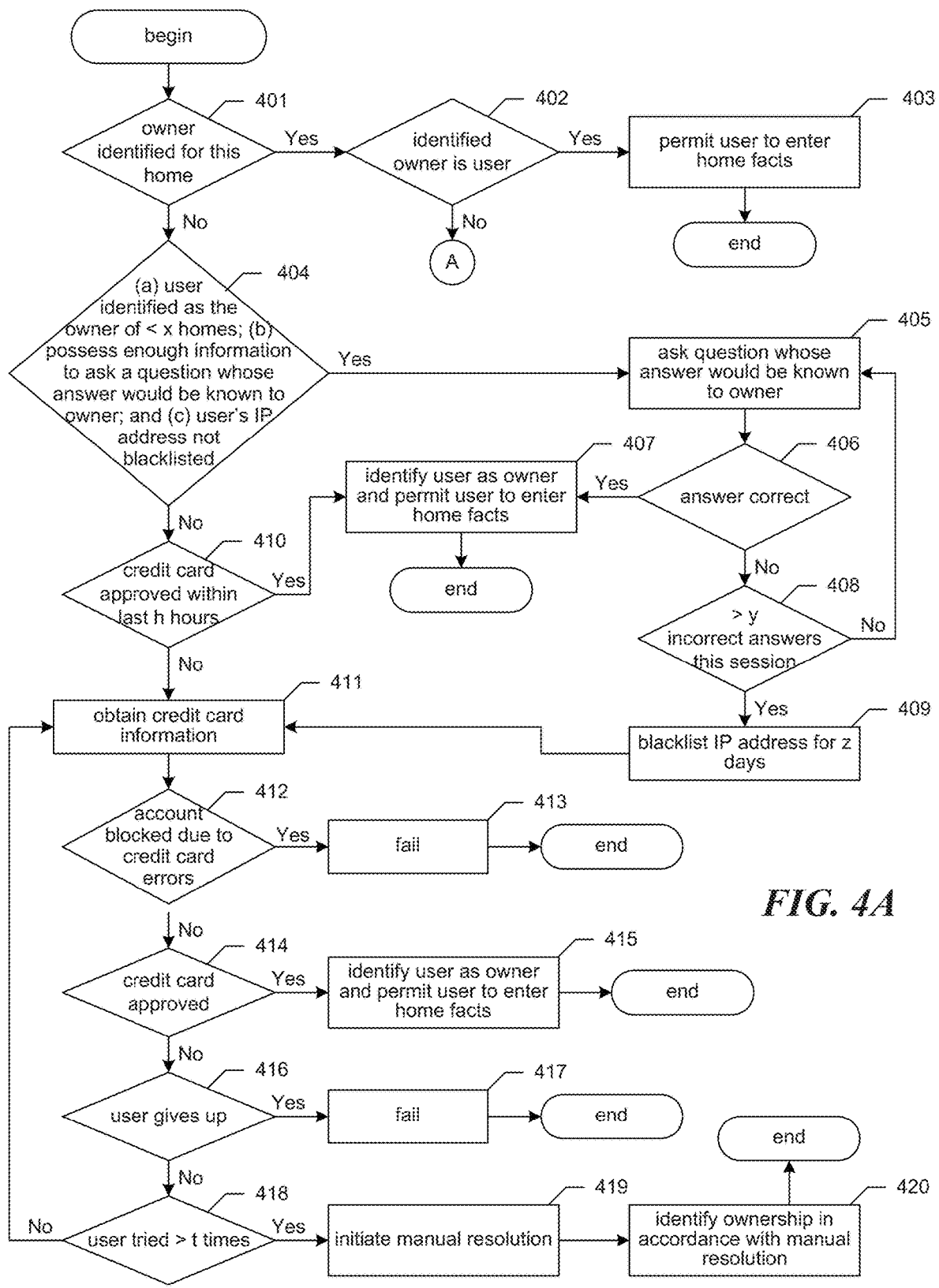
FIGS. 4A-4B contain a flow diagram showing steps typically performed by the facility in order to determine whether to identify a particular user as the owner of a particular home, and subsequently permit that user to provide attribute values for that home that are stored in the home facts database.
Figure 4B:
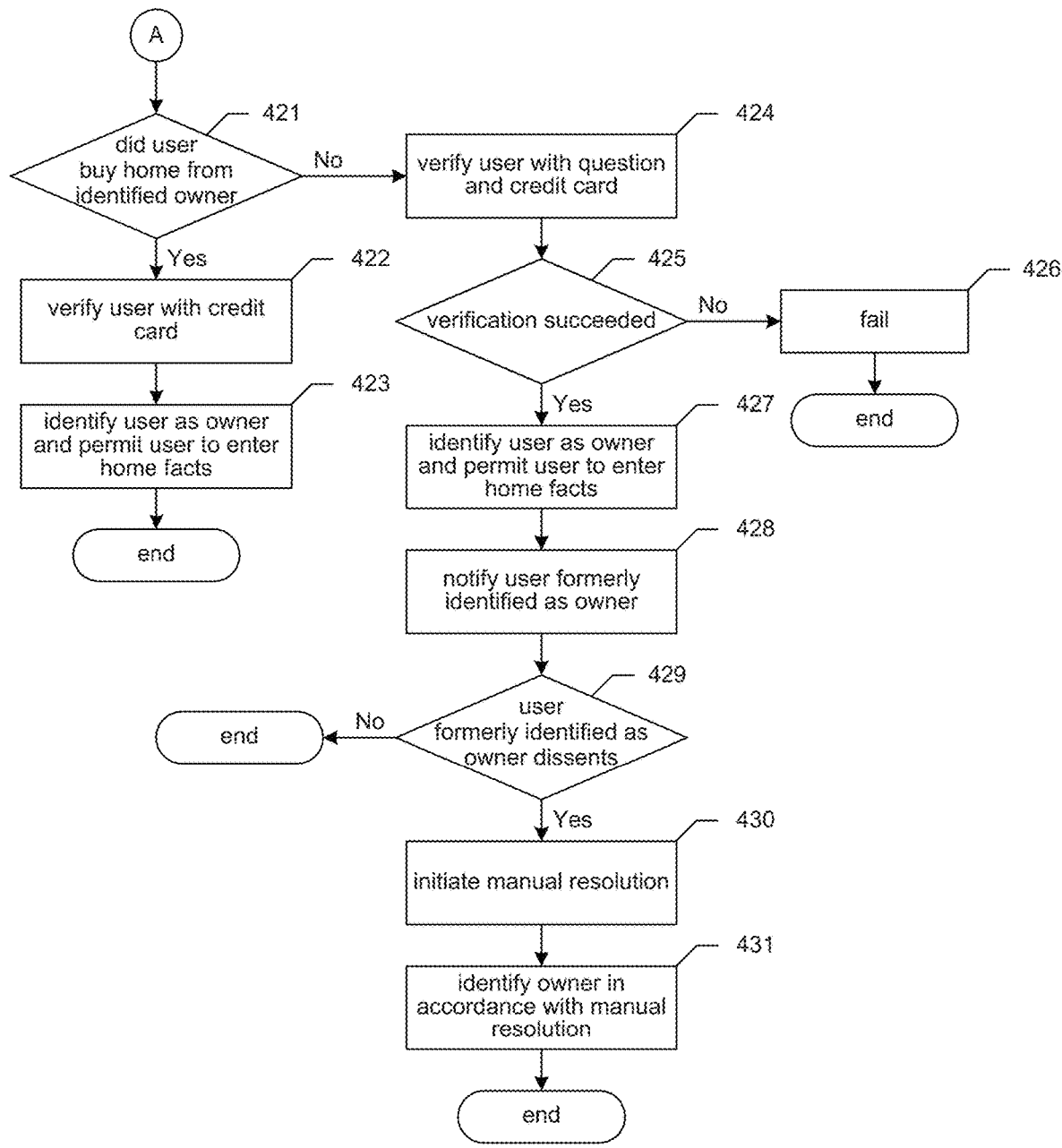

In some embodiments, in response to the user's activation of control 349, the facility performs a process to determine whether to identify the user as the owner of the current home. FIGS. 4A-4B contain a flow diagram showing steps typically performed by the facility in order to determine whether to identify a particular user as the owner of a particular home, and subsequently permit that user to provide attribute values for that home that are stored in the home facts database. In step 401, if an owner is presently identified for this home, then the facility continues in step 402, else the facility continues in step 404. In step 402, if the identified owner is the current user, then the facility continues in step 403, else the facility continues through connector A at step 421, shown in FIG. 4B. In step 403, the facility permits the current user to provide and/or edit home facts as is discussed further below in connection with FIGS. 12-15. After step 403, these steps conclude.

In step 404, if each of the following three conditions is true, then the facility continues in step 405, else the facility continues in step 410: the user is identified as the owner of fewer than X homes, such as one home; the facility possesses enough information to ask a question whose answer would be known to the owner of the home; and the IP address of the user's computer is not presently blacklisted. In step 405, the facility asks a question of the user whose answer would be known to the owner of the home.

Figure 5:
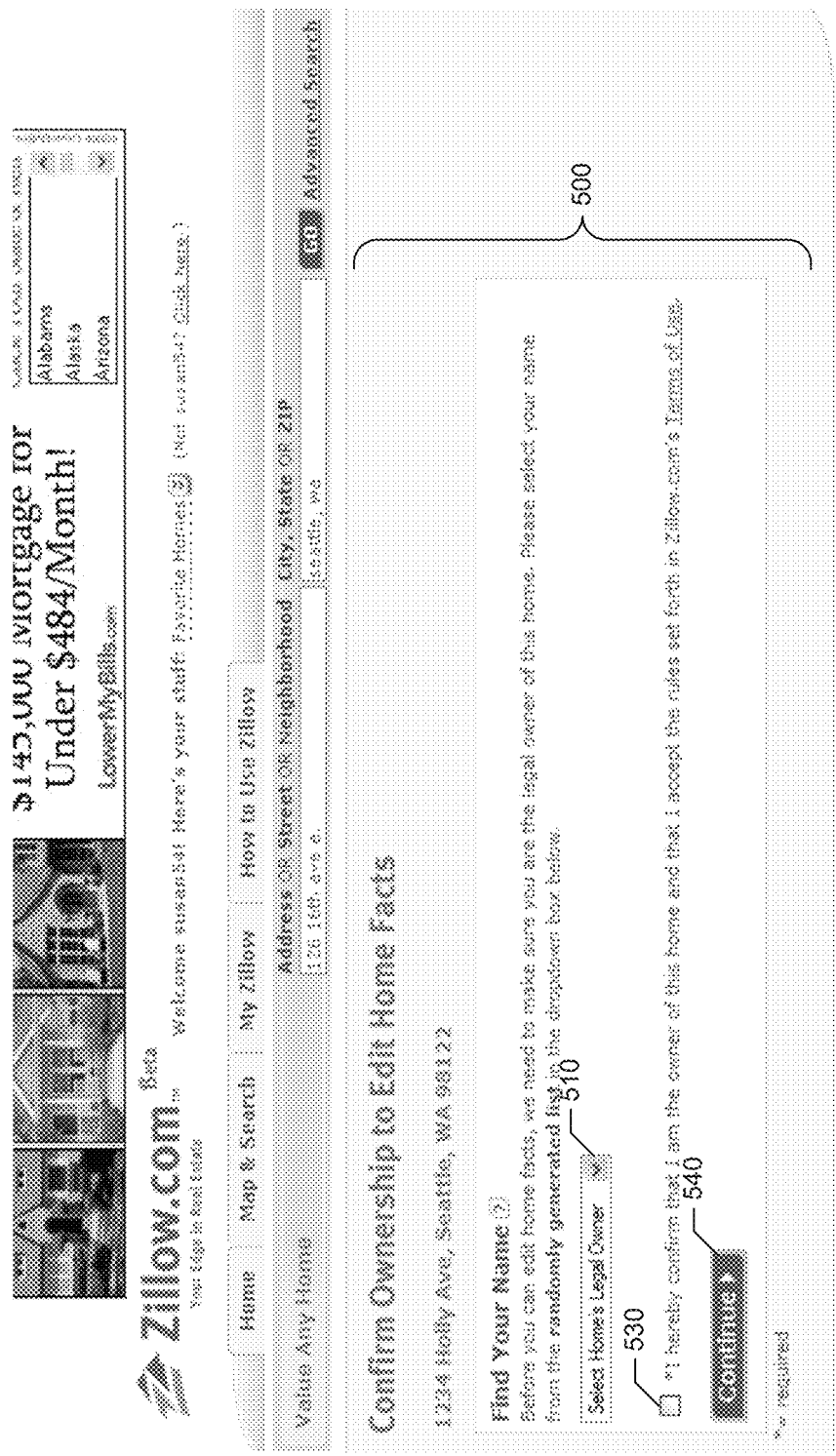
FIGS. 5 and 6 are display diagrams showing a sample display presented by the facility to ask a question of the user.
Figure 6:
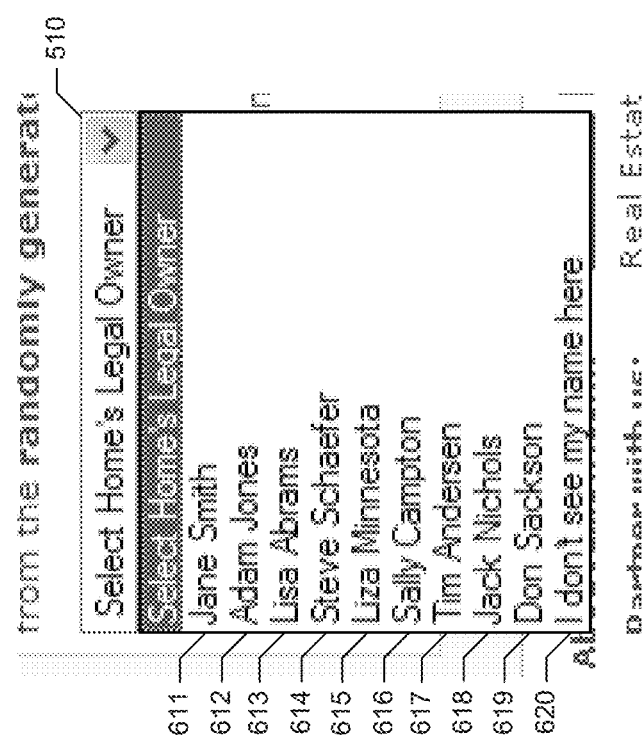

FIGS. 5 and 6 are display diagrams showing a sample display presented by the facility to ask a question of the user. Display 500 includes a control 510 usable by the user to answer the posed question, here the name of the home's legal owner. This control is shown expanded in FIG. 6, with a list of names 611-616 that the user may select in response to the question, as well as alternative 620 indicating that the user's name is not among those displayed. In some embodiments, the name of the home's legal owner is randomly located within the order of names shown in the control, and/or randomly omitted from this list. In various embodiments, other types of questions whose answer is expected to be known by the home's owner are used in step 405. After the user operates the control 510 to select the correct answer to the question, the user selects a checkbox 530 confirming that he or she is the owner of the home, and activates a continue control 540.

Returning to FIG. 4A, in step 406, if the answer provided by the user to the question posed in step 405 is correct, then the facility continues in step 407, else the facility continues in step 408. In step 407, the facility identifies the current user as the owner of the home, and permits this user to enter home facts as described below. After step 407, these steps conclude.

Figure 7:
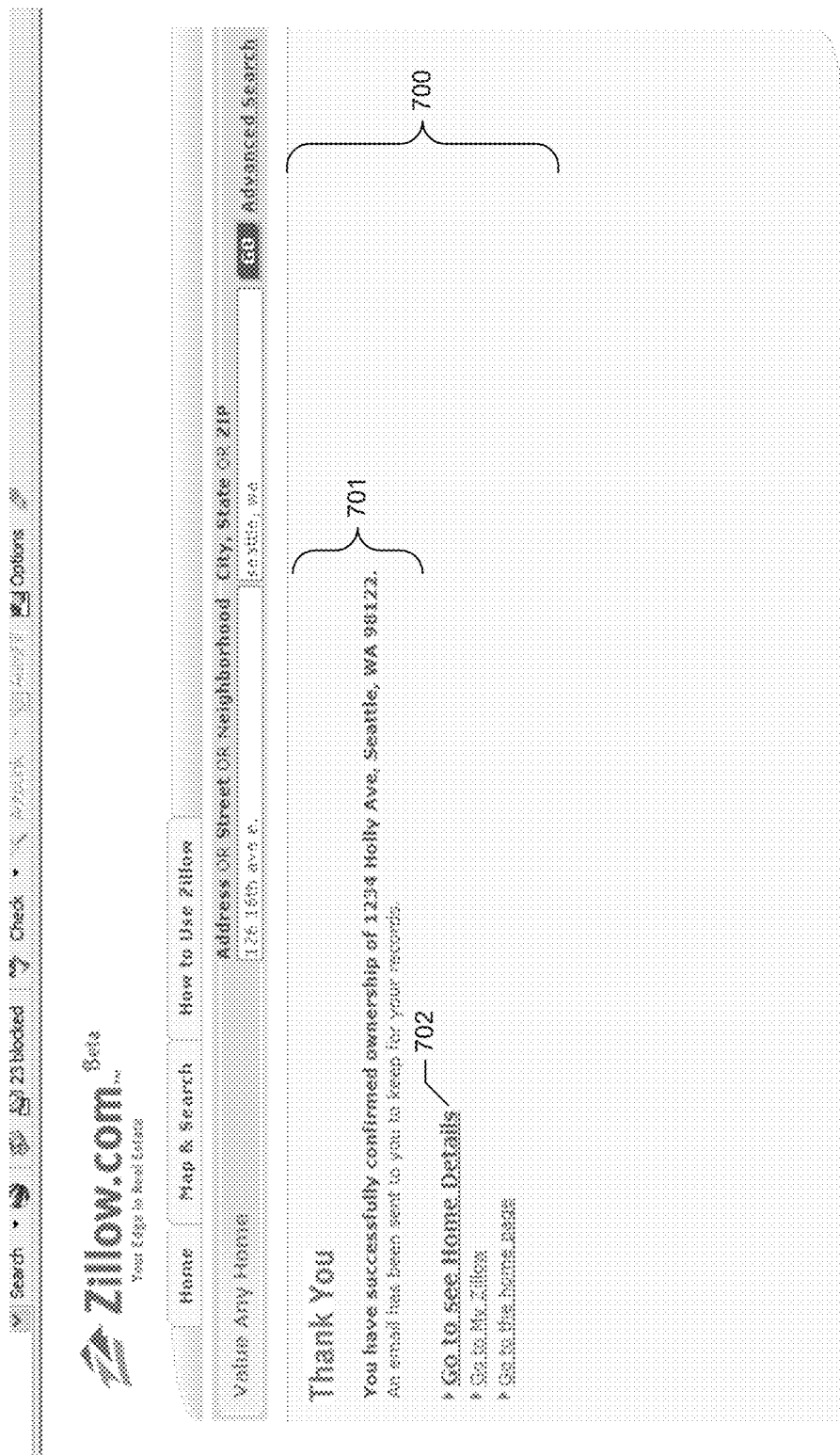
FIG. 7 is a display diagram showing a typical display presented by the facility when the user has been identified as the owner of the home.

FIG. 7 is a display diagram showing a typical display presented by the facility when the user has been identified as the owner of the home. The display 700 includes an indication 701 that the user has been identified as the owner of the home, and a control 702 that the user may activate in order to edit home details for the home. In some embodiments, rather than presenting the display shown in FIG. 7, after step 407, the facility immediately presents a display that enables the user to edit the home facts for the home, such as the display shown in FIG. 12.

Returning to FIG. 4A, in step 408, if the user has provided more than a number Y of incorrect answers to the questions posed in step 405 during a particular foregoing period of time, such as the current web browsing session, then the facility continues in step 409, else the facility continues in step 405 to ask another question whose answer would be known to the owner of the home. In step 409, the facility blacklists the IP address of the user's computer for Z days, such as seven days, preventing this computer from being used to claim a home by answering questions posed in step 405 for this period of time. After step 409, the facility continues in step 411.

In step 410, if this user has provided credit card information within the last H hours—such as the last one hour—that has subsequently been successfully verified, then the facility continues in step 407 to identify the user as the owner of the home, else the facility continues in step 411. In step 411, the facility obtains credit card information from the user.

Figure 8:
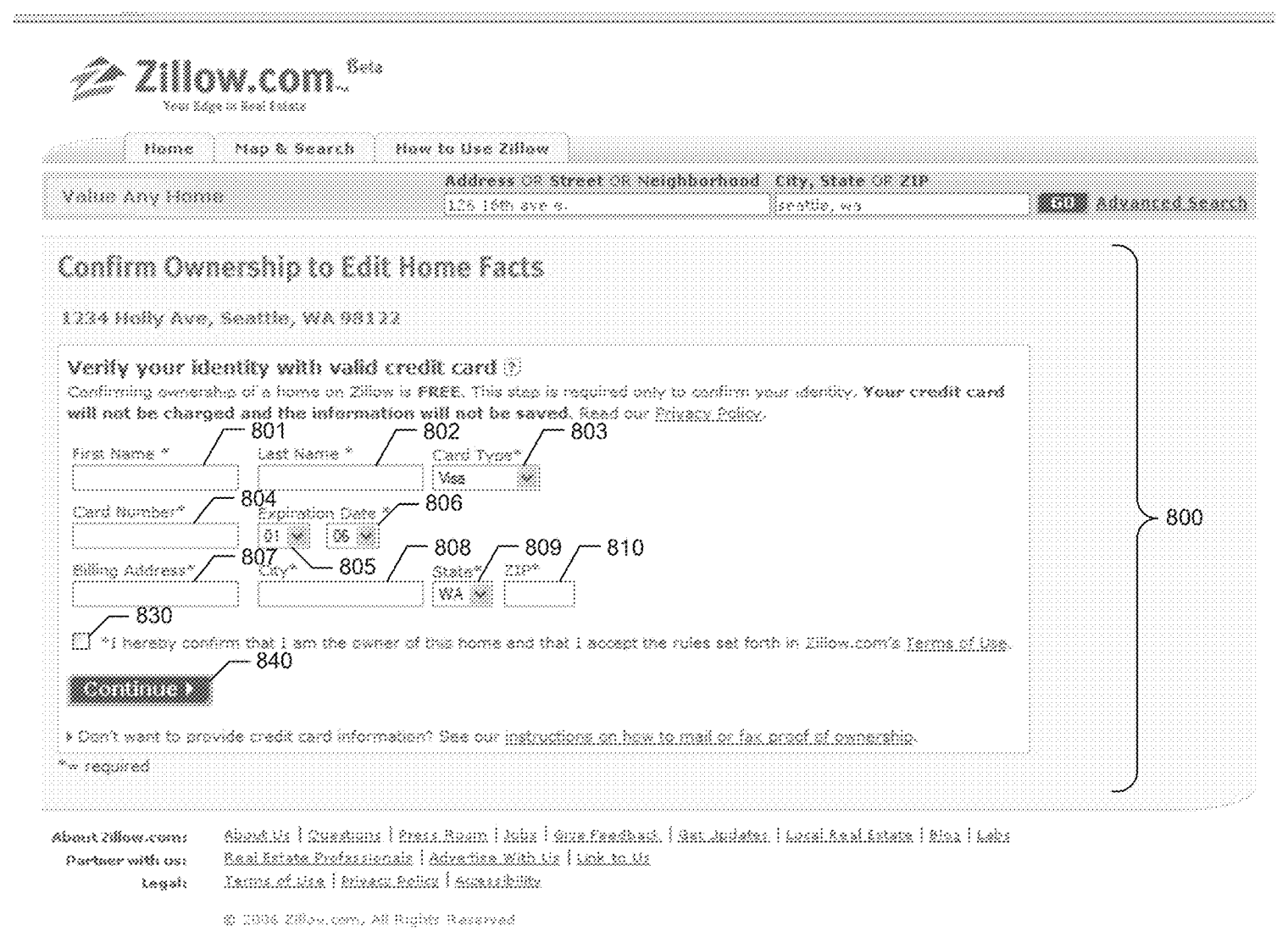

FIG. 8 is a display diagram showing a typical display presented by the facility in order to obtain credit card information from the user. The display 800 contains controls 801-810 that may be used by the user to provide credit card information. The display further includes a checkbox 830 for the user to select in order to confirm that the user is the owner of the home. The display further includes a continued control 840 that the user may activate in order to submit the entered credit card information.

Returning to FIG. 4A, in step 412, if the user's account is blocked due to earlier credit card errors, then the facility continues in step 413, else the facility continues in step 414. In step 413, the user's efforts to be identified as the owner of the home fail, and these steps conclude without identifying the user as the owner of the home. In step 414, the credit card information obtained from the user in step 411 is verified, such as with the issuer of the credit card, a charge-clearing bureau associated with the credit card, or similar entity; if the credit card information is approved, then the facility continues in step 415, else the facility continues in step 416. In step 415, the facility identifies the user as the owner of the home and permits the user to enter home facts. After step 415, these steps conclude.

In step 416, if the user gives up on attempting to be identified as the owner of the home, then the facility continues in step 417, else the facility continues in step 418. In step 417, the user's efforts to be identified as the owner of the home fail, and these steps conclude without identifying the user as the owner of the home.

In step 418, if the user has tried more than T times, such as two times, to be identified as the owner of the home based on credit card information, then the facility continues in step 419, else the facility continues in step 411 to again obtain credit card information from the user.

In step 419, as the user has not given up, the facility initiates a manual resolution process for determining whether the user is the owner of the home. As an example, the manual resolution process may require the user to provide documentary evidence that he or she is the owner of the home to the operator of the facility, such as via postal mail, email, or the uploading of an image of such documentary evidence. Such documentary evidence may include copies or images of such documents as: a deed, a title, a mortgage statement, a property tax assessment, a property tax bill, a recent utility bill, or another document identifying both the home and the user and reflecting ownership of the home by the user.

Figure 9:
FIG. 9 is a display diagram showing a display typically presented by the facility in connection with the manual resolution process.

FIG. 9 is a display diagram showing a display typically presented by the facility in connection with the manual resolution process. It contains information 900 about the manual resolution process, including a sample list of acceptable documents.

Returning to FIG. 4A, in step 420, the facility identifies the ownership of the home in accordance with the result of the manual resolution process. In some embodiments, this involves identifying the user as the owner of the home if the user successfully completes the manual resolution process, and not identifying any owner for the home if the user does not successfully complete the manual resolution process. After step 420, these steps conclude.

Turning to FIG. 4B, in step 421, if the user purchased the home from the person currently identified as the owner of the home, then the facility continues in step 422, else the facility continues in step 424.

Figure 10:
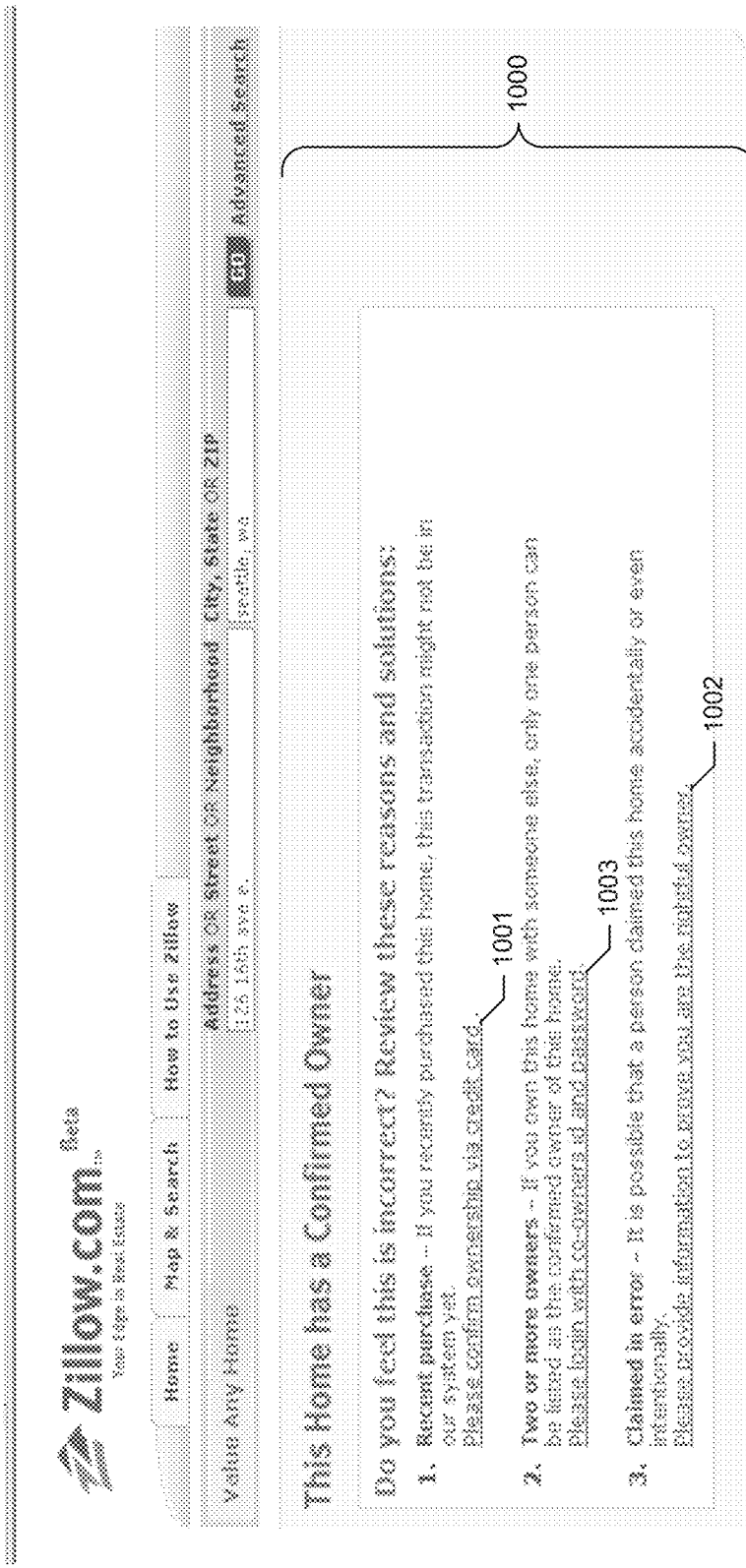
FIG. 10 is a display diagram showing a typical display presented by the facility in order to determine whether the user purchased the home from the owner presently identified for the home.

FIG. 10 is a display diagram showing a typical display presented by the facility in order to determine whether the user purchased the home from the owner presently identified for the home. The display 1000 includes a control 1001 that the user may operate in order to indicate that they recently purchased the home, and begin an appropriate process for confirming their ownership of the home. In some embodiments, the display also includes a control 1002 that the user may activate to indicate that the user currently identified as the owner of the home maliciously and erroneously requested to be identified as the owner of the home, and a control 1003 that the user may activate in order to indicate that the user co-owns the home with the person presently identified as the owner of the home.

Returning to FIG. 4B, in step 422, the facility verifies the user with credit card information in accordance with steps 411, 412, 414, 416, and 418. In step 423, if the verification of step 422 succeeded, the facility identifies the user as the owner of the home and permits the user to enter home facts. After step 423, these steps conclude.

In step 424, the facility verifies the user with both a question—in accordance with steps 405, 406, and 408—and with credit card information—in accordance with steps 411, 412, 414, 416, and 418. In step 425, if both forms of verification performed in step 424 succeeded, then the facility continues in step 427, else the facility continues in step 426. In step 426, the user's efforts to be identified as the owner of the home fail, and these steps conclude without identifying the user as the owner of the home.

In step 427, the facility identifies the user as the owner of the home and permits the user to enter home facts for the home. In step 428, the facility notifies the user formerly identified as the owner of the home. In step 429, if the user formerly identified as the owner of the home dissents from the identification of the current user as the owner of the home, then the facility continues in step 430, else these steps conclude.

In step 430, the facility initiates a manual resolution process to determine which of the two users should be identified as the owner of the home. In some embodiments, this process is similar to the one described above in connection with step 419, selecting the user that is able to successfully provide documentary evidence that he or she currently owns the home. In step 431, the facility identifies the owner of the home in accordance with a manual resolution performed in step 430. After step 431, these steps conclude.

Those skilled in the art will appreciate that the steps shown in FIGS. 4A-4B may be altered in a variety of ways. For example, the order of the steps may be rearranged; substeps may be performed in parallel; shown steps may be omitted, or other steps may be included; etc.

In some embodiments (not shown), the facility permits the user to initiate manual resolution in some or all of the circumstances in which FIGS. 4A-4B show the user's attempt to be identified as the owner of the home failing, such as in step 413 and/or step 426.

Figure 11:
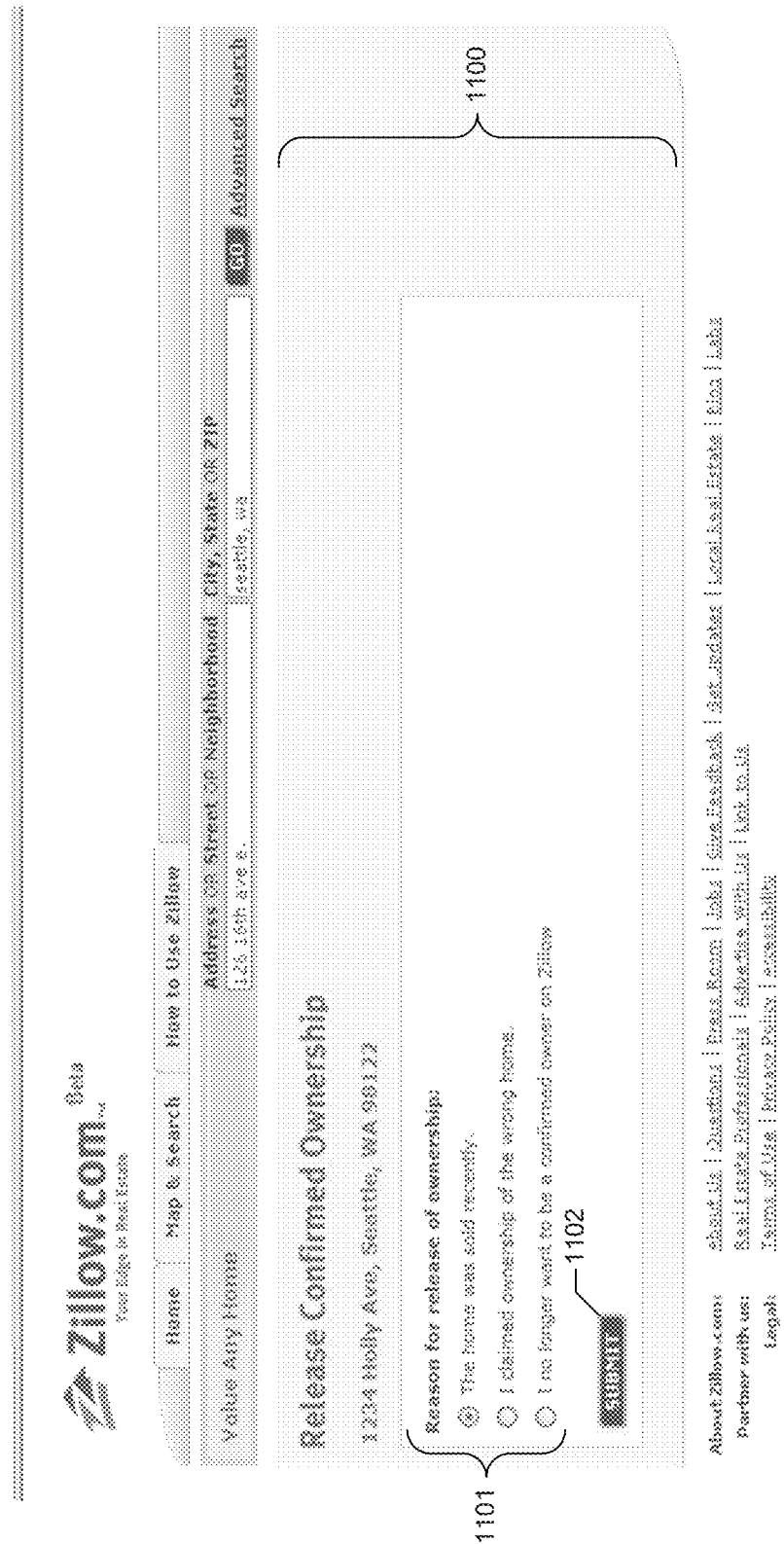
FIG. 11 is a display diagram showing a sample display presented by the facility that permits a user who is currently identified as the owner of the home to relinquish confirmed ownership of the home.

FIG. 11 is a display diagram showing a sample display presented by the facility that permits a user who is currently identified as the owner of the home to relinquish confirmed ownership of the home. Display 1100 includes a control 1101 that the user may operate in order to specify a reason for relinquishing ownership. The display further includes a submit control 1102 that the user may activate in order to relinquish ownership of the home.

Figure 12:
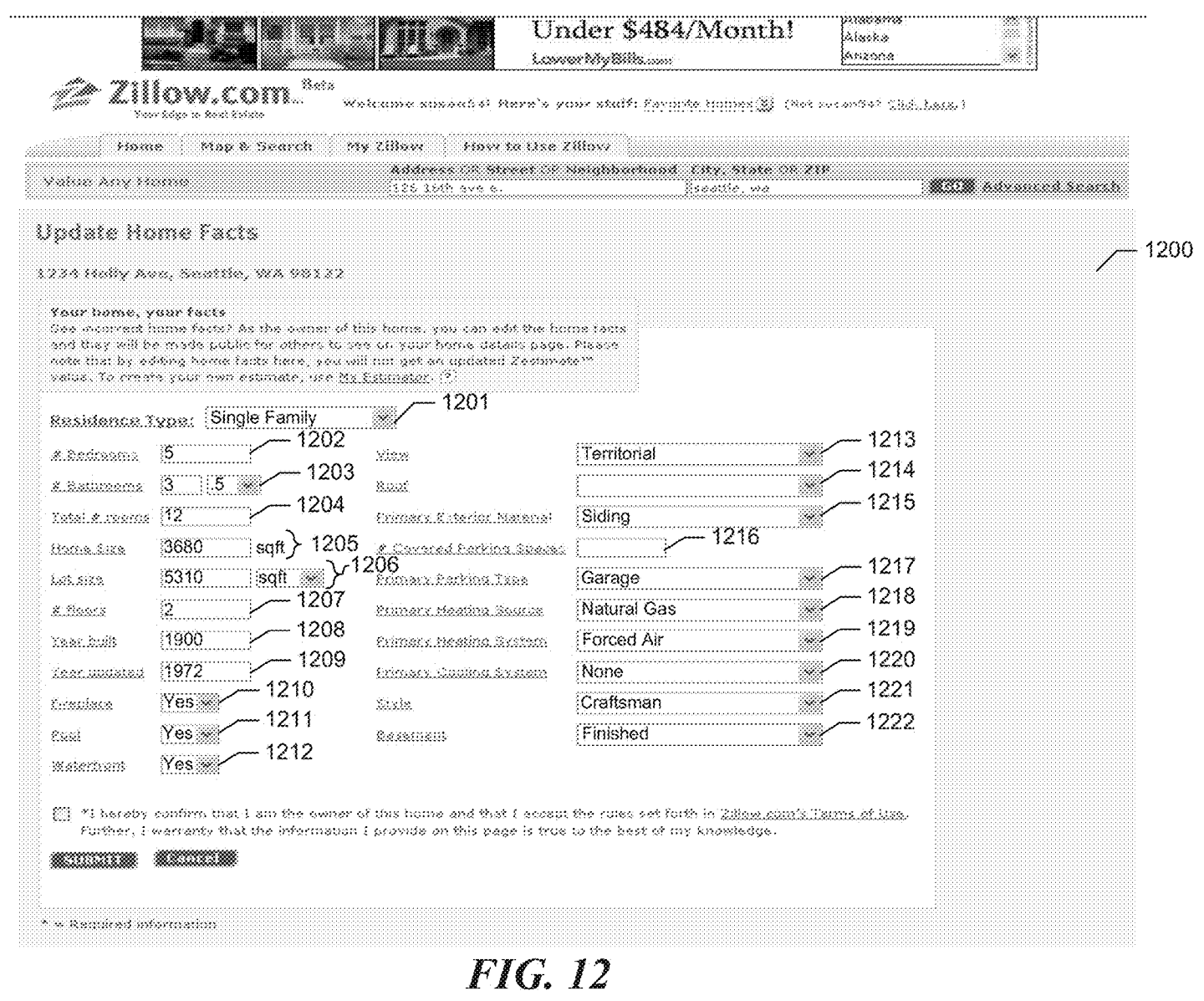

FIGS. 12-15 show a sample user interface typically presented by the facility that enables a user identified as the owner of a home to edit or update home facts associated with the home, i.e., provide attribute values for the home. FIG. 12 is a display diagram showing an initial version of a display usable by a user identified as the owner of the home to provide attribute values for the home. The initial version 1200 of the display contains controls 1201-1222, each corresponding to a different home attribute and showing a value for that attribute currently in the possession of the facility, such as a value obtained from a source other than the owner, such as a value obtained from a government source. For example, control 1202 indicates that the facility currently possesses a value of 5 for the number of bedrooms attribute.

Figure 13:
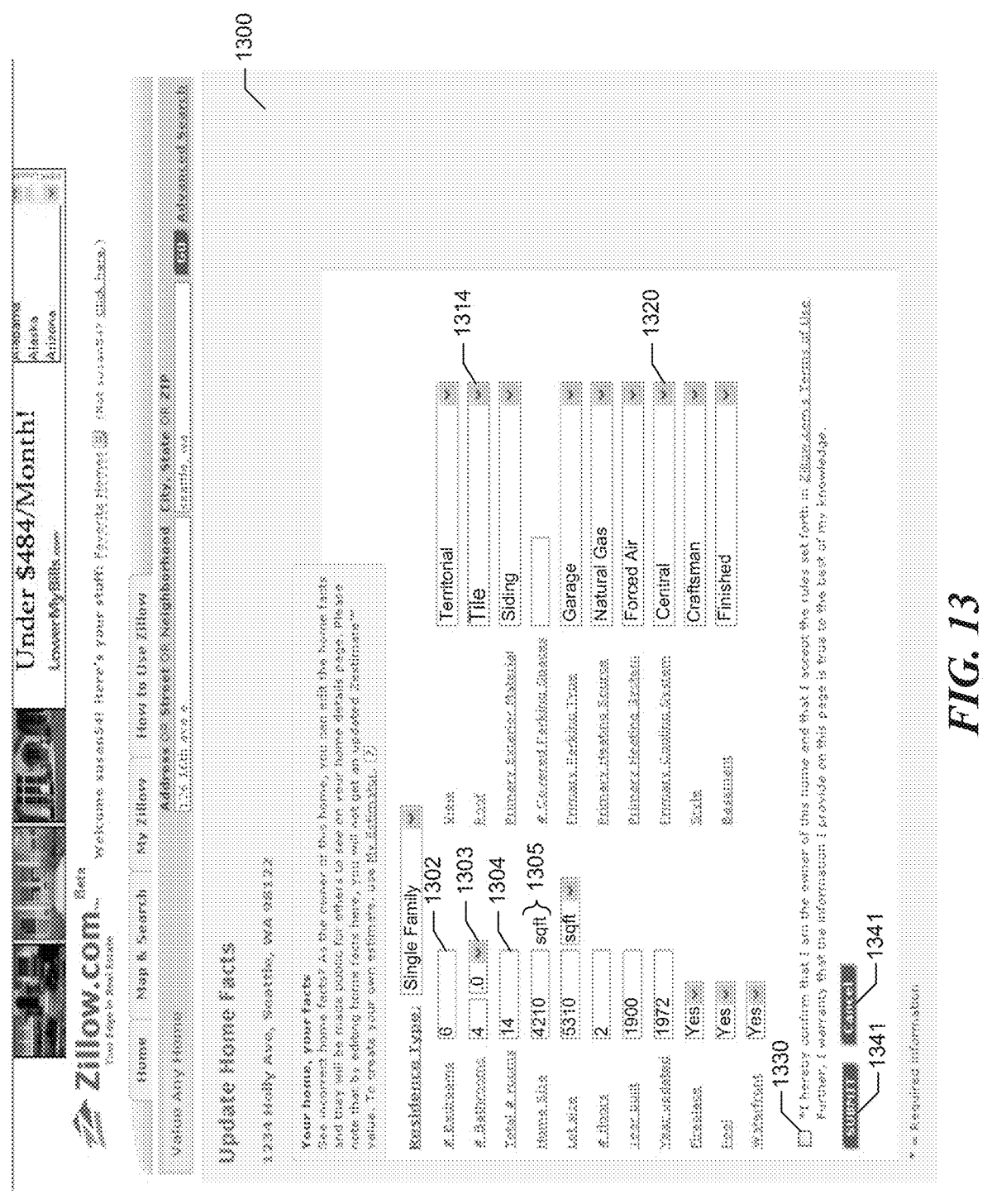

FIG. 13 is a display diagram showing the second version of the display shown in FIG. 12. This version of the display 1300 shows the display after the user has used some of the controls to provide new values of the associated attributes. In particular, the user has used controls 1302, 1303, 1304, 1305, 1314, and 1320 to provide new values of the associated attributes. As one particular example, a user has used control 1302 to provide the value 6 for a number of bedrooms' attribute, for which the facility had earlier obtained the value of 5 from another source. These attribute values provided by the owner are consistent with a small addition that added 530 square feet and two rooms, including one bedroom and an expansion of a half bathroom, as well as central air conditioning. They also reflect that the home has a tile roof, a detail not present among the earlier-obtained attribute values. After using the controls to provide attribute values that differ from the ones initially shown, the user selects a checkbox 1330 again confirming that he or she is the owner of the home and promising that the home facts entered by the user are accurate, then activates a submit control 1341 to provide these attribute values. The user can instead activate a cancel control 1341 in order not to provide any attribute values for the home.

FIG. 14 is a display diagram showing a sample display presented by the facility in response to receiving home facts from the user identified as the owner of the home. The display 1400 is similar to display 300 shown in FIG. 4, but contains the attribute values 1450 provided by the owner, including attribute values 1451, 1452, and 1454, which differ from the attribute values provided for the same attributes by another source of attribute values, and are shown in bold to highlight this difference. Again, the user can select a control 1440 to display, for all of the home's attributes, the values provided by the owner and the other attribute value source. The display also contains a control 1460 that the user may activate in order to generate a valuation for the home based upon the attribute values provided by the owner, or some combination of the attribute values provided by the owner and attribute values obtained from one or more other sources.

FIG. 15 is a display diagram showing a sample display presented by the facility containing a valuation of the home generated at least in part based upon the attribute values provided by the owner. The display 1500 includes such a valuation 1560. In some embodiments, the facility generates this valuation in accordance with one or more of U.S. patent application Ser. No. 11/347,000, filed on Feb. 3, 2006; U.S. patent application Ser. No. 11/347,024, filed on Feb. 3, 2006; and/or U.S. patent application Ser. No. 11/524,048 (patent counsel's matter no. 56920-8015-US00), filed on Sep. 19, 2006, each of which is hereby incorporated by reference in its entirety.

FIGS. 16-25 show sample contents of the home facts database maintained and used by the facility. In some embodiments, the home facts database stores home attribute values and associated information in six tables: a property attribute value table, a property table, a property attribute type table, a data source type table, an attribute value enum table, and an attribute usage table. FIGS. 16-21 show an initial state of the home facts database, while FIGS. 22-23 and 24-25 each correspond to subsequent states of the database.

FIG. 16 is a table diagram showing sample contents of the property attribute value table. The property attribute value table 1600 contains a row for each value for a particular house (i.e., property) for a particular attribute (i.e., home fact) obtained from a particular data source, such as rows 1611-1624 shown in the drawing. Each row is divided into the following columns: a PropertyID column 1601 containing a unique identifier for the home; a PropertyAttributeTypeID column 1602 containing a unique identifier identifying the particular attribute whose value is contained by the row; a DataSourceTypeID column 1603 containing a unique identifier for the source of the attribute value contained by the row; a SeqNbr column 1604 indicating the number of values for this home and attribute previously obtained from this data source; an AttributeValueEnumID column 1605 containing an identifier for the attribute value if the attribute value is of an enumerated type; an AttributeValue column 1606 containing a value for the attribute if the attribute is for a non-enumerated type; an AttributeUsageID column 1607 containing an identifier for a manner of interpreting the attribute value indicated by the row; and a UseRank column 1608 indicating where in a list of attribute values for the home the attribute value indicated by the current row should be displayed. Additional information about the home identified by the PropertyID column of a particular row can be found in the property table, linked by the PropertyID. Additional information about the identity of the attribute identified by the PropertyAttributeTypeID in a particular row may be found in the property attribute type table, linked by PropertyAttributeTypeID. Additional information about the DataSourceTypeID contained in a particular row may be found in the data source type table, linked by DataSourceTypeID. Additional information about the AttributeValueEnumID contained in a particular row may be found in the attribute value enum table, linked by the AttributeValueEnumID. Additional information about the AttributeUsageID contained by a particular row may be found in the attribute usage table, linked by AttributeUsageID.

While FIG. 16 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; etc.

FIG. 17 is a table diagram showing sample contents of the property table in the first state of the home facts database. The property table 1700 contains a row for each home for which attribute values are contained by the property attribute value table, such as rows 1711 and 1712. Each row is divided into the following columns: a PropertyID column 1701 containing a property ID uniquely identifying the home; an address column 1702 containing an address for the home; a county column 1703 showing the county in which the home is located; a city column 1704 showing a city in which the home is located; a state column 1705 showing a state in which the home is located; and a zip column 1706 showing a zip code for the home. In various embodiments, the property table may contain different or additional information about each home, or additional information about each home may be contained in another table. For example, row 1711 of the property table indicates that the home having property ID 11111111, for which attribute values are specified by rows 1611-1623 of the property attribute value table has address 1234 Holly Avenue, is located in King County, in the city of Seattle, in the State of Washington, and has the zip code 98122. When the facility receives an attribute value for a home not corresponding to a row of the property table, the facility generates a new property ID identifying the home, and adds a row to the property table containing the generated property ID and other information and other information identifying the home.

FIG. 18 is a table diagram showing sample contents of the property attribute type table in the first state of the home facts database. The property attribute type table 1800 contains a row for each different attribute for which the property attribute value table can store a value, such as rows 1811-1818. An attribute is also referred to herein as a attribute type. Each row is divided into the following columns: a PropertyAttributeTypeID 1801 containing a PropertyAttributeTypeID uniquely identifying the attribute; and a PropetyAttributeTypeDesc 1802 containing a description of the attribute. For example, row 1811 indicates that the attribute having PropertyAttributeTypeID 111, for which values are stored in rows 1611, 1612, and 1624 of the property attribute value table, has the description "number of bedrooms." In order to adapt the home facts database to store values of a new attribute, this attribute and a PropertyAttributeTypeID for it simply need to be added to a new row of the property attribute type table.

Figures 19, 20:
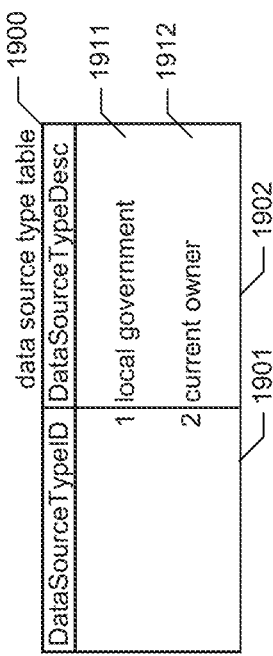
FIG. 19 is a table diagram showing sample contents of the data source type table in the first state of the home facts database.
FIG. 20 is a table diagram showing sample contents of the attribute value enum table in the first state of the home facts database.

FIG. 19 is a table diagram showing sample contents of the data source type table in the first state of the home facts database. The data source type table 1900 has a row for each source or type of source of attribute values, such as rows 1911-1912. Each row is divided into the following columns: a DataSourceTypeID 1901 containing an identifier for the data source or data source type; and a DataSourceTypeDesc 1902 containing a description for this data source or data source type. For example, row 1911 indicates that the DataSourceTypeID 1, which is the data source from which the attribute values contained in rows 1611, 1613, 1615, 1616, 1618, 1620, 1622, and 1624 was obtained, is one or more local governments. Row 1911 indicates that the data source corresponding to DataSourceTypeID 2, from which the attribute values contained in rows 1612, 1614, 1617, 1619, 1621, and 1623 of the property attribute value table is the current owner of the corresponding home. In order to add a new data source or data source type from which attribute values may be obtained and stored in the property attribute value table, it is only necessary to add a new row to data source type table identifying the source or source table and assigning a DataSourceTypeID to it.

FIG. 20 is a table diagram showing sample contents of the attribute value enum table in the first state of the home facts database. The attribute value enum table 2000 contains rows each corresponding to an enumerated value for an attribute whose values are enumerated, such as rows 2011-2017. Each row is divided into the following columns: an AttributeValueEnumID 2001 containing an AttributeValueEnumID identifying the enumerated value; a PropertyAttributeTypeID column 2002 containing a PropertyAttributeTypeID of the attribute for which the enumerated value is available; and an AttributeValueEnumDesc column 2003 containing a description of the enumerated value. For example, rows 2011-2013 each define one of three different enumerated values for the attribute having PropertyAttributeTypeID 118, i.e., the roof type attribute defined by row 1818 of the Property Attribute Type table shown in FIG. 18. Row 2011 indicates that, for this attribute, the enumerated value composite is assigned AttributeValueEnumID 1. Rows 2012 and 2013 respectively indicate that the enumerated value cedar shake is assigned AttributeValueEnumID 2, while the enumerated value clay tile is assigned AttributeValueEnumID 3. Rows 2014-2017 similarly define enumerated values for the attribute having PropertyAttributeTypeID 116, i.e., the cooling attribute defined in row 1816 of the property attribute type table. Where enumerated values of a new attribute are to be stored in the property attribute value table, each of those enumerated values should be defined by adding a new row to the attribute value enum table.

FIG. 21 is a table diagram showing sample contents of the attribute usage table in a first state of the home facts database. The attribute usage table 2100 has a row for each different attribute value usage, such as rows 2111-2114. Each row is divided into the following columns: an AttributeUsageID column 2101 containing an attribute usage ID assigned to the usage to which the row corresponds; an AttributeUsageDescription column 2102 that contains a description of the usage; an AttributeDataTypeID column 2103 that contains a data type selected for the usage; and an AttributeUnitTypeID column 2104 that, for usages in which the value is expressed in a particular unit, contains an indication of that unit. For example, row 2111 indicates that the usage having AttributeUsageID 1 is a whole number based upon the integer data type, and does not have any units. This usage is employed in the following rows of the property attribute value table shown in FIGS. 16: 1611-1614, 1618, 1619, 1622, and 1624.

Based upon the foregoing, it can be seen that the first state of the home facts database reflects the attribute values shown in FIG. 12 and originally obtained from a first source, as well as the values shown in FIG. 13 and provided by the owner of the home. It can be seen that the owner, having DataSourceTypeID 2, provided values for the following attributes: the number of bedrooms attribute having PropertyAttributeTypeID 111 (row 1612); the number of bathrooms attribute having PropertyAttributeTypeID 112 (row 1613); the home size attribute having PropertyAttributeTypeID 114 (row 1617); the total number of rooms having PropertyAttributeTypeID 115 (row 1619); the cooling attribute having PropertyAttributeTypeID 116 (row 1621); and the roof type property having PropertyAttributeTypeID 118 (row 1623). The owner failed to provide a value for, among other attributes, the lot size attribute having PropertyAttributeTypeID 113. The original data source, on the other hand, failed to provide a value for the roof type attribute, having PropertyAttributeTypeID 118.

FIGS. 22 and 23 relate to a second state of the home facts database, reflecting the addition of a new attribute to the home facts database. FIG. 22 is a table diagram showing sample contents of the property attribute type table in the second state of the home facts database. It can be seen in table 2200 that row 2219 has been added to the property attribute type table shown in FIG. 18. Row 2219 defines a new attribute, school district, and assigns to it a PropertyAttributeTypeID 140. The addition of this row to the property attribute type table to store values for this new attribute, and attribute value sources, such as the owner, to provide values for this new attribute.

FIG. 23 is a table diagram showing several contents of the property attribute value table in the second state of the home facts database. It can be seen from this table 2300 that a new row 2325 has been added to table 1600 shown in FIG. 16. It shows that, subsequent to adding the new row 2219 to the property attribute type table, the owner of the home having property ID 11111111 provided the attribute value 203 for the new school district attribute.

FIGS. 24-25 show a third state of the home facts database reflecting the addition of a new data source to the home facts database. FIG. 24 is a table diagram showing sample contents of the data source type table in the third state of the home facts database. The table 2400 shows the addition of a new row 2413 corresponding to a new source of attribute values, a verified agent, i.e., a real estate agent verified as acting on behalf of the current owner of the home. Row 2413 assigns this data source the DataSourceTypeID 3.

FIG. 25 is a table diagram showing sample contents of the property attribute value table 2500 in the third state of the home facts database. The table 2500 shows the addition of new row 2526 which indicates that the value 5350 for the lot size attribute having property attribute type 113 has been obtained from the verified agent data source. This is consistent with the owner's agent performing or commissioning a survey of the lot size and determining that it is slightly larger than the value attributed by the local government data source.

In some embodiments, the AttributeUsageID and/or UseRank columns shown in the property attribute value table are relocated to the property attribute type table, such that they are stored only once for each attribute, as opposed to once for each combination of attribute, home, data source, and sequence number.

In some embodiments, the facility employs various approaches to selecting from among and/or combining attribute values for the same home obtained from different sources. In some embodiments, the facility employs an ordering of data sources called an attribute value source authority precedence that specifies, where more than one data source provides a value for the same home and attribute, which is to be considered the most authoritative. The facility may maintain and apply a single attribute value source authority precedence across all attributes, or multiple attribute value source authority precedences that are each targeted to a single attribute or a larger proper subset of the full list of attributes.

In some embodiments, the facility enables a user to identify himself or herself as the owner of a home without immediately editing the home facts associated with that home.

In some embodiments, the facility omits IP address blacklisting from the process it performs to determine whether to identify a user as the owner of a home.

It will be appreciated by those skilled in the art that the above-described facility may be straightforwardly adapted or extended in various ways. For example, the facility may employ a variety of database schemas and may store values of a variety of types for attributes of all sorts of homes or other properties. While the foregoing description makes reference to particular embodiments, the scope of the invention is defined solely by the claims that follow and the elements recited therein.

We claim:

1. A method in a computing system for constructing a repository containing attribute information for a plurality of homes, wherein the attribute information may be obtained at least in part from input from current owners of the plurality of homes, the method comprising, for each of the plurality of homes:
  procuring, from a plurality of data sources, values for attributes among a plurality of attributes that were attributed to the home by a government agency, wherein one or more of the data sources identify previous owners of the home and the attributes include at least the previous owners and the current owner of the home;
  for each procured attribute value for attributes among the plurality of attributes that were attributed to the home by the government agency,
    storing, in an extensible data structure for property attribute values, the procured attribute value for the home with an indication that it was attributed to the home by the government agency, wherein storing the procured attribute value for the home with the indication that it was attributed to the home by the government agency comprises storing a unique identifier for the government agency in the extensible data structure for property attribute values in association with the procured attribute value;
  generating a user interface for displaying to users the attribute values attributed to the home by the government agency, wherein the user interface comprises a display field configured to identify the current owner of the home;
  verifying, via the user interface, a user as the current owner of the home at least in part by,
    determining whether the user bought the home from an identified owner,
    in response to determining that the user bought the home from the identified owner,
      verifying the user with a credit card at least in part by,
        determining that the user has established an account with the computing system,
        obtaining credit card information from the user,
        determining that the user's account is not blocked due to earlier credit card errors detected by the computing system,
        determining that the credit card is approved, and
        identifying the user as the current owner of the home, and
    in response to determining that the user did not buy the home from the identified owner,
      verifying the user with the credit card at least in part by,
        determining that the user has established an account with the computing system,
        obtaining credit card information from the user,
        determining that the user's account is not blocked due to earlier credit card errors detected by the computing system,
        determining that the credit card is approved,
        presenting, to the user, via the user interface, at least one question whose answer would be known to an owner of the home, wherein the user interface comprises a display field comprising a list of names of possible owners of the home, wherein the name of the current owner is randomly located within the list of names of possible owners of the home,
        receiving, from the user, via the user interface, an answer to the at least one question based on a selection from the list of names of possible owners of the home, and
        in response to determining that the answer, received from the user, via the user interface, to the at least one question is correct, identifying the user as the current owner of the home;
  obtaining from the user, via the user interface, one or more values for attributes among the plurality of attributes, the obtained one or more values for attributes comprising updates or edits to one or more of the plurality of attributes;
  for each attribute value for attributes among the plurality of attributes obtained from the user,
    storing, in the extensible data structure for property attribute values, the obtained attribute value for the home with an indication that it was attributed to the home by the current owner of the home, wherein storing the obtained attribute value for the home with the indication that it was attributed to the home by the current owner of the home comprises storing a unique identifier for the current owner in the extensible data structure for property attribute values in association with the procured attribute value, such that all of the procured attribute values, all of the obtained attribute values, and all of the unique identifiers are simultaneously stored in the extensible data structure for property attribute values; and
  providing for display, via the user interface, to each of a plurality of users both the procured and obtained attribute values for the home.

2. The method of claim 1, further comprising providing a mechanism for the user to identify themselves as the current owner of the home, wherein the providing comprises:
  posing a question whose answer would be known to an owner of the home;
  receiving an answer to the posed question from a user;
  only if the received answer is correct, identifying the user as an owner of the home;
  if the received answer is incorrect, determining how many incorrect answers the user has provided during a foregoing period of time.

3. The method of claim 1, further comprising providing a mechanism for the user to identify themselves as an owner of the home, wherein the providing comprises:
  obtaining credit card information from the user;
  determining whether the obtained credit card information is associated with a valid credit card.

4. The method of claim 1, further comprising:
  providing a mechanism for the user to identify themselves as an owner of the home, wherein the providing comprises sending, to the user, a web page that includes the mechanism for the user to identify themselves as an owner of the home.

5. A non-transitory computer-readable hardware device whose contents cause a computing system to perform a method for constructing a repository containing attribute information for a plurality of properties, wherein the attribute information may be obtained at least in part from input from current owners of the plurality of properties, the method comprising, for each of the plurality of properties:
  procuring, from a plurality of data source, values for attributes among a plurality of attributes that were attributed to the property by a government agency, wherein one or more of the data sources identify previous owners of the property and the attributes include at least the previous owners and the current owner of the property;

for each procured attribute value for attributes among the plurality of attributes that were attributed to the property by the government agency,
  storing, in an extensible data structure for property attribute values, the procured attribute value for the property with an indication that it was attributed to the property by the government agency;
generating a user interface for displaying to user the attribute values attributed to the property by the government agency, wherein the user interface comprises a display field configured to identify the current owner of the property;
verifying, via the user interface, a user as the current owner of the property at least in part by,
  determining whether the user bought the property from an identified owner,
  in response to determining that the user bought the property from the identified owner,
    verifying the user with a credit card at least in part by,
      determining that the user has established an account with the computing system,
      obtaining credit card information from the user,
      determining that the user's account is not blocked due to earlier credit card errors detected by the computing system,
      determining that the credit card is approved, and
      identifying the user as the current owner of the property, and
  in response to determining that the user did not buy the property from the identified owner,
    verifying the user with the credit card at least in part by,
      determining that the user has established an account with the computing system,
      obtaining credit card information from the user,
      determining that the user's account is not blocked due to earlier credit card errors detected by the computing system,
      determining that the credit card is approved,
      presenting, to the user, via the user interface, at least one question whose answer would be known to an owner of the property, wherein the user interface comprises a display field comprising a list of names of possible owners of the property, wherein the name of the current owner is randomly located within the list of names of possible owners of the property,
      receiving, from the user, via the user interface, an answer to the at least one question based on a selection from the list of names of possible owners of the property, and
      in response to determining that the answer, received from the user, via the user interface, to the at least one question is correct, identifying the user as the current owner of the property;
obtaining from the user, via the user interface, one or more values for attributes among the plurality of attributes, the obtained one or more values for attributes comprising updates or edits to one or more of the plurality of attributes;
for each attribute value for attributes among the plurality of attributes obtained from the user,
  storing, in the extensible data structure for property attribute values, the obtained attribute value for the property with an indication that it was attributed to the property by the current owner of the property; and
providing for display, via the user interface, to each of a plurality of users both the procured and obtained attribute values for the property.

6. The computer-readable hardware device of the claim 5, the contents further comprising a property attribute display data structure, the property attribute display data structure having contents for causing a display device to display visual information that (a) identifies a distinguished property, (b) conveys a first value for a property attribute obtained from a first source associated with a first unique identifier, and (c) conveys a second value for the property attribute obtained from a second source associated with a second unique identifier distinct from the first source.

7. A non-transitory computer-readable hardware device whose contents cause a computing system to perform a method for publishing information about a distinguished home, wherein attribute information about the distinguished home may be obtained at least in part from input from a current owner of the distinguished home, the method comprising:
procuring, from a plurality of data sources, values for attributes among a plurality of attributes that were attributed to the distinguished home by a government agency, wherein one or more of the data sources identify previous owners of the distinguished home and the attributes include at least the previous owners and the current owner of the distinguished home;
for each procured attribute value for attributes among the plurality of attributes that were attributed to the distinguished home by the government agency,
  storing, in an extensible data structure for property attribute values, the procured attribute value for the distinguished home with an indication that it was attributed to the distinguished home by the government agency;
generating a user interface for displaying to users the attribute values attributed to the distinguished home by the government agency, wherein the user interface comprises a display field configured to identify the current owner of the distinguished home;
verifying, via the user interface, a user as the current owner of the distinguished home at least in part by,
  determining whether the user bought the distinguished home from an identified owner,
  in response to determining that the user bought the distinguished home from the identified owner,
    verifying the user with a credit card at least in part by,
      determining that the user has established an account with the computing system,
      obtaining credit card information from the user,
      determining that the user's account is not blocked due to earlier credit card errors detected by the computing system,
      determining that the credit card is approved, and
      identifying the user as the current owner of the distinguished home, and
  in response to determining that the user did not buy the distinguished home from the identified owner,
    verifying the user with the credit card at least in part by,
      determining that the user has established an account with the computing system,
      obtaining credit card information from the user, determining that the user's account is not blocked due to earlier credit card errors detected by the computing system, determining that the credit card is approved, presenting, to the user, via the user interface, at least one question whose answer would be known to an owner of the distinguished home, wherein the user interface comprises a display field comprising a list of names of possible owners of the distinguished home, wherein the name of the current owner is randomly located within the list of names of possible owners of the distinguished home, receiving, from the user, via the user interface, an answer to the at least one question based on a selection from the list of names of possible owners of the distinguished home, and in response to determining that the answer, received from the user, via the user interface, to the at least one question is correct, identifying the user as the current owner of the distinguished home;

obtaining from the user, via the user interface, one or more values for attributes among the plurality of attributes, the obtained one or more values for attributes comprising updates or edits to one or more of the plurality of attributes;

for each attribute value for attributes among the plurality of attributes obtained from the user, storing, in the extensible data structure for property attribute values, the obtained attribute value for the distinguished home with an indication that it was attributed to the distinguished home by the current owner of the distinguished home; and providing for display, via the user interface, to each of a plurality of users both the procured and obtained attribute values for the distinguished home.

8. The computer-readable medium of claim 7 wherein the obtained information specifies values for a plurality of home attributes.

9. The computer-readable medium of claim 7, further comprising:

automatically determining a valuation of the distinguished home based at least in part on at least a portion of the received information; and including the determined valuation in a web page relating to the distinguished home that is available for retrieval by any user without restriction.

10. The computer-readable medium of claim 7, further comprising:

verifying that the user is the current owner of the distinguished home if the user provides documentary evidence that the user is the current owner of the distinguished home.

11. The computer-readable medium of claim 7, further comprising:

verifying that the user is the current owner of the distinguished home if the user provides a copy of a deed showing the user to be the current owner of the distinguished home.

12. The computer-readable medium of claim 7, further comprising:

verifying that the user is the current owner of the distinguished home if the user provides a copy of a title showing the user to be the current owner of the distinguished home.

13. The computer-readable medium of claim 7, further comprising:

verifying that the user is the current owner of the distinguished home if the user provides a copy of a mortgage statement showing the user to be the current owner of the distinguished home.

14. The computer-readable medium of claim 7, further comprising:

verifying that the user is the current owner of the distinguished home if the user provides a copy of a property tax assessment showing the user to be the current owner of the distinguished home.

15. The computer-readable medium of claim 7, further comprising:

verifying that the user is the current owner of the distinguished home if the user provides a copy of a property tax bill showing the user to be the current owner of the distinguished home.

16. The computer-readable medium of claim 7, further comprising:

determining that the distinguished user and a second user are both simultaneously identified as the owner of the distinguished home; and in response to the determining, initiating a manual process to identify a single owner of the distinguished home.

17. The computer-readable hardware device of the claim 7, the contents further containing a data structure, containing attribute values for a plurality of homes and a plurality of home attributes, comprising, for each of the plurality of homes, for each of a plurality of attribute value sources, a capacity to store values for any of the plurality of home attributes obtained from the attribute value source and a unique identifier associated with the attribute value source.

18. The computer-readable hardware device of claim 17 wherein the data structure comprises an attribute value table, each row of which contains indications of:

a home;

a home attribute;

an attribute value source; and a value for the indicated home attribute attributed to the indicated home by the indicated attribute value source, such that the table may simultaneously contain multiple rows for the same home and home attribute and different attribute value sources, and such that any rows in the table indicating the distinguished home may be used to display information about the distinguished home.

19. The computer-readable hardware device of claim 18 wherein the data structure further comprises an attribute table, each row of which contains information identifying a different home attribute, and wherein each row of the attribute value table indicates an attribute by containing a reference to a row of the attribute table whose contents identify the attribute, such that the addition of a row to the attribute table whose contents identify a new home attribute enables rows to be added to the attribute value table that indicate values for the new home attribute.

20. The computer-readable hardware device of claim 18 wherein the data structure contains both (1) a first row indicating the distinguished home, a distinguished home attribute, a first attribute value source, and a first value for the distinguished home attribute attributed to the distinguished home by the first attribute value source, and (2) a second row indicating the distinguished home, the distinguished home attribute, a second attribute value source that differs from the first attribute value source, and a second value for the distinguished home attribute attributed to the distinguished home by the second attribute value source that differs from the first value for the distinguished home attribute.

21. The computer-readable hardware device of claim 20, wherein the first attribute value source is a second government agency and the second attribute value source is a user identified as an owner of the distinguished home.

22. The computer-readable hardware device of claim 17 wherein the data structure further comprises information indicating at least one attribute value source authority precedence, each attribute value source authority precedence specifying, for a designated attribute, a relative level of authority to be attributed to each of a plurality of attribute value sources providing values for the designated attribute.

23. The computer-readable hardware device of claim 6 wherein the property attribute display data structure further has contents for causing the display device to display visual information that (d) identifies the first source, and (e) identifies the second source.

24. A computing system for aggregating home attribute values, for a plurality of home attributes, for one or more homes among a plurality of homes, wherein the home attribute values may be obtained at least in part from input from current owners of the plurality of homes, the computing system comprising:
  one or more memories;
  one or more processors;
  an import module that imports, from a plurality of data sources, home attribute values that were attributed to homes by a government agency, wherein one or more of the data sources identify previous owners of the homes and the plurality of home attributes include at least the previous owners and current owner of the homes;
  a storage module that stores the imported home attribute values in an extensible data structure for home attribute values;
  a user interface module that generates a user interface for displaying to users the home attribute values attributed to homes by the government agency, wherein the user interface comprises a display field configured to identify the current owner of a home;
  a verification module that verifies a user as an owner of a first home at least in part by,
    determining whether the user bought the first home from an identified owner,
    in response to determining that the user bought the first home from the identified owner,
      verifying the user with a credit card at least in part by,
        determining that the user has established an account with the computing system,
        obtaining credit card information from the user,
        determining that the user's account is not blocked due to earlier credit card errors detected by the computing system,
        determining that the credit card is approved, and
        identifying the user as the current owner of the first home, and
    in response to determining that the user did not buy the first home from the identified owner,
      verifying the user with the credit card at least in part by,
        determining that the user has established an account with the computing system,
        obtaining credit card information from the user,
        determining that the user's account is not blocked due to earlier credit card errors detected by the computing system,
        determining that the credit card is approved,
        presenting, to the user, via the user interface, at least one question whose answer would be known to an owner of the first home, wherein the user interface comprises a display field comprising a list of names of possible owners of the first home, wherein the name of the current owner of the first home is randomly located within the list of names of possible owners of the first home,
        receiving, from the user, via the user interface, an answer to the at least one question based on a selection from the list of names of possible owners of the first home, and
        in response to determining that the answer, received from the user, via the user interface, to the at least one question is correct, identifying the user as the owner of the first home;
  an input module that:
    obtains, from the user, via the user interface, one or more home attribute values, the obtained one or more home attribute values comprising updates or edits to one or more of the plurality of home attributes, and
    stores, in the extensible data structure for home attribute values, the obtained home attribute values with an indication that they were attributed to the first home by the current owner of the first home; and
  a module that provides for display, via the user interface, to each of a plurality of users both the imported and obtained home attribute values for the first home.

25. The computing system of claim 24, further comprising:
  a web serving module that serves web pages to users without restriction that contain both home attribute values imported by the import module and home attribute values inputted via web pages served by the web serving module.

26. A method in a computing system for managing home attribute values, wherein attribute information about a home may be obtained at least in part from input from a current owner of the home, comprising:
  importing, from a plurality of data sources, home attribute values, for a plurality of home attributes, that were attributed to the home by a government agency, wherein one or more of the data sources identify previous owners of the home and the plurality of home attributes include at least the previous owners and the current owner of the home;
  storing the imported home attribute values in an extensible data structure for home attribute values;
  generating a user interface for displaying to users the home attribute values attributed to homes by a government agency, wherein the user interface comprises a display field configured to identify the current owner of a home;
  verifying, via the user interface, a user as the current owner of the home at least in part by,
    determining whether the user bought the home from an identified owner,
    in response to determining that the user bought the home from the identified owner,
      verifying the user with a credit card at least in part by, determining that the user has established an account with the computing system,
obtaining credit card information from the user,
determining that the user's account is not blocked due to earlier credit card errors detected by the computing system,
determining that the credit card is approved, and identifying the user as the current owner of the home;
in response to determining that the user did not buy the home from the identified owner,
verifying the user with the credit card at least in part by,
determining that the user has established an account with the computing system,
obtaining credit card information from the user,
determining that the user's account is not blocked due to earlier credit card errors detected by the computing system,
determining that the credit card is approved,
presenting, to the user, via the user interface, at least one question whose answer would be known to an owner of the home, wherein the user interface comprises a display field comprising a list of names of possible owners of the home, wherein the name of the current owner of the home is randomly located within the list of names of possible owners of the home,
receiving, from the user, via the user interface, an answer to the at least one question based on a selection from the list of names of possible owners of the home, and
in response to determining that the answer, received from the user, via the user interface, to the at least one question is correct, identifying the user as the owner of the home;
obtaining from the user, via the user interface, one or more values for home attributes among the plurality of home attributes, the obtained one or more values for home attributes comprising updates or edits to one or more of the plurality of home attributes;
for each home attribute value for home attributes among the plurality of home attributes obtained from the user, storing, in the extensible data structure for home attribute values, the obtained home attribute value for the home with an indication that it was attributed to the home by the current owner of the home; and
providing for display, via the user interface, to each of a plurality of users both the imported and obtained attribute values for the home.

27. The method of claim 26; wherein no home attribute value has previously been obtained from a data source from which a first home attribute value is obtained, and wherein a row added to a first table identifies the data source from which the first home attribute value is obtained by containing an identifier for the data source from which the first home attribute value is obtained, the method further comprising:
selecting a value of the identifier for the data source from which the first home attribute value is obtained; and
adding a row to a second table containing the selected value of the identifier and additional identifying information for the data source from which the first home attribute value is obtained.

28. The method of claim 26, wherein no home attribute value has previously been obtained for a first home attribute for which a first home attribute value is obtained, and wherein a row added to a first table identifies the home attribute for which the first home attribute value is obtained by containing an identifier for the home attribute for which the first home attribute value is obtained, the method further comprising:
selecting a value of the identifier for the home attribute for which the first home value is obtained; and
adding a row to a second table containing the selected value of the identifier and additional identifying information for the home attribute for which the first home attribute value is obtained.

29. The method of claim 26, wherein no home attribute value has previously been obtained for the home for which a first home attribute value is obtained, and wherein a row added to a first table identifies the data source from which the first home attribute value is obtained by containing an identifier for the home for which the first home attribute value is obtained, the method further comprising:
selecting a value of the identifier for the home for which the first home attribute value is obtained; and
adding a row to a second table containing the selected value of the identifier and additional identifying information for the home for which the first home attribute value is obtained.

30. The method of claim 26, wherein a first obtained home attribute value is an enumerated value that has not previously been obtained for the home attribute for which the first obtained home attribute value is obtained, and wherein a row added to a first table indicates the first obtained home attribute value by containing an identifier for the home attribute for the first obtained home attribute value, the method further comprising:
selecting a value of the identifier for the first obtained home attribute value; and
adding a row to a second table containing the selected value of the identifier and additional identifying information for the first obtained home attribute value.

31. The method of claim 26, wherein a first obtained home attribute value differs from a value indicated by a row of the first table for the same home attribute and for the same home.

32. The method of claim 31, further comprising:
presenting at least two of the multiple values for the same attribute and the same home.

33. The method of claim 31, further comprising:
applying to the multiple values for the same attribute and the same home a value derivation rule to produce a derived value to use for the attribute and home.

34. The method of claim 33, further comprising using the derived value by presenting it to a user.

35. The method of claim 33, further comprising using the derived value by generating a valuation of the home that is based upon the derived value.

36. The method of claim 33 wherein the applied value derivation rule selects one of the multiple values for the attribute and home contained by the first table as the derived value.

37. The method of claim 36 wherein the applied value derivation rule applies an attribute value source authority precedents specify a relative level of authority to be attributed to each of a plurality of attribute value sources.

38. The method of claim 33 wherein the applied value derivation rule combines the multiple values for the attribute and home contained by the first table to produce the derived value.

* * * * *

UNITED STATES PATENT AND TRADEMARK OFFICE
CERTIFICATE OF CORRECTION

PATENT NO. : 11,315,202 B2  Page 1 of 2
APPLICATION NO. : 15/789617
DATED : April 26, 2022
INVENTOR(S) : VanderMey et al.

It is certified that error appears in the above-identified patent and that said Letters Patent is hereby corrected as shown below:

On the Title Page

On the page 3, in Column 2, under "U.S. Patent Documents", Line 12, delete "Taibird" and insert -- Talbird --.
On the page 3, in Column 2, under "Other Publications", Line 17, delete "Humphnes," and insert -- Humphries, --.
On the page 4, in Column 1, under "Other Publications", Line 20, delete "visibiliyt" and insert -- visibility --.
On the page 4, in Column 1, under "Other Publications", Line 53, delete "Utrecth" and insert -- Utrecht --.
On the page 4, in Column 2, under "Other Publications", Line 52, delete "14/041,4560," and insert -- 14/041,450, --.
On the page 4, in Column 2, under "Other Publications", Line 73, delete "Ziliow" and insert -- Zillow --.
On the page 5, in Column 2, under "Other Publications", Line 13, delete "http://w w w .csw" and insert -- http://www.csw --.
On the page 5, in Column 2, under "Other Publications", Line 44, delete "http://w w w .csw" and insert -- http://www.csw --.
On the page 6, in Column 1, under "Other Publications", Line 5, delete "Editions<" and insert -- Edition< --.
On the page 6, in Column 1, under "Other Publications", Line 12, delete "arch ive." and insert -- archive. --.
On the page 6, in Column 2, under "Other Publications", Line 64, delete "Issue7," and insert -- Issue 7, --.
On the page 7, in Column 2, under "Other Publications", Line 53, delete "Microstraqtegy," and insert -- Microstrategy, --.
On the page 9, in Column 1, under "Other Publications", Line 20, delete "jon" and insert -- job --.
On the page 11, in Column 1, under "Other Publications", Lines 32-33, delete "http :/ /www ." and insert -- http://www. --.

Signed and Sealed this
Eleventh Day of October, 2022

Katherine Kelly Vidal
*Director of the United States Patent and Trademark Office*

On the page 12, in Column 1, under "Other Publications", Line 12, delete "http:/!" and insert -- http:// --.

In the Specification

In Column 11, Line 35, delete "FIGS." and insert -- FIG. --.

In the Claims

In Column 21, Line 51, in Claim 27, delete "claim 26;" and insert -- claim 26, --.